(12) United States Patent
Tanimoto

(10) Patent No.: US 8,010,647 B2
(45) Date of Patent: *Aug. 30, 2011

(54) RELAY SERVER AND RELAY COMMUNICATION SYSTEM ARRANGED TO SHARE RESOURCES BETWEEN NETWORKS

(75) Inventor: Yoshifumi Tanimoto, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 543 days.

This patent is subject to a terminal disclaimer.

(21) Appl. No.: 11/953,505

(22) Filed: Dec. 10, 2007

(65) Prior Publication Data

US 2008/0137672 A1 Jun. 12, 2008

(30) Foreign Application Priority Data

Dec. 11, 2006 (JP) ................... 2006-333500
Dec. 13, 2006 (JP) ................... 2006-335539
Dec. 19, 2006 (JP) ................... 2006-341335

(51) Int. Cl.
*G06F 15/16* (2006.01)
*H04L 12/66* (2006.01)

(52) U.S. Cl. ........ 709/223; 709/217; 709/218; 709/219; 709/225; 709/229; 370/401

(58) Field of Classification Search .......... 709/217–219, 709/223, 225, 229; 370/401
See application file for complete search history.

(56) References Cited

U.S. PATENT DOCUMENTS

| | | | |
|---|---|---|---|
| 5,224,205 A | 6/1993 | Dinkin et al. | |
| 5,535,375 A | 7/1996 | Eshel et al. | |
| 5,848,134 A | 12/1998 | Sekiguchi et al. | |
| 5,884,312 A | 3/1999 | Dustan et al. | |
| 6,061,796 A | 5/2000 | Chen et al. | |
| 6,111,883 A | 8/2000 | Terada et al. | |
| 6,145,084 A | 11/2000 | Zuili et al. | |
| 6,215,877 B1 | 4/2001 | Matsumoto | |
| 6,222,536 B1 | 4/2001 | Kihl et al. | |
| 6,226,692 B1 | 5/2001 | Miloushev et al. | |
| 6,237,023 B1 | 5/2001 | Yoshimoto | |

(Continued)

FOREIGN PATENT DOCUMENTS

EP 1 054 547 A2 11/2000

(Continued)

OTHER PUBLICATIONS

Tanimoto; "Relay Server, Communication System and Facsimile System"; U.S. Appl. No. 10/045,698, filed Jan. 10, 2002.

(Continued)

*Primary Examiner* — Alina N. Boutah
(74) *Attorney, Agent, or Firm* — Keating & Bennett, LLP

(57) ABSTRACT

A relay server which is connected to a LAN and which can communicate with a relay server in a different LAN, includes: an account information registering unit that stores information on client terminals connected to the LAN; a relay group information registering unit that stores relay group information; a shared resource information registering unit that stores shared resource information; a check unit that checks whether the client terminals stored in the account information registering unit can be accessed; a relay group information notifying unit that updates the relay group information and transmits a change notification of the relay group information to the relevant relay server; and a shared resource information notifying unit that updates the relevant shared resource information and transmits a change notification of the shared resource information to the relevant client terminal which is stored in the account information registering unit.

8 Claims, 44 Drawing Sheets

U.S. PATENT DOCUMENTS

| | | | |
|---|---|---|---|
| 6,336,141 B1 | 1/2002 | Fujiyama et al. | |
| 6,434,619 B1* | 8/2002 | Lim et al. | 709/229 |
| 6,538,773 B1 | 3/2003 | Brossman et al. | |
| 6,546,488 B2 | 4/2003 | Dillon et al. | |
| 6,564,261 B1 | 5/2003 | Gudjonsson et al. | |
| 6,594,246 B1 | 7/2003 | Jorgensen | |
| 6,636,513 B1 | 10/2003 | Nishikawa et al. | |
| 6,754,212 B1 | 6/2004 | Terada et al. | |
| 6,757,365 B1 | 6/2004 | Bogard | |
| 6,766,373 B1 | 7/2004 | Beadle et al. | |
| 6,889,256 B1 | 5/2005 | Palevich et al. | |
| 6,898,641 B1 | 5/2005 | Kobayashi | |
| 6,950,879 B2 | 9/2005 | Zhou | |
| 6,988,199 B2 | 1/2006 | Toh et al. | |
| 7,000,248 B2 | 2/2006 | Mizukoshi | |
| 7,120,927 B1 | 10/2006 | Beyda et al. | |
| 7,139,811 B2 | 11/2006 | Lev Ran et al. | |
| 7,174,378 B2 | 2/2007 | Yoon et al. | |
| 7,206,088 B2 | 4/2007 | Tanimoto | |
| 7,299,275 B2 | 11/2007 | Tsukidate et al. | |
| 7,346,039 B2* | 3/2008 | Oishi | 370/338 |
| 2001/0044819 A1 | 11/2001 | Gong | |
| 2001/0047414 A1 | 11/2001 | Yoon et al. | |
| 2002/0023143 A1 | 2/2002 | Stephenson et al. | |
| 2002/0032616 A1 | 3/2002 | Suzuki et al. | |
| 2002/0073182 A1 | 6/2002 | Zakurdaev et al. | |
| 2002/0095506 A1* | 7/2002 | Tanimoto | 709/227 |
| 2002/0118398 A1* | 8/2002 | Tanimoto | 358/407 |
| 2002/0124090 A1* | 9/2002 | Poier et al. | 709/228 |
| 2002/0135813 A1* | 9/2002 | Tanimoto | 358/402 |
| 2002/0143855 A1 | 10/2002 | Traversat et al. | |
| 2002/0143922 A1* | 10/2002 | Tanimoto | 709/223 |
| 2002/0143956 A1* | 10/2002 | Tanimoto | 709/227 |
| 2002/0143957 A1* | 10/2002 | Tanimoto | 709/227 |
| 2002/0143960 A1 | 10/2002 | Goren et al. | |
| 2002/0145625 A1* | 10/2002 | Komine et al. | 345/738 |
| 2002/0146002 A1 | 10/2002 | Sato | |
| 2002/0152299 A1 | 10/2002 | Traversat et al. | |
| 2003/0103492 A1* | 6/2003 | Tanimoto | 370/351 |
| 2003/0117665 A1* | 6/2003 | Eguchi et al. | 358/402 |
| 2003/0200270 A1* | 10/2003 | Tanimoto | 709/206 |
| 2004/0024829 A1* | 2/2004 | Tanimoto | 709/206 |
| 2004/0068524 A1 | 4/2004 | Aboulhosn et al. | |
| 2004/0073706 A1* | 4/2004 | Eguchi et al. | 709/245 |
| 2004/0083385 A1 | 4/2004 | Ahmed et al. | |
| 2004/0109437 A1* | 6/2004 | Tanimoto | 370/352 |
| 2004/0148432 A1* | 7/2004 | Udono et al. | 709/238 |
| 2004/0151204 A1* | 8/2004 | Eguchi et al. | 370/465 |
| 2004/0214588 A1* | 10/2004 | Tanimoto | 455/466 |
| 2004/0255048 A1 | 12/2004 | Lev Ran et al. | |
| 2005/0076098 A1 | 4/2005 | Matsubara et al. | |
| 2006/0083171 A1 | 4/2006 | Tanaike et al. | |
| 2006/0206616 A1 | 9/2006 | Brown | |
| 2006/0256771 A1 | 11/2006 | Yarlagadda | |
| 2006/0282540 A1 | 12/2006 | Tanimoto | |
| 2007/0022477 A1 | 1/2007 | Larson | |
| 2007/0233844 A1 | 10/2007 | Tanimoto | |
| 2008/0002727 A1* | 1/2008 | Yamane | 370/401 |
| 2008/0025299 A1* | 1/2008 | Agarwal et al. | 370/389 |
| 2008/0089349 A1 | 4/2008 | Tanimoto | |
| 2008/0098088 A1 | 4/2008 | Tamano et al. | |
| 2008/0288591 A1 | 11/2008 | Tanimoto | |

FOREIGN PATENT DOCUMENTS

| | | |
|---|---|---|
| EP | 1 526 471 A1 | 4/2005 |
| EP | 1 657 939 A1 | 5/2006 |
| GB | 2 350 269 A | 11/2000 |
| JP | 56-025880 B2 | 3/1981 |
| JP | 61-225957 A | 10/1986 |
| JP | 04-105143 A | 4/1992 |
| JP | 07-162448 A | 6/1995 |
| JP | 07-319784 A | 12/1995 |
| JP | 09-288608 A | 11/1997 |
| JP | 10-177548 A | 6/1998 |
| JP | 11-234270 A | 8/1999 |
| JP | 11-272534 A | 10/1999 |
| JP | 11-313059 A | 11/1999 |
| JP | 2000-115167 A | 4/2000 |
| JP | 2001-014254 A | 1/2001 |
| JP | 2001-184289 A | 7/2001 |
| JP | 2001-292167 A | 10/2001 |
| JP | 2002-007182 A | 1/2002 |
| JP | 2002-199150 A | 7/2002 |
| JP | 2002-217943 A | 8/2002 |
| JP | 2002-269059 A | 9/2002 |
| JP | 2002-288415 A | 10/2002 |
| JP | 2002-314573 A | 10/2002 |
| JP | 2003-032310 A | 1/2003 |
| JP | 2004-013479 A | 1/2004 |
| JP | 2004-201255 A | 7/2004 |
| JP | 2004-310371 A | 11/2004 |
| JP | 2005-027040 A | 1/2005 |
| JP | 2005-115943 A | 4/2005 |
| JP | 2006-033105 A | 2/2006 |
| JP | 2006-268138 A | 10/2006 |
| JP | 2006-343943 A | 12/2006 |
| JP | 2007-265135 A | 10/2007 |
| JP | 2007-267136 A | 10/2007 |
| JP | 2008-098699 A | 4/2008 |
| JP | 2008-098888 A | 4/2008 |
| JP | 2008-148125 A | 6/2008 |
| JP | 2008-154101 A | 7/2008 |
| JP | 2008-306500 A | 12/2008 |
| JP | 2009-027652 A | 2/2009 |
| JP | 2009-163300 A | 7/2009 |
| JP | 2009-163302 A | 7/2009 |
| JP | 2009-252159 A | 10/2009 |
| JP | 2009-265919 A | 11/2009 |
| WO | 03/012578 A2 | 2/2003 |

OTHER PUBLICATIONS

Tanimoto; "Relay Server, Communication System and Facsimile System"; U.S. Appl. No. 10/045,897, filed Jan. 10, 2002.

Tanimoto; "Relay Server for Relaying Communications Between Network Devices"; U.S. Appl. No. 10/114,720, filed Apr. 1, 2002.

Tanimoto; "Relay Server"; U.S. Appl. No. 10/114,963, filed Apr. 2, 2002.

Tanimoto; "Relay Server, Network Device, Communication System, and Communication Method"; U.S. Appl. No. 10/116,615, filed Apr. 2, 2002.

Masuda et al.; "Multicast Network Control for Streaming Data Broadcasting"; IEICE Technical Report, vol. 100, No. 672; pp. 327-334; Mar. 9, 2001.

Tanimoto: "Relay-Server," U.S. Appl. No. 11/853,943, filed Sep. 12, 2007.

Tanimoto: "File Server Device," U.S. Appl. No. 11/862,654, filed Sep. 27, 2007.

Tanimoto: "File Transfer Server," U.S. Appl. No. 11/870,622, filed Oct. 11, 2007.

Tanimoto: "Relay Server, Relay Communication System, and Communication Device," U.S. Appl. No. 11/944,495, filed Nov. 23, 2007.

Tanimoto: "Relay Server and Client Terminal," U.S. Appl. No. 11/953,351, filed Dec. 10, 2007.

Tanimoto: "Relay Server and Relay Communication System," U.S. Appl. No. 12/103,933, filed Apr. 16, 2008.

Tanimoto: "Relay Server and Relay Communication System," U.S. Appl. No. 12/112,127, filed Apr. 30, 2008.

Tanimoto: "Relay Server and Relay Communication System," U.S. Appl. No. 12/107,793, filed Apr. 23, 2008.

Official communication issued in counterpart European Application 07024008.0, mailed on Jul. 17, 2008.

Traversat et al.: "Project JXTA 2.0 Super-Peer Virtual Network," XP-002481407; Sun Microsystems, Project JXTA; May 25, 2003; pp. 1-20.

Roach: "Session Initiation protocol (SIP)- Specific Event Notification," Dynamicsoft; Jun. 1, 2002; pp. 1-38.

Roach et al.: "A Session Initiation Protocol (SIP) Event Notifciation Extension For Resource Lists," Cisco Systems; Aug. 1, 2006; pp. 1-38.

Tanimoto: "Relay Server and Relay Communication System," U.S. Appl. No. 12/335,642, filed Dec. 16, 2008.

Tanimoto: "Relay Server and Relay Communication System," U.S. Appl. No. 12/335,661, filed Dec. 16, 2008.
Tanimoto: "Relay Server and Relay Communication System," U.S. Appl. No. 12/340,868, filed Dec. 22, 2008.
Official Communication issued in corresponding European Patent Application No. 07024008.0, mailed on Dec. 2, 2009.
Pang et al., "Mobility and Session Management: UMTS VS. CDMA2000", IEEE Wireless Communications, Aug. 2004, pp. 30-43.
Cappiello et al., "Mobility Amongst Heterogeneous Networks With AAA Support", Proceedings of IEEE International Conference on Communications, Apr. 28-May 2, 2002, pp. 2064-2069.
Shinji Okumura et al., SIP (session initiation protocol), Nikkei Communications, Sep. 22, 2003, pp. 150-158 (partial translation pp. 155-156 (Usable in IM and Presence Notification)).
Tanimoto, "Relay Server and Relay Communication System," U.S. Appl. No. 12/270,883, filed Nov. 14, 2008.
Official Communication issued in U.S. Appl. No. 11/723,466, mailed on Nov. 8, 2010.
Tanimoto; "Relay Device and Communication System"; U.S. Appl. No. 11/723,466; filed on Mar. 20, 2007.
Tanimoto; "Relay Server, Communication System and Facsimile System"; U.S. Appl. No. 10/045,698; filed Jan. 10, 2002.
Tanimoto; "Relay Server, Communication System and Facsimile System"; U.S. Appl. No. 10/045,897; filed Jan. 10, 2002.
Tanimoto; "Relay Server for Relaying Communications Between Network Devices"; U.S. Appl. No. 10/114,720; filed Apr. 1, 2002.
Tanimoto; "Relay Server"; U.S. Appl. No. 10/114,963; filed Apr. 2, 2002.
Tanimoto; "Relay Server, Network Device, Communication System, and Communication Method"; U.S. Appl. No. 10/116,615; filed Apr. 2, 2002.
Masuda et al.; "Multicast Network Control for Streaming Data Broadcasting"; IEICE Technical Report, vol. 100, No. 672; pp. 327-334; Mar. 9, 2001.
"An Old-Timer of Character Chat IRC"; Mac Fan Internet; vol. 4, No. 6; p. 33; Jun. 1999.
English translation of Official Communication issued in corresponding Japanese Patent Application No. 2006-334652, mailed on Jun. 8, 2010.
English translation of Offical Communication issued in corresponding Japanese Patent Application No. 2007-152122, mailed in Jun. 2, 2010.
Tanimoto, "Relay Server and Relay Communication System", U.S. Appl. No. 13/061,234, filed Feb. 28, 2011.
Tanimoto, "Relay Server, Relay Communication System, and Communication Apparatus", U.S. Appl. No. 13/061,725, filed Mar. 2, 2011.
Official Communication issued in International Patent Application No. PCT/JP2010/001594, mailed on Mar. 30, 2010.
Official Communication issued in International Patent Application No. PCT/JP2010/003240, mailed on Jun. 15, 2010.
Official Communication issued in International Patent Application No. PCT/JP2010/005041, mailed on Nov. 22, 2010.
Official Communication issued in International Patent Application No. PCT/JP2010/005679, mailed on Oct. 26, 2010.
Official Communication issued in International Patent Application No. PCT/JP2010/005680, mailed on Oct. 26, 2010.
Hitoshi, "Network World", vol. 9, No. 12, Dec. 1, 2004, pp. 148-150.
Official Communication issued in corresponding Japanese Patent Application No. 2007-339311, mailed on Apr. 8, 2011.
"Error & Warning Message Ways of Coping, Nikkei Personal Computer", Nikkei Business Publications, Inc., May 10, 2007.
Official Communication issued in corresponding European Patent Application No. 08007866.0, mailed on Apr. 19, 2011.

* cited by examiner

FIG. 6

RELAY GROUP INFORMATION CREATED IN (2), (3)

```
<?xml version="1.0" encoding="Shift_JIS" ?>
<relay-policy policy-id="20061001150032@relay-server1" >
  <policy-info>

<relay-account account="relay-server1@net" name="BRANCH A" >
    <user-account account="user1A@account" name="terminal1A" group="0001" />
    <user-account account="user1B@account" name="terminal1B" group="0001" />
  </relay-account>

<relay-account account="relay-server2@net" name="BRANCH B" >
    <user-account account="user2A@account" name="terminal2A" group="0002" />
    <user-account account="user2B@account" name="terminal2B" group="0002" />
  </relay-account>

<relay-account account="relay-server3@net" name="BRANCH C" >
    <user-account account="user3A@account" name="terminal3A" group="0003" />
    <user-account account="user3B@account" name="terminal3B" group="0003" />
  </relay-account>

</policy-info>
</relay-policy>
```

SHARED RESOURCE INFORMATION

```xml
<?xml version="1.0" encoding="Shift_JIS" ?>
<user-account account="user1A@account" >
<policy name="user1A-policy01" policy-id="20061001150032user1A@relay-server1" >
  <family-account-info>
    <user-account account="user1A@account" />
    <user-account account="user2A@account" />
    <user-account account="user3A@account" />
  </family-account-info>
  <family-resource-info>
    <resource name="folderA" owner="user1A@account" value="c:/folderA" >
      <resource name="file001.xls" owner="user1A@account" value="c:/folderA/file001.xls" />
      <resource name="file002.wrd" owner="user1A@account" value="c:/folderA/file002.wrd" />
    </resource>
    <resource name="file003.pdf" owner="user1A@account" value="c:/folderB/file003.pdf" />
  </family-resource-info>
</policy>
<policy name="user2B-policy02" policy-id="20061001152532user2B@relay-server2" >
  <family-account-info>
    <user-account account="user1A@account" />
    <user-account account="user2B@account" />
    <user-account account="user3B@account" />
  </family-account-info>
  <family-resource-info>
    <resource name="folderC" owner="user2B@account" value="c:/folderC" >
      <resource name="file00A.ppt" owner="user2B@account" value="c:/folderC/file00A.ppt" />
      <resource name="file00B.ppt" owner="user2B@account" value="c:/folderC/file00B.ppt" />
    </resource>
  </family-resource-info>
</policy>
</user-account>
```

FIG. 13

SHARED RESOURCE INFORMATION UPDATED IN (5)

```xml
<?xml version="1.0" encoding="Shift_JIS" ?>
<user-account account="user1A@account" >
  <policy name="user1A-policy01" policy-id="20061001150032user1A@relay-server1" >
    <family-account-info>
      <user-account account="user1A@account" />
      <user-account account="user2A@account" />
      <user-account account="user3A@account" />
    </family-account-info>
    <family-resource-info>
      <resource name="folderA" owner="user1A@account" value="c:/folderA" >
        <resource name="file001.xls" owner="user1A@account" value="c:/folderA/file001.xls" />
        <resource name="file002.wrd" owner="user1A@account" value="c:/folderA/file002.wrd" />
      </resource>
      <resource name="file003.pdf" owner="user1A@account" value="c:/folderB/file003.pdf" />
    </family-resource-info>
  </policy>
</user-account>
```

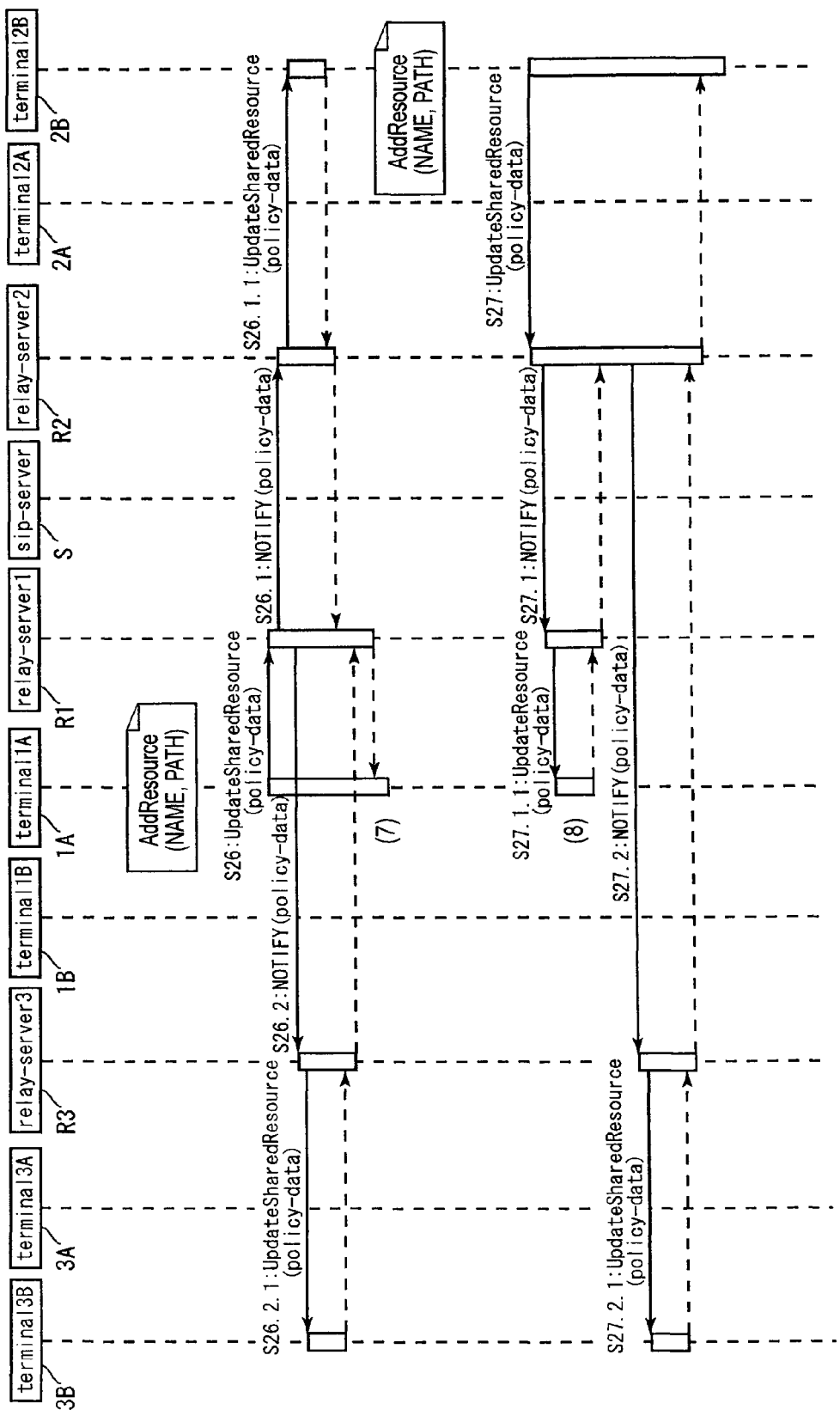

FIG. 16

SHARED RESOURCE INFORMATION UPDATED TO user1A IN (7)

```xml
<?xml version="1.0" encoding="Shift_JIS" ?>
<user-account account="user1A@account" >

<policy name="user1A-policy01" policy-id="20061001150032user1A@relay-server1" >
  <family-account-info>
    <user-account account="user1A@account" />
    <user-account account="user2A@account" />
    <user-account account="user3A@account" />
  </family-account-info>
  <family-resource-info>
    <resource name="folderA" owner="user1A@account" value="c:/folderA" >
      <resource name="file001.xls" owner="user1A@account" value="c:/folderA/file001.xls" />
      <resource name="file002.wrd" owner="user1A@account" value="c:/folderA/file002.wrd" />
    </resource>
    <resource name="file003.pdf" owner="user1A@account" value="c:/folderB/file003.pdf" />
  </family-resource-info>
</policy>

<policy name="user2B-policy02" policy-id="20061001152532user2B@relay-server2" >
  <family-account-info>
    <user-account account="user1A@account" />
    <user-account account="user2B@account" />
    <user-account account="user3B@account" />
  </family-account-info>
  <family-resource-info>
    <resource name="file005.ppt" owner="user1A@account" value="c:/file005.ppt" />
  </family-resource-info>
</policy>

</user-account>
```

120d

122a — {policy name="user2B-policy02" block}

123a — "20061001152532user2B@relay-server2"

125b — family-resource-info block

FIG. 17

SHARED RESOURCE INFORMATION UPDATED TO user1A IN (8)                                               120e

```xml
<?xml version= "1.0" encoding= "Shift_JIS" ?>
<user-account account= "user1A@account" >
<policy name= "user1A-policy01" policy-id= "20061001150032user1A@relay-server1" >
  <family-account-info>
    <user-account account= "user1A@account" />
    <user-account account= "user2A@account" />
    <user-account account= "user3A@account" />
  </family-account-info>
  <family-resource-info>
    <resource name= "folderA" owner= "user1A@account" >
      <resource name= "file001.xls" owner= "user1A@account" value= "c:/folderA" >
      <resource name= "file002.wrd" owner= "user1A@account" value= "c:/folderA/file001.xls" />
    </resource>                                        value= "c:/folderA/file002.wrd" />
    <resource name= "file003.pdf" owner= "user1A@account" value= "c:/folderB/file003.pdf" />
  </family-resource-info>
</policy>
<policy name= "user2B-policy02" policy-id= "20061001152532user2B@relay-server2" >
  <family-account-info>
    <user-account account= "user1A@account" />
    <user-account account= "user2B@account" />
    <user-account account= "user3B@account" />
  </family-account-info>
  <family-resource-info>
    <resource name= "file005.ppt" owner= "user1A@account" value= "c:/file005.ppt" />
    <resource name= "folderC" owner= "user2B@account" value= "c:/folderC" >
      <resource name= "file00A.ppt" owner= "user2B@account" value= "c:/folderC/file00A.ppt" />
      <resource name= "file00B.ppt" owner= "user2B@account" value= "c:/folderC/file00B.ppt" />
    </resource>
  </family-resource-info>
</policy>
</user-account>
```

SHARED RESOURCE INFORMATION UPDATED DUE TO DELETION OF FILE IN (9)  /120f

```xml
<?xml version="1.0" encoding="Shift_JIS" ?>
<user-account account= "user1A@account" >
    <policy name= "user1A-policy01" policy-id= "20061001150032user1A@relay-server1" >
        <family-account-info>
            <user-account account= "user1A@account" />
            <user-account account= "user2A@account" />
            <user-account account= "user3A@account" />
        </family-account-info>
        <family-resource-info>
            <resource name= "folderA" owner= "user1A@account" value= "c:/folderA" >
                <resource name= "file001.xls" owner= "user1A@account" value= "c:/folderA/file001.xls" />
                <resource name= "file002.wrd" owner= "user1A@account" value= "c:/folderA/file002.wrd" />
            </resource>
            <resource name= "file003.pdf" owner= "user1A@account" value= "c:/folderB/file003.pdf" />
        </family-resource-info>
    </policy>
    <policy name= "user2B-policy02" policy-id= "20061001152532user2B@relay-server2" >
        <family-account-info>
            <user-account account= "user1A@account" />
            <user-account account= "user2B@account" />
            <user-account account= "user3B@account" />
        </family-account-info>
        <family-resource-info>
            <resource name= "file005.ppt" owner= "user2B@account" value= "c:/file005.ppt" />
            <resource name= "folderC" owner= "user2B@account" value= "c:/folderC" >
                <resource name= "file00B.ppt" owner= "user2B@account" value= "c:/folderC/file00B.ppt" />
            </resource>
        </family-resource-info>
    </policy>
</user-account>
```

122a

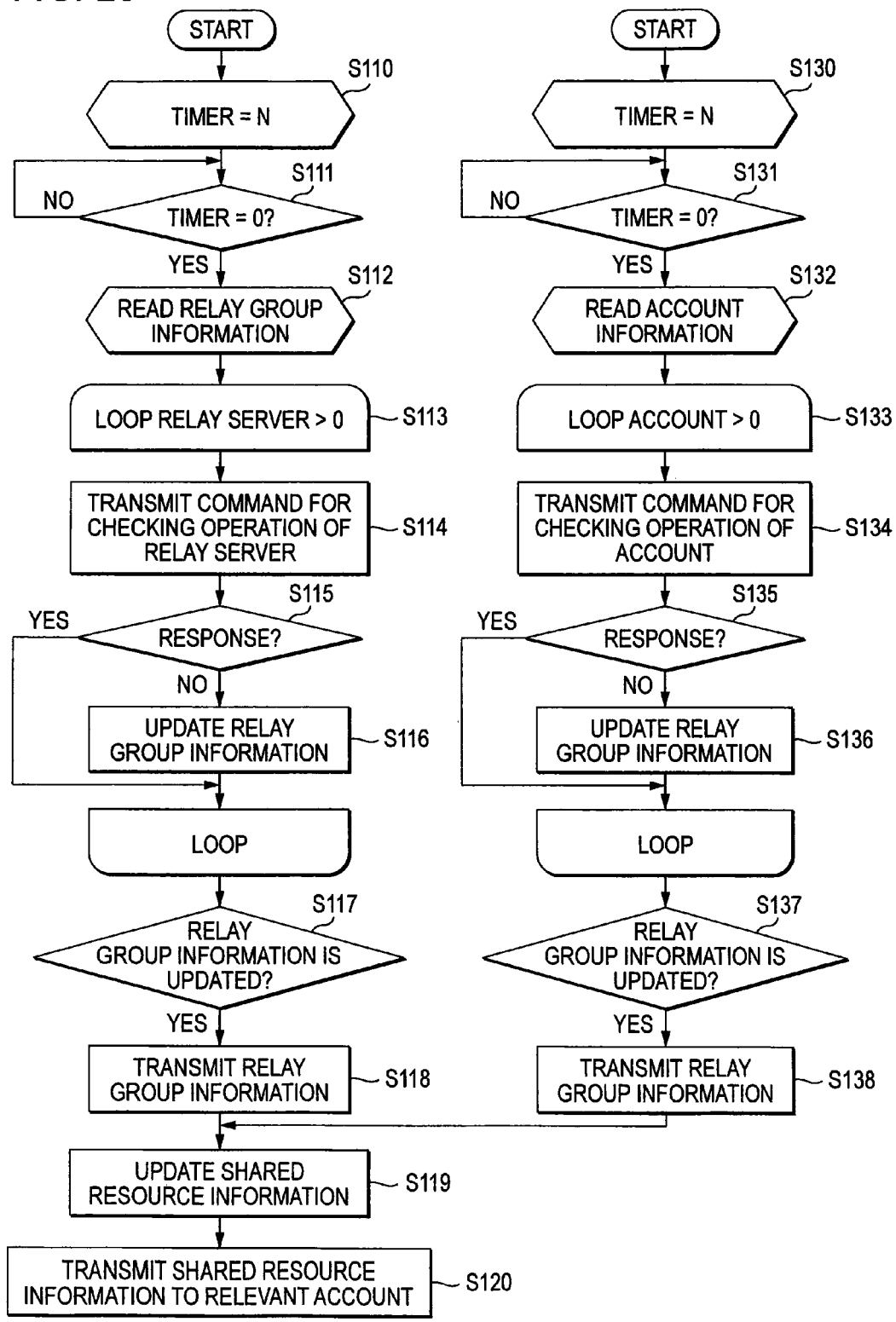

FIG. 22

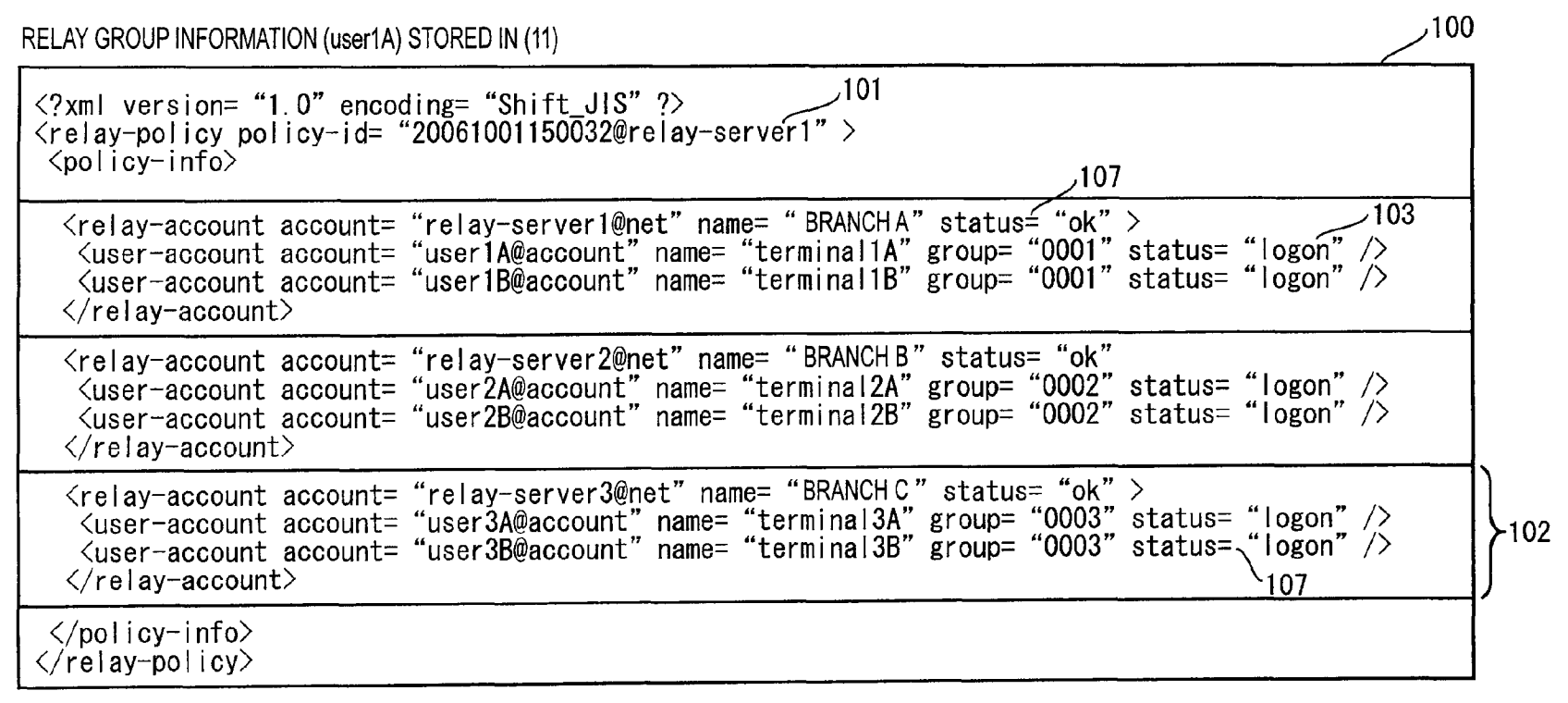

RELAY GROUP INFORMATION (user1A) STORED IN (11)

```
<?xml version= "1.0" encoding= "Shift_JIS" ?>
<relay-policy policy-id= "20061001150032@relay-server1" >
<policy-info>

<relay-account account= "relay-server1@net" name= "BRANCH A" status= "ok" >
  <user-account account= "user1A@account" name= "terminal1A" group= "0001" status= "logon" />
  <user-account account= "user1B@account" name= "terminal1B" group= "0001" status= "logon" />
</relay-account>

<relay-account account= "relay-server2@net" name= "BRANCH B" status= "ok" >
  <user-account account= "user2A@account" name= "terminal2A" group= "0002" status= "logon" />
  <user-account account= "user2B@account" name= "terminal2B" group= "0002" status= "logon" />
</relay-account>

<relay-account account= "relay-server3@net" name= "BRANCH C" status= "ok" >
  <user-account account= "user3A@account" name= "terminal3A" group= "0003" status= "logon" />
  <user-account account= "user3B@account" name= "terminal3B" group= "0003" status= "logon" />
</relay-account>

</policy-info>
</relay-policy>
```

FIG. 23

SHARED RESOURCE INFORMATION (user1A) STORED IN (11)

```xml
<?xml version="1.0" encoding="Shift_JIS" ?>
<user-account account="user1A@account" >
  <policy name="user1A-policy01" policy-id="20061001150032user1A@relay-server1" >
    <family-account-info>
      <user-account account="user1A@account" />
      <user-account account="user2A@account" />
      <user-account account="user3A@account" />
    </family-account-info>
    <family-resource-info>
      <resource name="folderA" owner="user1A@account" value="c:/folderA" status="ok" >
        <resource name="file001.xls" owner="user1A@account" value="c:/folderA/file001.xls" status="ok" />
        <resource name="file002.wrd" owner="user1A@account" value="c:/folderA/file002.wrd" status="ok" />
      </resource>
      <resource name="file003.pdf" owner="user3A@account" value="c:/folderB/file003.pdf" status="ok" />
    </family-resource-info>
  </policy>
  <policy name="user2B-policy02" policy-id="20061001152253user2B@relay-server2" >
    <family-account-info>
      <user-account account="user1A@account" />
      <user-account account="user2B@account" />
      <user-account account="user3B@account" />
    </family-account-info>
    <family-resource-info>
      <resource name="folderC" owner="user2B@account" value="c:/folderC" status="ok" >
        <resource name="file00A.ppt" owner="user2B@account" value="c:/folderC/file00A.ppt" status="ok" />
        <resource name="file00B.ppt" owner="user2B@account" value="c:/folderC/file00B.ppt" status="ok" />
      </resource>
    </family-resource-info>
  </policy>
</user-account>
```

FIG. 24

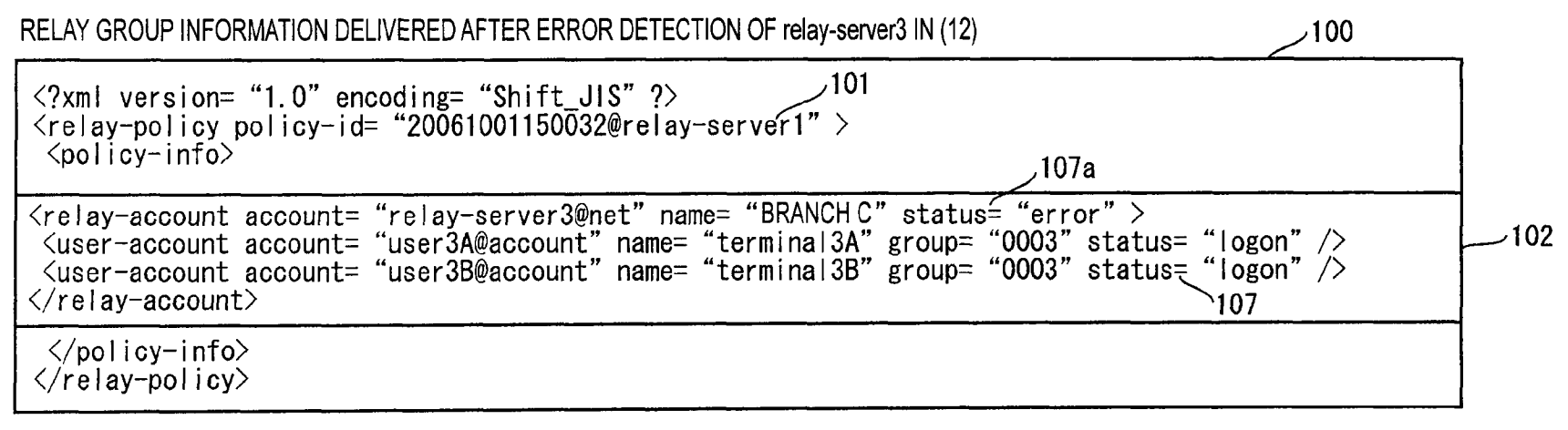

RELAY GROUP INFORMATION DELIVERED AFTER ERROR DETECTION OF relay-server3 IN (12)

```
<?xml version="1.0" encoding="Shift_JIS" ?>
<relay-policy policy-id="20061001150032@relay-server1" >
  <policy-info>

<relay-account account="relay-server3@net" name="BRANCH C" status="error" >
      <user-account account="user3A@account" name="terminal3A" group="0003" status="logon" />
      <user-account account="user3B@account" name="terminal3B" group="0003" status="logon" />
    </relay-account>

</policy-info>
</relay-policy>
```

FIG. 25

SHARED RESOURCE INFORMATION DELIVERED AFTER ERROR DETECTION OF relay-server3 IN (12)

```
<?xml version= "1.0" encoding= "Shift_JIS" ?>               ~121
<user-account account= "user1A@account" >                    ~120
  <policy name= "user1A-policy01" policy-id= "20061001150032user1A@relay-server1" >
    <family-account-info>
      <user-account account= "user1A@account" />
      <user-account account= "user2A@account" />
      <user-account account= "user3A@account" />
    </family-account-info>
    <family-resource-info>
      <resource name= "folderA" owner= "user1A@account" status= "ok" >
        <resource name= "file001.xls" owner= "user1A@account" value= "c:/folderA/file001.xls" status= "ok" />
        <resource name= "file002.wrd" owner= "user1A@account" value= "c:/folderA/file002.wrd" status= "ok" />
      </resource>
      <resource name= "file003.pdf" owner= "user3A@account" value= "c:/folderB/file003.pdf" status= "error" />
    </family-resource-info>                                                                              ~127a
  </policy>
</user-account>
```

RELAY GROUP INFORMATION DELIVERED AFTER ERROR DETECTION OF ACCOUNT (user2B) IN (13)

```
<?xml version= "1.0" encoding= "Shift_JIS" ?>
<relay-policy policy-id= "20061001150032@relay-server1" >    ~101
 <policy-info>

<relay-account account= "relay-server2@net" name= "BRANCH B" status= "ok" />
   <user-account account= "user2A@account" name= "terminal2A" group= "0002" status= "logon" />
   <user-account account= "user2B@account" name= "terminal2B" group= "0002" status= "logoff" />
  </relay-account>

</policy-info>
</relay-policy>
```

SHARED RESOURCE INFORMATION DELIVERED AFTER ERROR DETECTION OF ACCOUNT (user2B) IN (13)

```
<?xml version= "1.0" encoding= "Shift_JIS" ?>     ~121
<user-account account= "user1A@account" >

<policy name= "user2B-policy02" policy-id= "20061001152532user2B@relay-server2" >   ~123
  <family-account-info>
    <user-account account= "user1A@account" />  ⎫
    <user-account account= "user2B@account" />  ⎬ ~124
    <user-account account= "user3B@account" />  ⎭
  </family-account-info>
  <family-resource-info>
    <resource name= "folderC" owner= "user2B@account" value= "c:/folderC" status= "error" >
      <resource name= "file00A.ppt" owner= "user2B@account" value= "c:/folderC/file00A.ppt" status= "error" />
      <resource name= "file00B.ppt" owner= "user2B@account" value= "c:/folderC/file00B.ppt" status= "error" />   ~127b
    </resource>
  </family-resource-info>
</policy>

</user-account>
```

FIG. 30

RELAY GROUP INFORMATION STORED IN (21)

```xml
<?xml version="1.0" encoding="Shift_JIS" ?>
<relay-policy policy-id="20061001150032@relay-server1" >
 <policy-info>

<relay-account account="relay-server1@net" name="BRANCH A" status="ok" >
  <user-account account="user1A@account" name="terminal1A" group="0001" status="logon" server="relay-server1" />
  <user-account account="user1B@account" name="terminal1B" group="0001" status="logon" server="relay-server1" />
 </relay-account>

<relay-account account="relay-server2@net" name="BRANCH B" status="ok" >
  <user-account account="user2A@account" name="terminal2A" group="0002" status="logon" server="relay-server2" />
  <user-account account="user2B@account" name="terminal2B" group="0002" status="logon" server="relay-server2" />
 </relay-account>

<relay-account account="relay-server3@net" name="BRANCH C" status="ok" >
  <user-account account="user3A@account" name="terminal3A" group="0003" status="logon" server="relay-server3" />
  <user-account account="user3B@account" name="terminal3B" group="0003" status="logon" server="relay-server3" />
 </relay-account>

</policy-info>
</relay-policy>
```

SHARED RESOURCE INFORMATION STORED IN (21) (user1A, user2A, user3A)

```xml
<?xml version= "1.0" encoding= "Shift_JIS" ?>
<user-account account= "user1A@account" >

<policy name= "user1A-policy01" policy-id= "20061001150032user1A@relay-server1" >
        <family-account-info>
            <user-account account= "user1A@account" />
            <user-account account= "user2A@account" />
            <user-account account= "user3A@account" />
        </family-account-info>
        <family-resource-info>
            <resource name= "folderA" owner= "user1A@account" value= "c:/folderA" status= "ok" >
                <resource name= "file001.xls" owner= "user1A@account" value= "c:/folderA/file001.xls" status= "ok" />
                <resource name= "file002.wrd" owner= "user1A@account" value= "c:/folderA/file002.wrd" status= "ok" />
            </resource>
            <resource name= "folderNet" owner= "user1A@account" value= "//network/z:/folderZ" status= "ok" >
                <resource name= "file002X.xls" owner= "user1A@account" value= "//network/z://folderZ/file002X.xls" status= "ok" />
                <resource name= "file002Y.wrd" owner= "user1A@account" value= "//network/z://folderZ/file002Y.wrd" status= "ok" />
            </resource>
            <resource name= "file003.pdf" owner= "user3A@account" value= "c:/folderB/file003.pdf" status= "ok" />
        </family-resource-info>
    </policy>

</user-account>
```

SHARED GROUP INFORMATION UPDATED/DELIVERED IN (22) (user1A, user2A, user3A)

120h

```xml
<?xml version="1.0" encoding="Shift_JIS" ?>
<user-account account="user1A@account" >

<policy name="user1A-policy01" policy-id="20061001150032user1A@relay-server1" >
  <family-account-info>
    <user-account account="user1A@account" />
    <user-account account="user2A@account" />
    <user-account account="user3A@account" />
  </family-account-info>
  <family-resource-info>
    <resource name="folderA" owner="user1A@account" value="c:/folderA" status="error" >         127a
      <resource name="file001.xls" owner="user1A@account" value="c:/folderA/file001.xls" status="error" />
      <resource name="file002.wrd" owner="user1A@account" value="c:/folderA/file002.wrd" status="error" />
    </resource>
    <resource name="folderNet" owner="user1A@account" value="//network/z:/folderZ" status="error" >
      <resource name="file00ZX.xls" owner="user1A@account" value="//network/z:/folderZ/file00ZX.xls" status="error" />
      <resource name="file00ZY.wrd" owner="user1A@account" value="//network/z:/folderZ/file00ZY.wrd" status="error" />
    </resource>
    <resource name="file003.pdf" owner="user3A@account" value="c:/folderB/file003.pdf" status="ok" />        127
  </family-resource-info>
</policy>

</user-account>
```

FIG. 34

RELAY GROUP INFORMATION UPDATED/DELIVERED IN (23)

```
<?xml version="1.0" encoding="Shift_JIS" ?>
<relay-policy policy-id="20061001150032@relay-server1" >
  <policy-info>

<relay-account account="relay-server1@net" name="BRANCHA" status="ok" >
      <user-account account="user1A@account" name="terminal1A" group="0001" status="logon" server="relay-server2" />
      <user-account account="user1B@account" name="terminal1B" group="0001" status="logon" server="relay-server1" />
    </relay-account>

</policy-info>
</relay-policy>
```

SHARED RESOURCE INFORMATION UPDATED/DELIVERED IN (24) (user1A, user2A, user3A)

```
<?xml version="1.0" encoding="Shift_JIS" ?>
<user-account account="user1A@account" >

<policy name="user1A-policy01" policy-id="20061001150032user1A@relay-server1" >
  <family-account-info>
    <user-account account="user1A@account" />
    <user-account account="user2A@account" />
    <user-account account="user3A@account" />
  </family-account-info>
  <family-resource-info>
    <resource name="folderA" owner="user1A@account" value="c:/folderA" status="ok" >
      <resource name="file001.xls" owner="user1A@account" value="c:/folderA/file001.xls" status="ok" />
      <resource name="file002.wrd" owner="user1A@account" value="c:/folderA/file002.wrd" status="ok" />
    </resource>
    <resource name="folderNet" owner="user1A@account" value="//network/z:/folderZ" status="error" >
      <resource name="file00ZX.xls" owner="user1A@account" value="//network/z://folderZ/file00ZX.xls" status="error" />
      <resource name="file00ZY.wrd" owner="user1A@account" value="//network/z://folderZ/file00ZY.wrd" status="error" />
    </resource>
    <resource name="file003.pdf" owner="user3A@account" value="c:/folderB/file003.pdf" status="ok" />
  </family-resource-info>
</policy>

</user-account>
```

SHARED RESOURCE INFORMATION IN INITIAL STATE (user1A)

```
<?xml version= "1.0" encoding= "Shift_JIS" ?>
<user-account account= "user1A@account" >
<policy name= "user1A-policy01" policy-id= "20061001150032user1A@relay-server1" >
  <family-account-info>
    <user-account account= "user1A@account" />
    <user-account account= "user2A@account" />
    <user-account account= "user3A@account" />
  </family-account-info>
  <family-resource-info>
    <resource name= "folderA" owner= "user1A@account" value= "c:/folderA" status= "ok" >
      <resource name= "file001.xls" owner= "user1A@account" value= "c:/folderA/file001.xls" status= "ok" />
      <resource name= "file002.wrd" owner= "user1A@account" value= "c:/folderA/file002.wrd" status= "ok" />
    </resource>
    <resource name= "file003.pdf" owner= "user3A@account" value= "c:/folderB/file003.pdf" status= "ok" />
  </family-resource-info>
</policy>
</user-account>
```

FIG. 41

SHARED RESOURCE INFORMATION UPDATED/DELIVERED IN FILE COPY OF (31) (user1A)  ⟶ 120j

```
<?xml version="1.0" encoding="Shift_JIS" ?>                                          ⟶ 121
<user-account account="user1A@account" >
  <policy name="user1A-policy01" policy-id="20061001150032user1A@relay-server1" > ⟶ 123
    <family-account-info>
      <user-account account="user1A@account" />  ⎫
      <user-account account="user2A@account" />  ⎬ 124
      <user-account account="user3A@account" />  ⎭
    </family-account-info>
    <family-resource-info>                                                    127
      <resource name="folderA" owner="user1A@account" value="c:/folderA" status="ok" >
        <resource name="file001.xls" owner="user1A@account" value="c:/folderA/file001.xls" status="ok" />  ⟶ 126a
        <resource name="file002.wrd" owner="user1A@account" value="c:/folderA/file002.wrd" status="ok" />
      </resource>                                   128a
      <resource name="file003C.pdf" owner="user3A@account" value="c:/folderB/file003.pdf" status="ok" />  ⟶ 126t
                                            129a
    </family-resource-info>
  </policy>
</user-account>
```
125

FIG. 43

SHARED RESOURCE INFORMATION UPDATED/DELIVERED IN FILE COPY OF (32) (user1A)

```xml
<?xml version= "1.0" encoding= "Shift_JIS" ?>
<user-account account= "user1A@account" >
  <policy name= "user1A-policy01" policy-id= "20061001150032user1A@relay-server1" >
    <family-account-info>
      <user-account account= "user1A@account" />
      <user-account account= "user2A@account" />           }124
      <user-account account= "user3A@account" />
    </family-account-info>
    <family-resource-info>
      <resource name= "folderA" owner= "user1A@account" value= "c:/folderA" status= "ok" >
        <resource name= "file001.xls" owner= "user1A@account" value= "c:/folderA/file001.xls" status= "ok" />
        <resource name= "file002.wrd" owner= "user1A@account" value= "c:/folderA/file002.wrd" status= "ok" />      126
      </resource>
      <resource name= "file003.pdf" owner= "user3A@account" value= "c:/folderB/file003.pdf" status= "ok" />
    </family-resource-info>
  </policy>
</user-account>
```

125 { (brace encompassing policy block)

126 (arrow pointing to file001.xls line)

SHARED RESOURCE INFORMATION UPDATED/DELIVERED IN FILE COPY OF (33) (user1A)

```xml
<?xml version="1.0" encoding="Shift_JIS" ?>
<user-account account="user1A@account" >
  <policy name="user1A-policy01" policy-id="20061001150032user1A@relay-server1" >
    <family-account-info>
      <user-account account="user1A@account" />
      <user-account account="user2A@account" />
      <user-account account="user3A@account" />
    </family-account-info>
    <family-resource-info>
      <resource name="folderA" owner="user1A@account" value="c:/folderA" status="ok" >
        <resource name="file001.xls" owner="user1A@account" value="c:/folderA/file001.xls" status="ok" />
        <resource name="file002.wrd" owner="user1A@account" value="c:/folderA/file002.wrd" status="ok" />
        <resource name="file003C.pdf" owner="user1A@account" value="c:/folderA/file003C.pdf" status="ok" />
      </resource>
      <resource name="file003.pdf" owner="user3A@account" value="c:/folderB/file003.pdf" status="ok" />
    </family-resource-info>
  </policy>
</user-account>
```

RELAY SERVER AND RELAY COMMUNICATION SYSTEM ARRANGED TO SHARE RESOURCES BETWEEN NETWORKS

CROSS-REFERENCE TO RELATED APPLICATIONS

This application claims priority under 35 U.S.C. 119 to Japanese Patent Application No. 2006-333500, filed on Dec. 11, 2006, No. 2006-335539, filed on Dec. 13, 2006, and No. 2006-341335, filed on Dec. 19, 2006, which applications are hereby incorporated by reference in their entirety.

BACKGROUND OF THE INVENTION

1. Field of the Invention

The present invention relates to a relay communication system which can enable communications with a terminal in a different local area network (LAN) over a wide area network (WAN) and a relay server used in the system, and more particularly, to a technology of allowing a terminal in a LAN to operate resources retained by a terminal in a different LAN.

2. Description of the Related Art

A communication technology called a virtual private network (VPN) is known. By using this communication technology, it is possible to use a remote LAN like a directly connected network. For example, terminals connected to LANs of plural branches provided in local areas, respectively, can communicate with each other over the Internet.

Various systems for such a type of technology have been suggested (for example, see Japanese Unexamined Patent Publication No. 2002-217938).

BRIEF SUMMARY OF THE INVENTION

However, such a type of system tends to be stiff because a network is virtually constructed. Accordingly, it is not easy to construct an expansible and flexible system and the suggested systems have both merits and demerits in function, cost, and the like.

For example, since resources in a LAN are managed under the same protocol and the system configuration is not much complicated, plural terminals can easily share the resources. However, when a communication system includes plural LANs over a WAN, it is not possible to easily cope with such intention that resources such as folders are shared with plural terminals or files or that a file retained by a terminal is deleted by a different terminal. This is also true in a case where different protocols are used in the LANs.

The resources retained by the terminals vary endlessly due to deletion or movement thereof, but it is not easy to dynamically cope with such a variation.

Access statuses of specific relay points or terminals constructing a system also vary endlessly due to ON/OFF of a power source or log ON/OFF. The system may be downed for some reasons. It is not also easy to dynamically cope with the variation in access status.

A terminal registered in a LAN may move to another LAN. In this case, the access setting varies in a movement source and a movement destination and it is thus necessary to sequentially update the management setting of a resource managed by the terminal with the variation.

There is a need for a flexible communication system which can select a resource handling method depending on the situations.

An object of the invention is to provide a relay communication system which can be easily operated and which can allow terminals to share and operate a resource with a necessary opposite terminal even when the terminals are connected to different LANs and managed under different protocols. Another object of the invention is to provide a relay server used for the system. Still another object of the invention is to provide a dynamic relay communication system which has excellent expansibility and flexibility and which can cope with a variation of resources or a variation in access status of relay points due to movement or the like of the resources.

Still another object of the invention is to provide a relay server suitable for a dynamic relay communication system and which can be used without any consciousness, since it does not require troublesome works such as a change of set conditions even when a terminal having been registered move between LANs.

Still another object of the invention is to provide a relay server which can allow a user to select a resource handling method.

According to a first aspect of the invention for accomplishing the above-mentioned object, there is provided a relay server which is connected to a LAN and which can communicate with a relay server in a different LAN, the relay server including: an account information registering unit that stores information on client terminals connected to the LAN; a relay group information registering unit that stores relay group information including information on a group of relay servers permitting accesses to each other; a shared resource information registering unit that stores shared resource information including information on resources, state information indicating statuses of the resources, and information on the client terminals sharing the resources; a check unit that checks whether the client terminals stored in the account information registering unit can be accessed; a relay group information notifying unit that updates the relay group information and transmits a change notification of the relay group information to the relevant relay server, when checking that a client terminal is changed in access status; and a shared resource information notifying unit that updates the relevant shared resource information and transmits a change notification of the shared resource information to the relevant client terminal which is stored in the account information registering unit, when receiving the change notification of the relay group information.

According to a second aspect of the invention, there is provided a relay server which is connected to a LAN and which can communicate with a relay server in a different LAN, the relay server including: an account information registering unit that stores information on client terminals connected to the LAN; a relay group information registering unit that stores relay group information including information on a group of relay servers permitting accesses to each other and status information indicating statuses of the relay servers; a shared resource information registering unit that stores shared resource information including information on resources, status information indicating statuses of the resources, and information on the client terminals sharing the resources; a check unit that checks whether the relay servers stored in the relay group information registering unit can be accessed; a relay group information notifying unit that updates the relay group information and transmits a change notification of the relay group information to the relevant relay server, when checking that a relay server is changed in access status; and a shared resource information notifying unit that updates the relevant shared resource information and transmits a change notification of the shared resource information to the relevant client terminal which is stored in the account information registering unit, when receiving the change notification of the relay group information.

According to a third aspect of the invention, there is provided a relay communication system including: a plurality of LANs; and a relay server and client terminals connected to each LAN. Here, the relay server includes: an account information registering unit that stores information on client terminals connected to the LAN; a relay group information registering unit that stores relay group information including information on a group of relay servers permitting accesses to each other; a shared resource information registering unit that stores shared resource information including information on resources, state information indicating statuses of the resources, and information on the client terminals sharing the resources; a check unit that checks whether the client terminals stored in the account information registering unit can be accessed; a relay group information notifying unit that updates the relay group information and transmits a change notification of the relay group information to the relevant relay server, when checking that a client terminal is changed in access status; and a shared resource information notifying unit that updates the relevant shared resource information and transmits a change notification of the shared resource information to the client terminals connected to the same LAN, when receiving the change notification of the relay group information. The relay group information and the shared resource information held in the relay communication system are automatically updated.

According to a fourth of the invention, there is provided a relay communication system including: a plurality of LANs; and a relay server and client terminals connected to each LAN. Here, the relay server includes: an account information registering unit that stores information on client terminals connected to the LAN; a relay group information registering unit that stores relay group information including information on a group of relay servers permitting accesses to each other and status information indicating statuses of the relay servers; a shared resource information registering unit that stores shared resource information including information on resources, status information indicating statuses of the resources, and information on the client terminals sharing the resources; a check unit that checks whether the relay servers stored in the relay group information registering unit can be accessed; a relay group information notifying unit that updates the relay group information and transmits a change notification of the relay group information to the relevant relay server, when checking that a relay server is changed in access status; and a shared resource information notifying unit that updates the relevant shared resource information and transmits a change notification of the shared resource information to the relevant client terminal which is stored in the account information registering unit, when receiving the change notification of the relay group information. The relay group information and the shared resource information held in the relay communication system are automatically updated.

According to a fifth aspect of the invention, there is provided a relay server which is connected to a LAN and which can communicate with a relay server in a different LAN, the relay server including: an account information registering unit that stores information on client terminals connected to the LAN; and a relay group information registering unit that stores relay group information including information on a group of relay servers permitting accesses to each other and information on the client terminals registered in the respective relay servers. Here, when an access request is received from a client terminal stored in the account information registering unit of the different relay server, the relay server in which the client terminal having transmitted the access request is registered is specified on the basis of the relay group information and it is determined whether the access should be permitted by inquiring of the specified relay server.

A sixth aspect of the invention provides the relay server according to the fifth aspect of the invention, wherein the relay group information includes access information which is created every client terminal and which indicates the relay server as an access destination of the corresponding client terminal, and wherein when the access request is received from the client terminal stored in the account information registering unit, details of the access information of the client terminal included in the relay group information stored in the relay server is updated and a change notification of the relay group information is transmitted to the corresponding different relay server.

A seventh aspect of the invention provides the relay server according to the sixth aspect of the invention, wherein when the access of the client terminal stored in the account information registering unit of the different relay server is permitted, details of the access information of the client terminal included in the relay group information stored in the relay server is updated and a change notification of the relay group information is transmitted to the corresponding different relay server.

According to a eighth aspect of the invention, there is provided a relay server which is connected to a LAN and which can communicate with a relay server in a different LAN, the relay server including: an account information registering unit that stores information on client terminals connected to the LAN; a relay group information registering unit that stores relay group information including information on a group of relay servers permitting accesses to each other; a shared resource information registering unit that stores shared resource information including information on resources and information on the client terminals sharing the resources; and a relay unit that relays a resource operation on the basis of the relay group information and the shared resource information, when receiving a command for operating a resource, which can be operated by the client terminal connected to the different LAN, from the client terminal stored in the account information registering unit, wherein the resource operation includes a synchronous mode in which a seeming operation based on a change of the shared resource information and an essential operation of a resource are synchronized with each other and an asynchronous mode in which the seeming operation based on a change of the shared resource information and the essential operation of a resource are not synchronized with each other.

A ninth aspect of the invention provides the relay server according to the eighth aspect of the invention, wherein when the operation command for operating a resource which can be operated by the client terminal connected to the different LAN is received in the synchronous mode, the client terminal which can operate the resource is specified on the basis of the shared resource information, the relay server in which the specified client terminal is registered is specified on the basis of the relay group information, and the operation command is transmitted to the client terminal which can operate the resource through the specified relay server.

A tenth aspect of the invention provides the relay server according to the eighth or ninth aspect of the invention, wherein when the operation command for operating a resource which can be operated by the client terminal connected to the different LAN is received in the synchronous mode and the seeming operation can be performed by changing the shared resource information, the shared resource information is updated, and wherein when the seeming operation cannot be performed by changing the shared resource information, the client terminal which can operate the resource is specified on the basis of the shared resource information, the relay server in which the specified client terminal is registered is specified on the basis of the relay group information, and the operation command is transmitted to the client terminal which can operate the resource.

An eleventh aspect of the invention provides the relay server according to any one of the eighth to tenth aspect of the invention, wherein a mode is set in advance.

A twelfth aspect of the invention provides the relay server according to any one of the eighth to tenth aspect of the invention, wherein a mode can be selected at the time of operating a resource.

According to a thirteenth aspect of the invention, there is provided a management method using a relay server which is connected to a LAN and which can communicate with a relay server in a different LAN, the management method including: storing information on client terminals connected to the LAN; storing relay group information including information on a group of relay servers permitting accesses to each other; storing shared resource information including information on resources, state information indicating statuses of the resources, and information on the client terminals sharing the resources; checking whether the client terminals stored in the registering of the account information can be accessed; updating the relay group information and transmitting a change notification of the relay group information to the relevant relay server, when checking that a client terminal is changed in access status; and updating the relevant shared resource information and transmitting a change notification of the shared resource information to the relevant client terminal stored in the registering of the account information, when receiving the change notification of the relay group information.

According to a fourteenth aspect of the invention, there is provided a management method using a relay server which is connected to a LAN and which can communicate with a relay server in a different LAN, the management method including: storing information on client terminals connected to the LAN; storing relay group information including information on a group of relay servers permitting accesses to each other and status information indicating statuses of the relay servers; storing shared resource information including information on resources, status information indicating statuses of the resources, and information on the client terminals sharing the resources; checking whether the relay servers stored in the registering of the relay group information can be accessed; updating the relay group information and transmitting a change notification of the relay group information to the relevant relay server, when detecting a relay server changed in access status; and updating the relevant shared resource information and transmitting a change notification of the shared resource information to the relevant client terminal which is stored in the registering of the account information, when receiving the change notification of the relay group information.

According to a fifteenth aspect of the invention, there is provided a management method of a relay communication system which has a plurality of LANs and a relay server and client terminals connected to each LAN, the management method including: storing information on client terminals connected to the LAN; storing relay group information including information on a group of relay servers permitting accesses to each other; storing shared resource information including information on resources, state information indicating statuses of the resources, and information on the client terminals sharing the resources; checking whether the client terminals stored in the registering of the account information can be accessed; updating the relay group information and transmitting a change notification of the relay group information to the relevant relay server, when detecting a client terminal changed in access status; and updating the relevant shared resource information and transmitting a change notification of the shared resource information to the client terminals connected to the same LAN, when receiving the change notification of the relay group information, and wherein the relay group information and the shared resource information held in the relay communication system are automatically updated.

According to a sixteenth aspect of the invention, there is provided a management method of a relay communication system which has a plurality of LANs and a relay server and client terminals connected to each LAN, the management method including: storing information on client terminals connected to the LAN; storing relay group information including information on a group of relay servers permitting accesses to each other and status information indicating statuses of the relay servers; storing shared resource information including information on resources, status information indicating statuses of the resources, and information on the client terminals sharing the resources; checking whether the relay servers stored in the registering of the relay group information can be accessed; updating the relay group information and transmitting a change notification of the relay group information to the relevant relay server, when detecting a relay server changed in access status; and updating the relevant shared resource information and transmitting a change notification of the shared resource information to the relevant client terminal which is stored in the account information registering unit, when receiving the change notification of the relay group information, and wherein the relay group information and the shared resource information held in the relay communication system are automatically updated.

According to a seventeenth aspect of the invention, there is provided a management method using a relay server which is connected to a LAN and which can communicate with a relay server in a different LAN, the management method including: storing information on client terminals connected to the LAN; and storing relay group information including information on a group of relay servers permitting accesses to each other and information on the client terminals registered in the respective relay servers, wherein when an access request is received from a client terminal stored in the registering of the account information of the different relay server, the relay server in which the client terminal having transmitted the access request is registered is specified on the basis of the relay group information and it is determined whether the access should be permitted by inquiring of the specified relay server.

An eighteenth aspect of the invention provides the management method according to the seventeenth aspect of the invention, wherein the relay group information includes access information which is created every client terminal and which indicates the relay server as an access destination of the corresponding client terminal, and wherein when the access request is received from the client terminal stored in the registering of the account information, details of the access information of the client terminal included in the relay group information stored in the relay server is updated and a change notification of the relay group information is transmitted to the corresponding different relay server.

A nineteenth aspect of the invention provides the management method according to the eighteenth aspect of the invention, wherein when the access of the client terminal stored in the registering of the account information of the different relay server is permitted, details of the access information of the client terminal included in the relay group information stored in the relay server is updated and a change notification of the relay group information is transmitted to the corresponding different relay server.

According to a twentieth aspect of the invention, there is provided a management method using a relay server which is connected to a LAN and which can communicate with a relay server in a different LAN, the management method including: storing information on client terminals connected to the LAN; storing relay group information including information on a group of relay servers permitting accesses to each other; storing shared resource information including information on resources and information on the client terminals sharing the resources; and relaying a resource operation on the basis of the relay group information and the shared resource information, when receiving a command for operating a resource, which can be operated by the client terminal connected to the different LAN, from the client terminal stored in the registering of the account information, wherein the resource operation includes a synchronous mode in which a seeming operation based on a change of the shared resource information and an essential operation of a resource are synchronized with each other and an asynchronous mode in which the seeming operation based on a change of the shared resource information and the essential operation of a resource are not synchronized with each other.

A twenty-first aspect of the invention provides the management method according to the twentieth aspect of the invention, wherein when the operation command for operating a resource which can be operated by the client terminal connected to the different LAN is received in the synchronous mode, the client terminal which can operate the resource is specified on the basis of the shared resource information, the relay server in which the specified client terminal is registered is specified on the basis of the relay group information, and the operation command is transmitted to the client terminal which can operate the resource through the specified relay server.

A twenty-second aspect of the invention provides the management method according to the twentieth or twenty-first aspect of the invention, wherein when the operation command for operating a resource which can be operated by the client terminal connected to the different LAN is received in the synchronous mode and the seeming operation can be performed by changing the shared resource information, the shared resource information is updated, and wherein when the seeming operation cannot be performed by changing the shared resource information, the client terminal which can operate the resource is specified on the basis of the shared resource information, the relay server in which the specified client terminal is registered is specified on the basis of the relay group information, and the operation command is transmitted to the client terminal which can operate the resource.

Aspect twenty-third aspect of the invention provides the management method according to any one of the twentieth to twenty-second aspect of the invention, wherein a mode is set in advance.

Aspect twenty-fourth aspect of the invention provides the management method according to any one of the twentieth to twenty-second aspect of the invention, wherein a mode can be selected at the time of operating a resource.

In the relay communication system employing the relay server according to the invention, the client terminal in a different LAN can operate a resource held by a different client terminal over the WAN, as if the client terminal holds the resource.

The operating conditions of the relay servers and the client terminals are periodically monitored and checked and the relevant information is always updated. Accordingly, even when a change due to the deletion of a resource, a change in access status due to a power ON/OFF state or a log ON/OFF state of the relay servers or the client terminals, or an unexpected trouble occurs, the states can be easily grasped, thereby not causing a user's confusion.

It is possible to use the resources without any consciousness, since it does not require troublesome works such as a change of set conditions even when a terminal having been registered in a LAN moves to a different LAN.

One mode of both the synchronous mode in which the seeming operation and the essential operation of the resource are synchronized with each other and the asynchronous mode in which they are not synchronized with each other can be selected at the time of operating the resource, depending on it. For example, when the synchronous mode is selected in which the operation details accompany the status of the resource, the client terminal T having copied a file can operate the file directly after the copy operation. As a result, it is not necessary to indirectly operate the file through a relay communication and thus it is possible to reduce a communication process load thereafter. On the other hand, when the asynchronous mode is selected, it is possible to prevent the resource from being repeatedly created and thus to efficiently use the storage unit in the relay communication system.

Other features, elements, processes, steps, characteristics, and advantages of the invention will become more apparent from the following detailed description of preferred embodiments of the invention with reference to the attached drawings.

BRIEF DESCRIPTION OF THE DRAWINGS

FIG. 6 is a diagram illustrating details of relay group information according to the first embodiment of the invention;

FIG. 7 is a diagram illustrating details of shared resource information according to the first embodiment of the invention;

FIG. 13 is a diagram illustrating details of shared resource information in a certain process according to the first embodiment of the invention;

FIG. 15 is a sequence diagram of the communication process subsequent to FIG. 11;

FIG. 16 is a diagram illustrating details of shared resource information in a certain process according to the first embodiment of the invention;

FIG. 17 is a diagram illustrating details of shared resource information in a certain process according to the first embodiment of the invention;

FIG. 19 is a diagram illustrating details of shared resource information in a certain process according to the first embodiment of the invention;

FIG. 20 is a flowchart illustrating a process of a relay server according to a second embodiment of the invention;

FIG. 22 is a diagram illustrating details of relay group information in a certain process according to the second embodiment of the invention;

FIG. 23 is a diagram illustrating details of shared resource information in a certain process according to the second embodiment of the invention;

FIG. 24 is a diagram illustrating details of relay group information in a certain process according to the second embodiment of the invention;

FIG. 25 is a diagram illustrating details of shared resource information in a certain process according to the second embodiment of the invention;

FIG. 26 is a diagram illustrating details of relay group information in a certain process according to the second embodiment of the invention;

FIG. 27 is a diagram illustrating details of shared resource information in a certain process according to the second embodiment of the invention;

FIG. 30 is a diagram illustrating details of relay group information in a certain process according to the third embodiment of the invention;

FIG. 31 is a diagram illustrating details of shared resource information in a certain process according to the third embodiment of the invention;

FIG. 33 is a diagram illustrating details of shared resource information in a certain process according to the third embodiment of the invention;

FIG. 34 is a diagram illustrating details of relay group information in a certain process according to the third embodiment of the invention;

FIG. 35 is a diagram illustrating details of shared resource information in a certain process according to the third embodiment of the invention;

FIG. 36 is a diagram illustrating details of shared resource information according to a fourth embodiment of the invention;

FIG. 41 is a diagram illustrating details of shared resource information in a certain process according to the fourth embodiment of the invention;

FIG. 43 is a diagram illustrating details of shared resource information in a certain process according to the fourth embodiment of the invention; and FIG. 44 is a diagram illustrating details of shared resource information in a certain process according to the fourth embodiment of the invention.

DETAILED DESCRIPTION OF PREFERRED EMBODIMENTS

Hereinafter, exemplary embodiments of the invention will be described with reference to the drawings. First, a basic configuration of a relay communication system according to a first embodiment the invention will be described. Then, concrete configurations of relay communication systems according to second, third, and fourth embodiments of the invention will be described in detail.

First Embodiment

Figure 1:
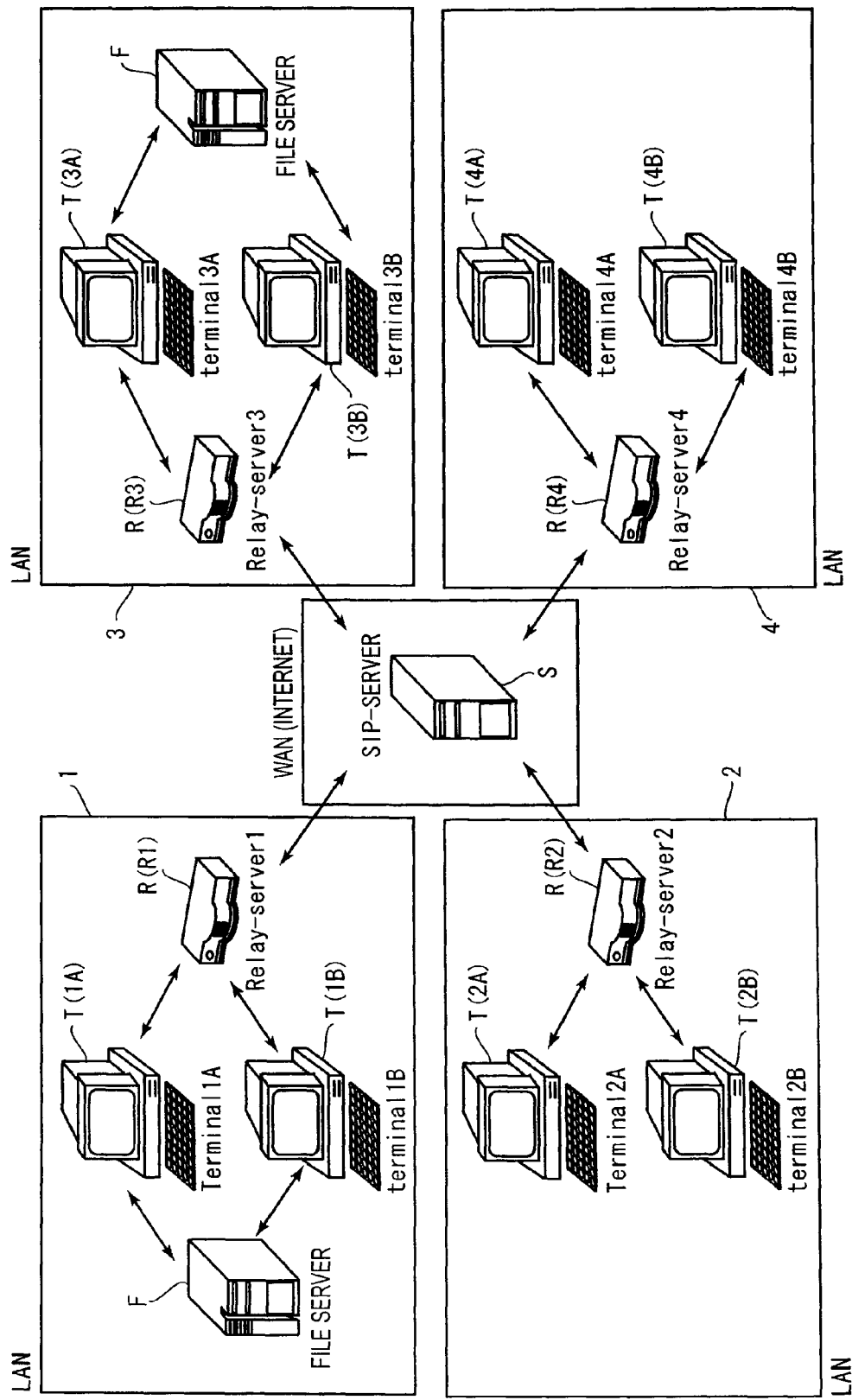
FIG. 1 is a diagram illustrating a network configuration of a relay communication system according to a first embodiment of the invention.

FIG. 1 illustrates an entire configuration of a relay communication system according to the invention. As shown in FIG. 1, the relay communication system includes a plurality of LANs connected to a WAN. The relay communication system includes an external server S, relay servers R, client terminals T, and file servers F. Although an example using the external server S will be exemplified, the relay servers R may directly communicate with each other without using the external server S.

In this embodiment, a system using a session initiation protocol (SIP) as a communication protocol between the external server S and the relay servers R in the WAN and between the relay server R and the client terminals T in the respective LANs is exemplified. However, protocols other than the SIP may be used as a communication protocol between the servers and the terminals.

The WAN (Wide Area Network) is a network for connecting different LANs. In this embodiment, the Internet is exemplified as the WAN, but the invention is not limited to the Internet, but other networks similar thereto may be used.

A LAN (Local Area Network) is a relatively small-scale network which is constructed in a defined place. Plural LANs are provided and are constructed in places physically apart from each other. For example, in this embodiment, a LAN1 is constructed in a branch A in Tokyo and LAN2, LAN3, and LAN4 are constructed in branches B, C, and D of Osaka, Nagoya, and Fukuoka, respectively. Four LANs of the LAN1, LAN2, LAN3, and LAN4 are connected to the Internet which is a global network. The number of LANs is not limited to four, but may be any other plural number.

External Server

The external server S is a device used in communications between the relay servers R disposed in the LANs and is disposed over the Internet. The external server S has a function of an SIP server. Specifically, the external server S has a function of an SIP proxy server for relaying SIP methods and responses and a function of an SIP registrar server for registering accounts of the relay servers R. The number of external servers S is not limited to one, but may be a plural number to function in a distributed manner. When a protocol other than the SIP is used, communications between the relay servers R can be directly controlled on the basis of the protocol and it is thus not necessary to provide the external server S serving as the SIP server.

Figure 2:
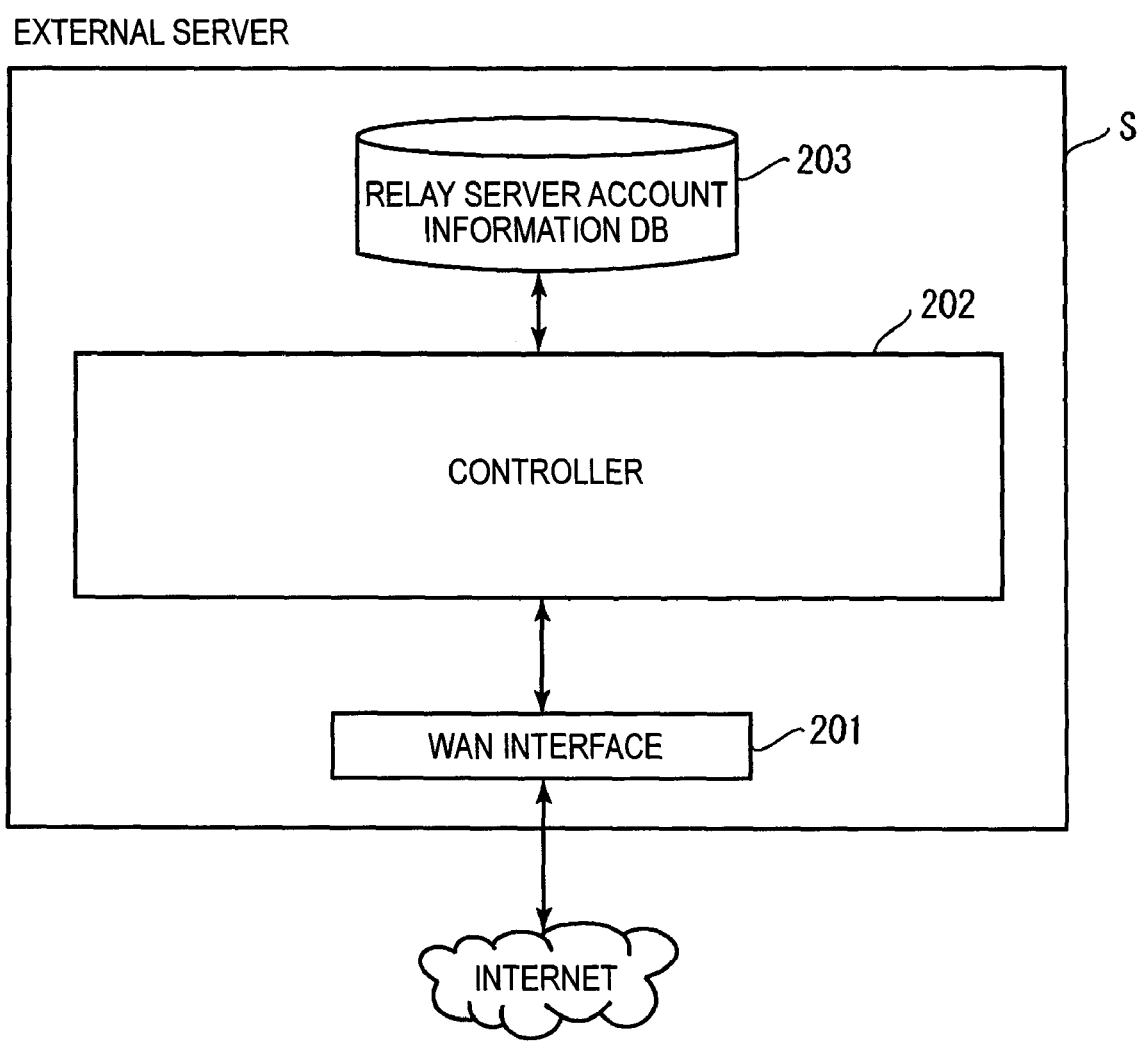
FIG. 2 is a functional block diagram illustrating an external server according to the first embodiment of the invention.

A functional block diagram of the external server S is shown in FIG. 2. As shown in FIG. 2, the external server S includes a WAN interface 201, a controller 202, and a relay server account information database (DB) 203.

The WAN interface 201 is an interface serving to communicate with devices such as the relay servers R connected to the Internet by the use of global IP addresses.

The relay server account information DB 203 is a database managing an account of the relay server R having requested for registration to be correlated with a global IP address.

The controller 202 is a processing unit serving to control various communications through the WAN interface 201 and controls a communication process in accordance with protocols such as a TCP/IP, a UDP, and an SIP. For example, the controller 202 serves to receive accounts of the relay servers R transmitted from the relay servers R and to register the received accounts in the relay server account information DB 203. Alternatively, the controller 202 performs a process of relaying communication data such as various SIP methods and responses transmitted from a relay server R to another relay server R. The functions of the controller 202 and the like of the external server S will be described later.

Client Terminal

A client terminal T is a terminal which can be operated directly by a user. For example, a personal computer (PC) and the like used in a user's usual works corresponds to the client terminal T. Accordingly, plural client terminals T are generally disposed in a LAN. In this embodiment, an example is described in which client terminals 1A and 1B are connected to the LAN1, client terminals 2A and 2B are connected to the LAN2, client terminals 3A and 3B are connected to the LAN3, and client terminals 4A and 4B are connected to the LAN4. Private IP addresses which are uniquely managed only in the same LAN are given to the client terminals T.

Figure 3:
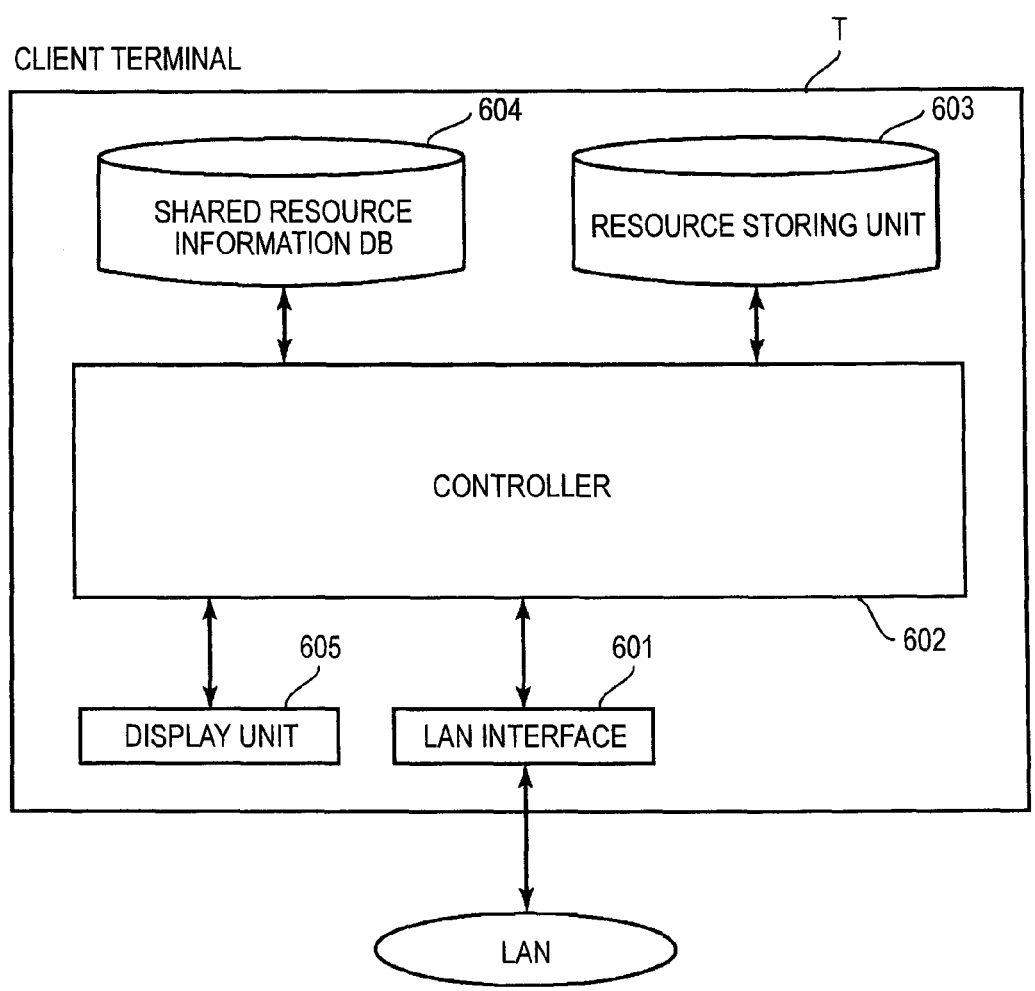
FIG. 3 is a functional block diagram illustrating a client terminal according to the first embodiment of the invention.

A functional block diagram of the client terminal T is shown in FIG. 3. As shown in FIG. 3, the client terminal T includes a LAN interface 601, a controller 602, a resource storing unit 603, a shared resource information database (DB) 604, and a display unit 605.

The LAN interface 601 is an interface for communicating with devices such as the relay server R or the file server F connected to the same LAN by the use of the private IP address.

The resource storing unit 603 stores essences of resources such as files or folders which can be operated by the client terminal T.

The shared resource information database (DB) 604 stores shared resource information 120 which includes information on resources held by the client terminals T and information on accounts of the client terminals T sharing the resources and in which information on shared resources held by the client terminals T is described.

The display unit 605 visually displays details of relay group information 100 to be described later or the shared resource information 120.

The controller 602 is a processing unit for controlling various communications performed through the LAN interface 601. The controller 602 serves to control communication processes in accordance with the protocols such as TCP/IP, UDP, and SIP. For example, the controller 602 performs processes of controlling movement, change, and deletion of the resources stored in the resource storing unit 603. Alternatively, the controller 602 receives a change notification of the shared resource information 120 from the relay servers R and performs a process of updating the shared resource information 120 stored in the shared resource information DB 604. The functions of the client terminal T including the controller 602 will be described later.

Relay Server

One relay server R is disposed in each LAN. Specifically, a relay server R1 is disposed in LAN1, a relay server R2 is disposed in LAN2, a relay server R3 is disposed in LAN3, and a relay server R4 is disposed in LAN4.

The relay server R is connected to the Internet as well as a LAN. The relay server R can communicate with the client terminals T connected to the same LAN and can communicate with the relay server R connected to a different LAN through the external server S. Accordingly, global IP addresses in addition to the private IP addresses are given to the relay servers R, respectively.

Figure 4:
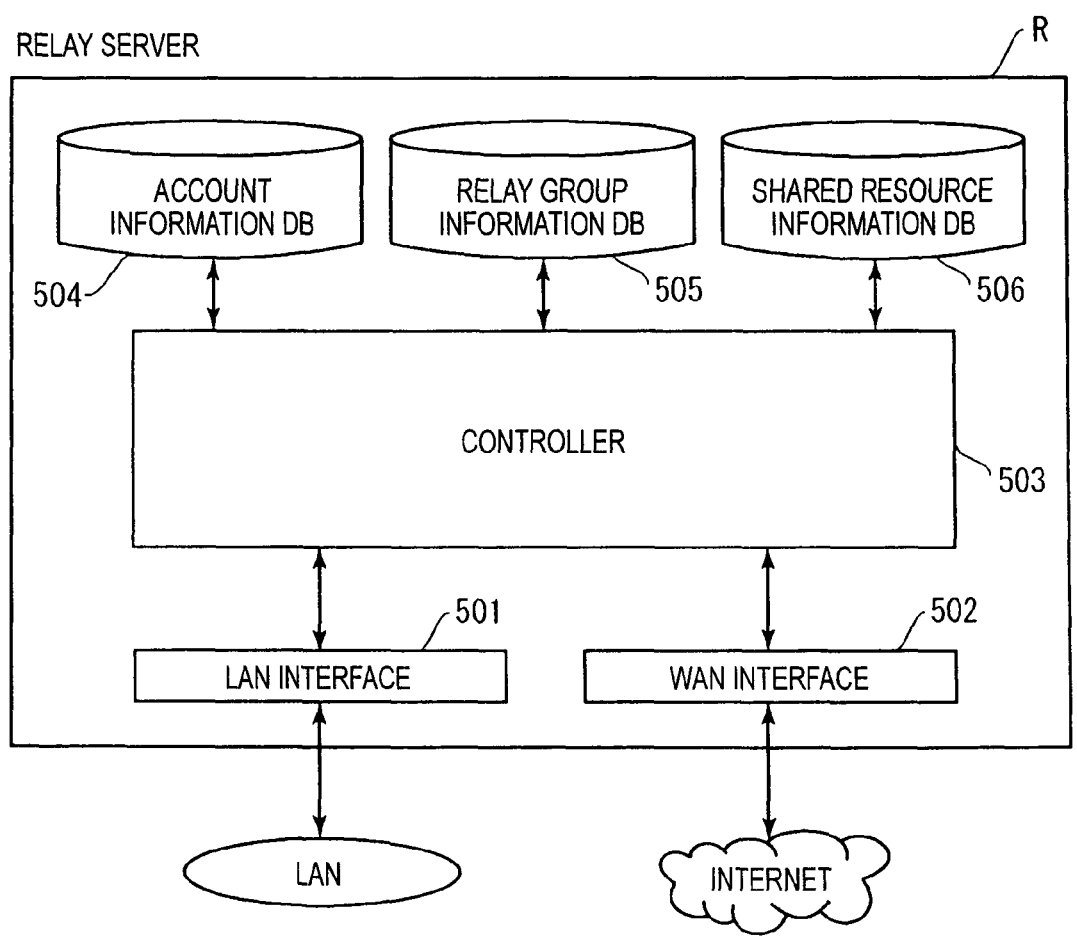
FIG. 4 is a functional block diagram illustrating a relay server according to the first embodiment of the invention.

A functional block diagram of each relay server R is shown in FIG. 4. As shown in FIG. 4, the relay server R includes a LAN interface 501, a WAN interface 502, a controller 503, an account information database (DB) 504, a relay group information database (DB) 505, and a shared resource information database (DB) 506.

The LAN interface 501 is an interface that communicates with a client terminal T connected to a LAN by the use of the private IP address. For example, in LAN1, the relay server R1 communicates with the client terminals 1A and 1B through the LAN interface 501.

The WAN interface 502 is an interface that communicates with devices such as the external server S connected to the Internet 1 by the use of the global IP address. Although it is described in this embodiment that the relay server R includes the WAN interface 502, a router may perform a connection to the Internet and the relay server R may be disposed under the control of the router.

Since the communications between the relay servers R and the client terminals T are performed using the SIP, the relay servers R have a function of an SIP registrar server. For example, the relay server R2 connected to the LAN2 serves as an SIP registrar server for registering accounts of the client terminals 2A and 2B connected to the LAN2 in the account information DB 504 using the SIP.

Figure 5:
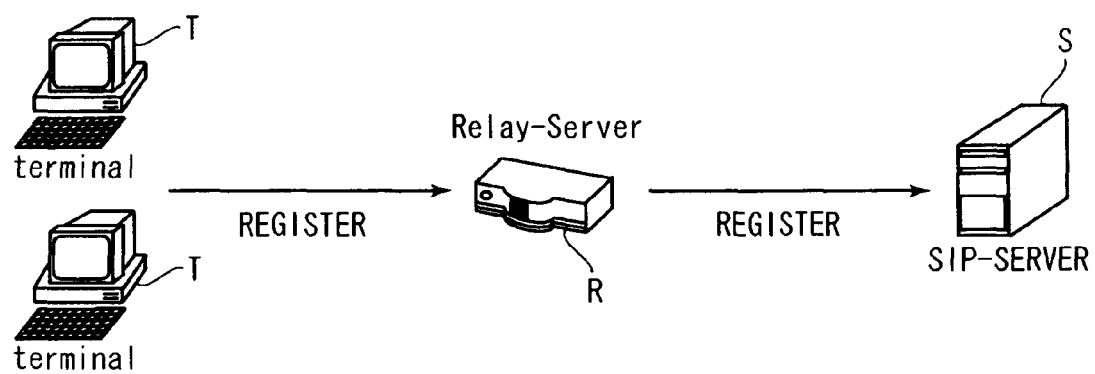
FIG. 5 is a diagram illustrating a relation between the client terminal and the relay server and a relation between the relay server and the external server according to the first embodiment of the invention.

Accordingly, as shown in FIG. 5, the relay server R serves as a server for receiving and registering the accounts from the client terminals T, in a relation with the client terminals T. In a relation with the external server S, the relay server serves as a client for transmitting and registering the accounts to the external server S.

The account information DB 504 is a database for managing the accounts of the client terminals T having requested for registration so as to be correlated with the private IP addresses.

The relay group information DB 505 is a database for managing the relay group information associated with the client terminals T registered in the account information DB.

The shared resource information DB 506 is a database for managing the shared resource information associated with the client terminals registered in the account information DB.

The controller 503 is a processing unit for controlling various communications performed through the LAN interface 501 and the WAN interface 502 and serves to control various communication processes in accordance with the protocols such as the TCP/IP, the UDP, and the SIP. For example, the controller 503 performs a process of transmitting its account to the external server S and requesting for registration of the account and a process of registering the accounts transmitted from the client terminals T connected to the same LAN in the account information DB 504. Alternatively, the controller 503 performs a process of creating the relay group information 100 and storing the created relay group information in the relay group information DB 505 and a process of creating the shared resource information 120 and storing the created shared resource information in the shared resource information DB 506. The functions of the relay servers R including the controller 503 will be described later.

File Server

The file server F is a server that is connected to a LAN to communicate with the client terminals T connected to the same LAN and can store essences of resources such as files or folders. That is, the file server F serves as resource storing unit substituted for the resource storing unit 603 of the client terminals T. That is, in this embodiment, the resources that can be operated by the client terminals T may be stored in a local disc of the corresponding terminal T or may be stored in the file server F as a network drive. Accordingly, as the file server F is shown in some LANs of the LAN1 and LAN3 in FIG. 1, the file server is not essential to the LAN but may be provided properly as needed.

The relay group information 100 and the shared resource information 120 which are information used in the relay communication system will be described now.

Relay Group Information

Details of the relay group information 100 are shown in FIG. 6 and the like. FIG. 6 illustrates the relay group information 100 which is exchanged between three relay servers R1, R2, and R3 using the relay server R1 as a start point and which is stored in the relay group information DBs 505. The relay group information 100 includes a piece of group identification information 101 and information (relay account information) 102 on three relay servers R1, R2, and R3 permitting connections to each other.

The group identification information 101 is information for identifying the relay group information 100. A unique ID is given to each piece of relay group information every time of creation thereof and thus the relay group information is identified at a view. Accordingly, an operator or the like can specify a relay group by the use of the group identification information 101 and can easily change a group configuration.

The relay account information 102 includes information on the accounts of the relay servers R and the accounts of the client terminals T connected to the same LAN as a relay server R and registered in the relay server R. Specific names are given to the accounts of the relay servers R and the relay servers can be easily identified by a user. Similarly, specific names are given to the accounts of the client terminals T. For example, regarding the relay account information 102a of the relay server R1 (rely-server1), a name 104 (branch A) is given to the account (relay-server1@net) of the relay server R1. Names (for example, terminal 1A) are given to the accounts (for example, user1A@account) of the client terminals T connected to the same LAN. Reference numeral 103 denotes identification data indicating a post of the corresponding client terminal T, such as "sales division" and "development division."

As described above, the relay group information 100 are created to be distinguished from the other relay group information and includes a group of relay account information 102 permitting access to each other. The relay account information 102 includes the accounts of the relay servers R and the accounts of the client terminals T disposed in the same LAN as the relay server R is disposed and registered in the corresponding relay server. Accordingly, referring to the relay group information 100, the LANs constituting the same group and the relay servers R or the client terminals T registered in the respective LANs can be seen.

Shared Resource Information

Details of the shared resource information 120 are shown in FIG. 7. FIG. 7 illustrates the shared resource information 120 stored in the shared resource information DB 604 of the client terminal 1A. The same information as the shared resource information 120 is also stored in the shared resource information DB 506 of the relay server R1 registered in the same LAN as the client terminal 1A is disposed. The shared resource information 120 includes account identification information 121 indicating the shared resource information 120 associated with the client terminal 1A and individual shared resource information 122 associated with the client terminal 1A.

The account identification information 121 is information for identifying the shared resource information 120 of each client terminal.

The individual shared resource information 122 includes shared resource identification information 123, family account information 124, and family resource information 125.

The shared resource identification information 123 is information for identifying the individual shared resource information 122. A different ID is given to the individual shared resource information 122 every time of creation thereof and the individual shared resource information is easily identified. Here, the shared resource identification information 123 includes an ID (for example, 20061001150032user1A@relay-server1) correlated with the client terminal T having requested for creation of the shared resource information 120 and a name (for example, user1A-policy01) for facilitating the identification thereof.

Accordingly, since users can specify the individual shared resource information 122 by the use of the shared resource identification information 123, it is possible to easily edit the details thereof or the like.

The family resource information 125 is a set of resource information 126 indicating essences of the resources such as files or folders held by the client terminal T. The resource information 126 includes information (for example, resource name="folderA") indicating names of essences of the shared resources, information (for example, owner="user1A@account") indicating the accounts of the client terminal T (owner client terminal) which can operate the essence of the resource, and information (for example, value="c:/folderA") indicating a position of the essence of the resource.

The family account information 124 is a set of accounts (for example, user1A@account) of the client terminals T sharing the essence of the resource indicated by the family resource information 125. The family account information 124 includes the owner client terminal T and the client terminals T (user client terminals) which can operate the essence of the resource indirectly through the owner client terminal. The user client terminals T are client terminals which cannot directly operate the essence of the resource but can indirectly operate the resource through the owner client terminal T.

Figure 8:
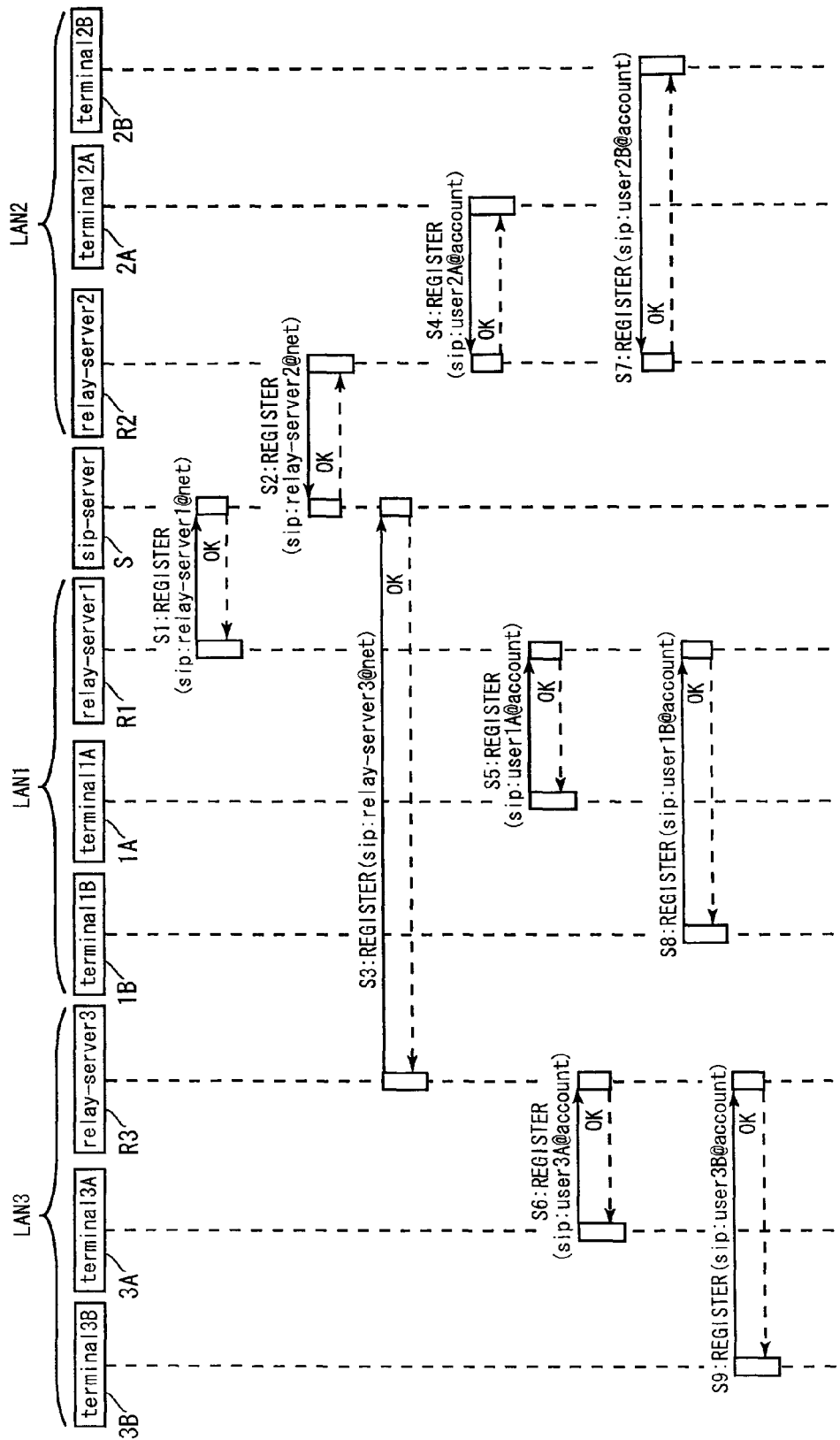
FIG. 8 is a sequence diagram illustrating a communication process according to the first embodiment of the invention.

A flow of a communication process in the relay communication system having the above-mentioned configuration will be described with reference to the process sequence diagrams shown in FIGS. 8, 9, 11, 15, and 18. Steps S1 to S9 shown in FIG. 8 show a step of registering the accounts of devices.

The relay server R1 transmits a request for registration of an account (REGISTER) to the external server S (step S1). Here, the relay server R1 gives a request for registration of its account (sip: relay-server1@net). The external server S returns an OK response to the relay server R1 and registers the account of the relay server R1 and a global IP address of the relay server R1 in the relay server account information DB 203 so as to be correlated with each other.

Subsequently, the relay server R2 transmits a request for registration of an account (REGISTER) to the external server S (step S2). Here, the relay server R2 gives a request for registration of its account (sip: relay-server2@net). The external server S returns an OK response to the relay server R2 and registers the account of the relay server R2 and a global IP address of the relay server R2 in the relay server account information DB 203 so as to be correlated with each other.

Similarly, the relay server R3 transmits a request for registration of its account (REGISTER) to the external server S and registers its account in the external server S (step S3).

The client terminal 2A transmits a request for registration of an account (REGISTER) to the relay server R2 (step S4). Here, client terminal 2A gives a request for registration of its account (sip: user2A@account). The relay server R2 returns an OK response and registers the account of the client terminal 2A and a private IP address of the client terminal 2A in the account information DB 504 so as to be correlated with each other.

Subsequently, the client terminal 1A transmits a request for registration of an account (REGISTER) to the relay server R1 (step S5). Here, client terminal 1A gives a request for registration of its account (sip: user1A@account). The relay server R1 returns an OK response and registers the account of the client terminal 1A and a private IP address of the client terminal 1A in the account information DB 504 so as to be correlated with each other.

Similarly, the client terminal 3A transmits an account registering request to the relay server R3 (step S6) and the client terminal 2B transmits an account registering request to the relay server R2 (step S7). The client terminal 1B transmits the account registering request to the relay server R1 (step S8) and registers the account in the relay server R. The client terminal 3B transmits the account registering request to the relay server R3 (step S9) and registers the account in the relay server R.

In these steps, the registration of the accounts of the relay servers R in the external server S is ended and the registration of the accounts of the client terminals T in the relay servers R is ended.

The above-mentioned order of steps is an example and any order may be used as long as the registration of the accounts of the devices is ended. The devices cannot participate in the relay communication system, when the devices exist in the network but do not finish the registration of the accounts thereof and is not connected to the network. For example, the LAN4 shown in FIG. 1 cannot participate in the communication service described here, because it has not finished the registration of the accounts and is not connected to the network.

Figure 9:
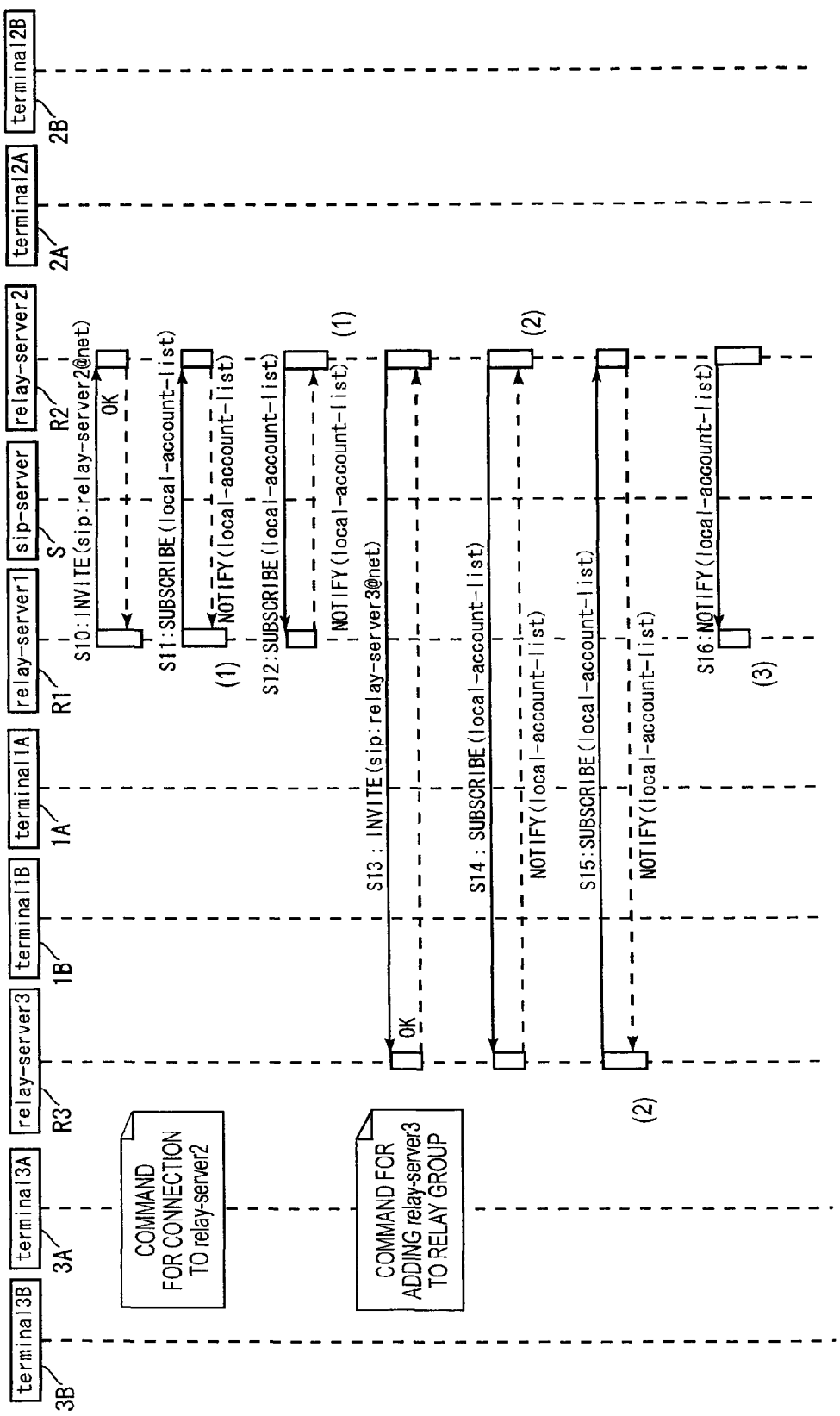
FIG. 9 is a sequence diagram of the communication process subsequent to FIG. 8.

Steps S10 to S16 show in FIG. 9 show a communication step between the relay servers R. The processes of steps S1 to S16 are generally carried out as an initial setting for a network by a user or an operator.

The relay server R1 transmits a connection request command (INVITE method) for the relay server R2 to the external server S (step S10). In the INVITE method, an account (sip: relay-server2@net) of the relay server R2 of a connection destination. The external server S acquires the global IP address of the relay server R2 by referring to the relay server account information DB 203. The external server S relays the INVITE method transmitted from the relay server R1 to the relay server R2. After the connection request command is transmitted from the relay server R1 to the relay server R2, the OK response is transmitted from the relay server R2 to the relay server R1 through the external server S.

In this way, the communication process between the relay servers R is performed via the external server S. Since the communication process between the relay servers R is performed via the external server S in any communication, the specific description of the communication process via the external server S is omitted in the following description.

Then, the relay server R1 performs a change notification setting process using a notification event between the relay server R1 and the relay server R2 by the use of a SUBSCRIBE method to the relay server R2 (step S11). Accordingly, every when details of the relay group information 100 stored in the relay server R2 is changed, the changed information is transmitted from the relay server R2 to the relay server R1 by the use of the NOTIFY method.

The SUBSCRIBE method is one processing unit defined in the SIP. When a notification even is set by the use of the SUBSCRIBE method, changed information is exchanged during the period when the notification event can be executed. That is, every when predetermined information of the device having received the SUBSCRIBE method is changed, new information is notified to the device having transmitted the SUBSCRIBE method by the use of the NOTIFY method.

Similarly, on the contrary, the relay server R2 performs the change notification setting process between the relay server R2 and the relay server R1 by the use of the SUBSCRIBE method to the relay server R1 (step S12). Accordingly, even when details of the relay group information 100 stored in the relay server R1 is changed, the changed information is transmitted from the relay server R1 to the relay server R2 by the use of the NOTIFY method.

Here, since the change notification setting process is first performed, the party having received the SUBSCRIBE method performs a notification process and the relay server R of the party having transmitted the SUBSCRIBE method creates new relay group information 100a.

Figure 10:
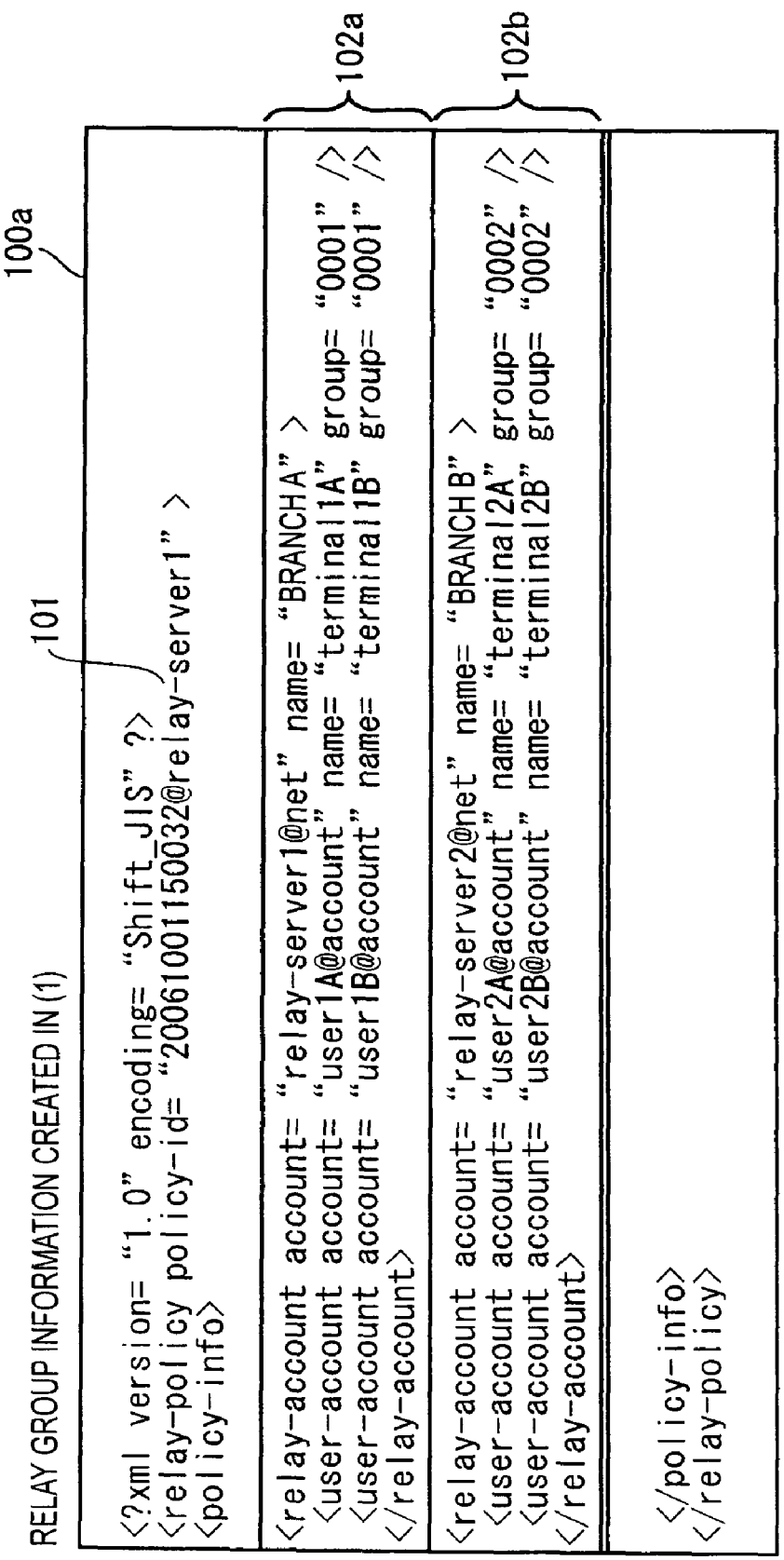
FIG. 10 is a diagram illustrating details of relay group information in a certain process according to the first embodiment of the invention.

The relay group information 100a is shown in FIG. 10. Here, since the relay server R1 and the relay server R2 form a group, both relay account information 102a and 102b is include in the relay group information 100a. That is, the relay account information 102b of the relay server R2 is notified in the NOTIFY method of step S11. The relay account information 102a of the relay server R1 is notified in the NOTIFY method of step S12. By exchanging the information, the relay group information 100a having the same details is created by both parties. The created relay group information 100a is stored in the relay group information DB 505.

In step S13, the relay server R3 is newly added to the relay group formed between the relay server R1 and the relay server R2. Specifically, an operator or the like specifies a group with reference to the group identification information 101. The relay server R2 transmits a connection request command (INVITE method) to the relay server R3 on the basis of the operator's operation or the like (step S13). In response to the transmission, their relay server R3 transmits an OK response to the relay server R2. Similarly to steps S11 and S12, a change notification setting process using the SUBSCRIBE method is performed between the relay servers R2 and R3 (steps S14 and S15). The changed information is transmitted by the use of the NOTIFY method and new relay group information 100b is created.

Here, the relay group information having the same details as the relay group information shown in FIG. 6 is created. As shown in FIG. 6, since three relay servers R1, R2, and R3 form one group, the relay group information 100b includes relay account information 102a, 102b, and 102c. That is, the relay account information 102c of the relay server R3 is notified in the NOTIFY method of step S14. The relay account information 102a and 102b stored in the relay server R2 is notified in the NOTIFY method of step S15. By exchanging the information, the relay group information 100b having the same details is created by both parties. The new relay group information 100b is stored in the respective relay group information DBs 505.

The relay group information 100 which the relay server R2 stores in the relay group information DB 505 is changed due to step S14. As a result, the changed information is transmitted to the relay server R1 (step S16) on the basis of the change notification setting process of step S11. Specifically, the relay account information 102c of the relay server R3 is transmitted to the relay server R1 and the relay group information 100b shown in FIG. 6 is created and stored.

In this way, when any relay group information 100 is changed, the changed details are automatically updated between the relay server R1 and the relay server R2 and between the relay server R2 and the relay server R3. Accordingly, even when the account of the relay server R or the client terminal T is changed, it is possible to dynamically cope with the change. Of course, the relay group information 100 can be formed between arbitrary relay servers R and may be plural.

A flow of the communication process of sharing resources will be described with reference to the sequence diagrams of FIGS. 11 and 15.

Figure 11:
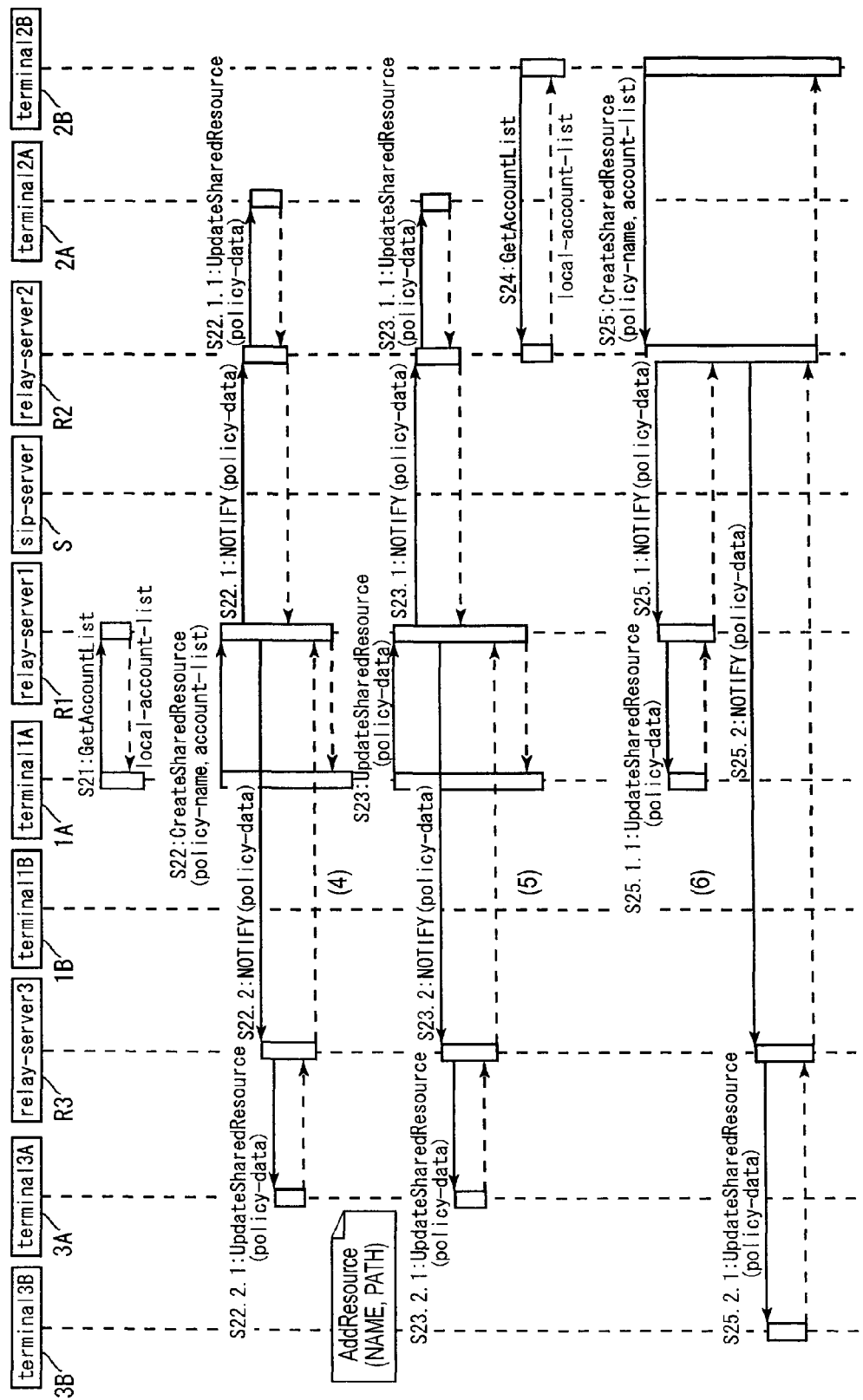
FIG. 11 is a sequence diagram illustrating a communication process according to the first embodiment of the invention.

In FIG. 11, the client terminal 1A transmits an account information transmitting request (GetAccountList command) to the relay server R1 (step S21). In response to the request, the relay server R1 transmits the details of the relay group information stored therein, that is, the relay account information 102, to the client terminal 1A so as to display the transmitted relay group information on the client terminal 1A. The relay account information 102 is displayed in the client terminal 1A. With the client terminal 1A, the user selects and designates the user client terminals T sharing the resource with reference to the relay account information 102. Here, the user client terminals 2A and 3A are designated.

The designated client terminal 1A transmits a shared resource creating request (CreateSharedResource command) including the information to the relay server R1 (step S22). The relay server R1 having received the shared resource creating request stores the created shared resource information 120 in its shared resource information DB 506. The relay server R1 transmits the created shared resource information 120 to the relay servers R2 and R3 connected to the designated user client terminals 2A and 3A by the use of the NOTIFY method (steps S22.1 and S22.2). The notified relay servers R2 and R3 store the shared resource information 120 in their shared resource information DB 506. Then, the relay servers R2 and R3 transmits a shared resource changing request (UpdateSharedResource command) to the designated user client terminals 2A and 3A (steps S22.1.1 and S22.2.1). The notified user client terminals 2A and 3A change the shared resource information 120 stored in their shared resource information DB 604.

Figure 12:
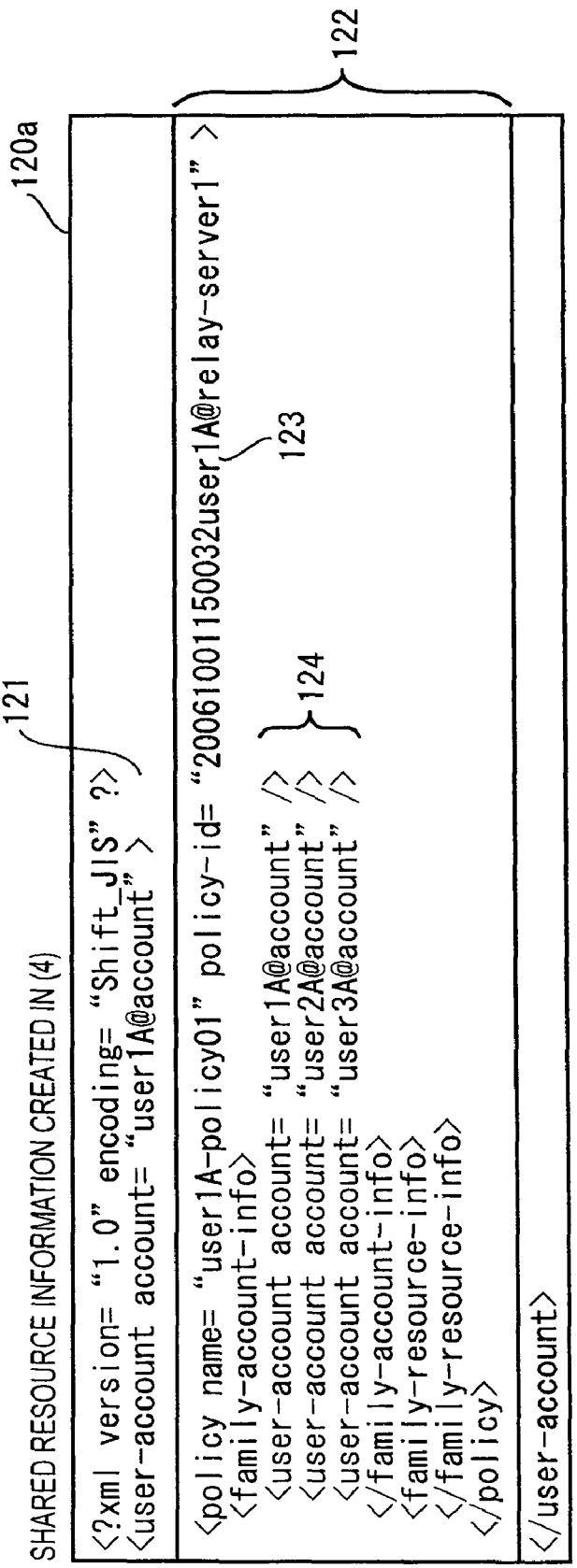
FIG. 12 is a diagram illustrating details of shared resource information in a certain process according to the first embodiment of the invention.

The shared resource information 120a stored in the relay servers R1, R2, and R3 and the client terminals 1A, 2A, and 3A in steps S22 to S22.2.1 after a series of processes of step S22 is performed is shown in FIG. 12. The shared resource information 120a includes shared resource identification information 121 for identifying the shared resource information 120a at a glance. The shared resource information 120a includes family account information 124 which is a set of the account of the owner client terminal 1A and the accounts of the designated user client terminals 2A and 3A.

The process of adding the resource information 126 indicating essences of the shared resources to the shared resource information 120 is performed by a user's operation using the client terminal 1A. That is, the user selects an essence of a shared resource among essences of resources operable by the client terminal 1A and designates the essence of the selected resource with the client terminal 1A. Here, "folderA", "file001.xls", "file002.wrd", and "file003.pdf" are designated.

The designated client terminal 1A transmits a shared resource changing request (UpdateSharedResource command) including the designated information to the relay server R1 (step S23). The relay server R1 having received the shared resource changing request stores the changed shared resource information 120b in its shared resource information DB 506. The relay server R1 transmits the changed shared resource information 120b to the relay servers R2 and R3 connected to the user client terminals 2A and 3A by the use of the NOTIFY method (steps S23.1 and S23.2). The notified relay servers R store the shared resource information 120b in its shared resource information DB 506. The relay servers transmit the shared resource changing request (UpdateSharedResource command) to the user client terminals 2A and 3A (steps S23.1.1 and S23.2.1). The user client terminals 2A and 3A having received the request change the shared resource information 120 stored in their shared resource information DB 604.

The shared resource information 120b stored in the relay servers R and the client terminals T after the processes of step S23 are performed is shown in FIG. 13. In the shared resource information 120b, family resource information 125a is added to the shared resource information 120a created in step S22.

Referring to the shared resource information 120b created by the above-mentioned communication processes, it can be specified that the client terminal 1A is the owner client terminal and that the client terminals 2A and 3A are the user client terminals T. The details of the essences of the resources which can be operated by the owner client terminal 1A and the locations thereof in the network can be specified with reference to the shared resource information 120b.

A step of allowing the client terminal 2B to newly perform a process of creating the shared resource information 120 is described now.

The client terminal 2B transmits an account information transmitting request (GetAccountList command) to the relay server R2 (step S24). In response to the request, the relay server R2 transmits the details of the relay group information 100 stored therein, that is, the relay account information 102, to the client terminal 2B to display the transmitted information on the client terminal 2B. The relay account information 102 is displayed in the client terminal 2B. With the client terminal 1A, the user selects and designates the user client terminals T sharing the resource with reference to the relay account information 102. Here, the client terminals 1A and 3B are designated as the user client terminals.

The designated client terminal 2B transmits a shared resource creating request (CreateSharedResource command) including the information to the relay server R2 (step S25). The relay server R2 having received the shared resource creating request stores the created shared resource information 120 in its shared resource information DB 506. The relay server R2 transmits the created shared resource information 120 to the relay servers R1 and R3 connected to the designated user client terminals 1A and 3B by the use of the NOTIFY method (steps S25.1 and S25.2). The relay servers R1 and R3 having received the notification store the created shared resource information 120 in their shared resource information DB 506. Then, the relay servers R1 and R3 transmits a shared resource changing request (UpdateSharedResource command) to the designated user client terminals 1A and 3B (steps S25.1.1 and S25.2.1). The user client terminals 1A and 3B having received the changing request change the shared resource information 120 stored in their shared resource information DB 604.

Figure 14:
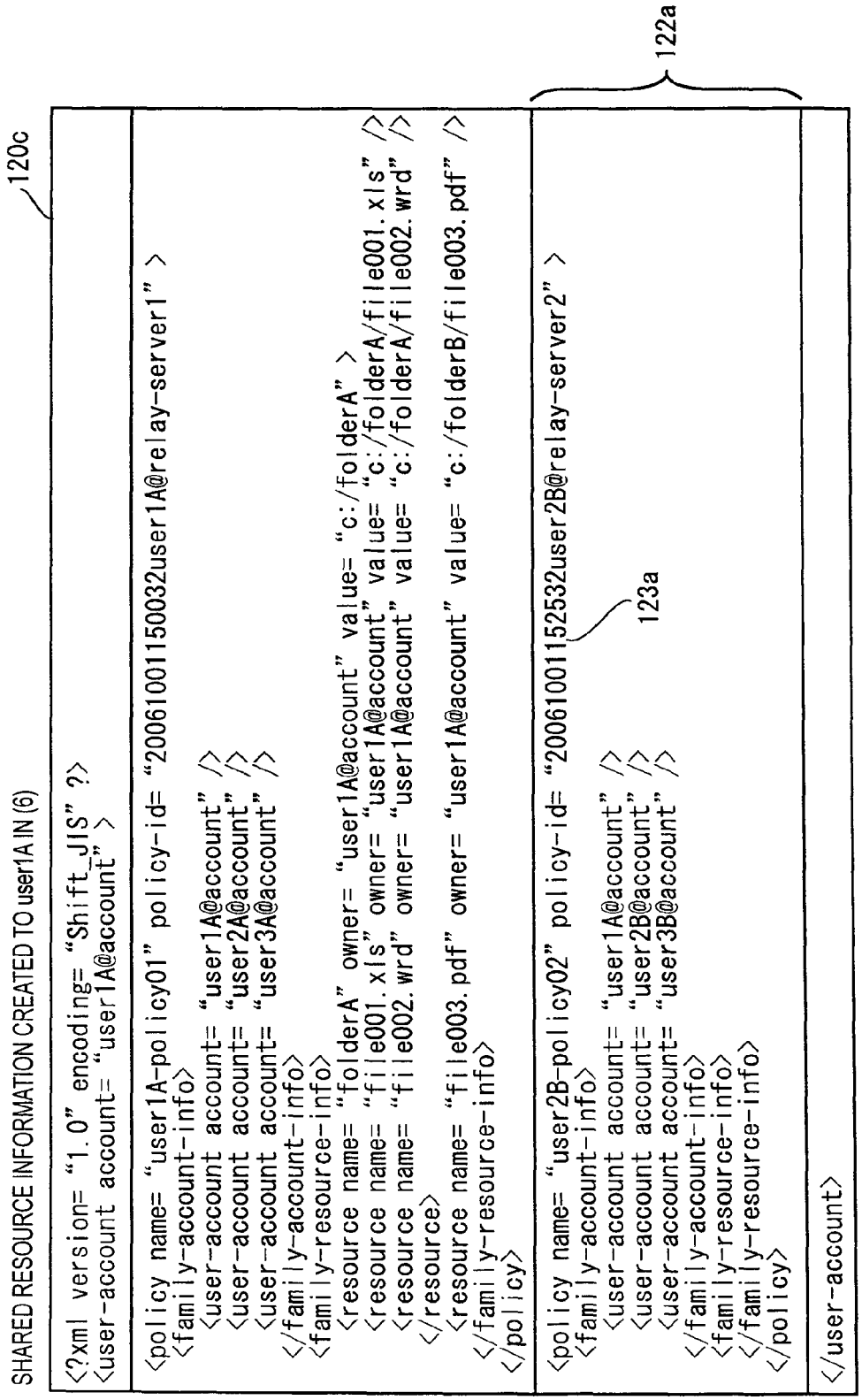
FIG. 14 is a diagram illustrating details of shared resource information in a certain process according to the first embodiment of the invention.

Shared resource information 120c stored in the relay servers R1 and the client terminal 1A is shown in FIG. 14. In the shared resource information 120c, newly created individual shared resource information 122a is added to the shared resource information 120b created in step S23. New shared resource identification information 123a is given to the newly created individual resource information 122a.

Since client terminals 2B and 3B are not associated with the shared resource information 120b previously created, the newly created individual shared resource information 122a is stored as the shared resource information 120 in the client terminals 2B and 3B and the relay servers R2 and R3.

FIG. 15 shows a flow of a communication process when a process of adding the resource information 126 of the resource shared by the client terminal 1A to the newly created individual shared resource information 122a is performed.

The user selects the individual shared resource information 122a to which the resource is added among the shared resource information 120c on the basis of the shared resource identification information 123a and designates the selected information with the client terminal 1A. The user selects a shared resource among the essences of the resources which can be operated by the client terminal 1A and designates the selected resource with the client terminal 1A. Here, "file005.ppt" is designated.

The designated client terminal 1A transmits a shared resource changing request (UpdateSharedResource command) including the designated information to the relay server R1 (step S26). The relay server R1 having received the shared resource changing request stores the changed shared resource information 120d in its shared resource information DB 506. The relay server R1 transmits the changed individual shared resource information 122a to the relay servers R2 and R3 connected to the user client terminals T (2B and 3B) contained in the family account information 124 of the individual shared resource information 122a as a target by the use of the NOTIFY method (steps S26.1 and S26.2). The notified relay servers R2 and R3 change and store the shared resource information 120 in its shared resource information DB 506. The relay servers transmit the shared resource changing request (UpdateSharedResource command) to the user client terminals 2B and 3B (steps S26.1.1 and S26.2.1). The user client terminals 2B and 3B having received the request change the shared resource information 120 stored in their shared resource information DB 604.

The shared resource information 120d stored in the relay server R1 and the client terminal 1A is shown in FIG. 16. In the shared resource information 120d, family resource information 125b is added to the individual shared resource information 122a of the shared resource information 120c created in step S25. The changed shared resource information 122a is stored as the shared resource information 120 in the client terminals 2B and 3B and the relay servers R2 and R3.

A flow of a communication process when a process of adding the resource information 126 to the shared resource information 120 is performed on the individual shared resource information 122a by the client terminal 2B is then shown.

The user selects the individual shared resource information 122a to which the resource is added among the shared resource information 120 on the basis of the shared resource identification information 123a and designates the selected information with the client terminal 2B. The user selects a shared resource among the essences of the resources which can be operated by the client terminal 2B and designates the selected resource with the client terminal 2B. Here, "folderC", "file00A.ppt", "file00B.ppt" are designated.

The designated client terminal 2B transmits a shared resource changing request (UpdateSharedResource command) including the designated information to the relay server R2 (step S27). The relay server R2 having received the shared resource changing request stores the changed shared resource information 120 in its shared resource information DB 506. The relay server R2 transmits the changed individual shared resource information 122 to the relay servers R1 and R3 connected to the user client terminals 1A and 3B sharing the resource by the use of the NOTIFY method (steps S27.1 and S27.2). The notified relay servers R1 and R3 change and store the shared resource information in its shared resource information DB 506. The relay servers transmits the shared resource changing request (UpdateSharedResource command) to the user client terminals 1A and 3B (steps S27.1.1 and S27.2.1). The user client terminals 1A and 3B having received the request change the shared resource information 120 stored in their shared resource information DB 604.

The shared resource information 120e stored in the relay server R1 and the client terminal 1A is shown in FIG. 17. In the shared resource information 120e, family resource information 125c is added to the shared resource information 120d created in step S26. The changed individual shared resource information 122a is stored as the shared resource information 120 in the client terminals 2B and 3B and the relay servers R2 and R3.

In this way, the client terminals T can form a set of client terminals sharing the resources. The client terminals T can change the shared resources by a desired amount as needed and thus can constitute a relay communication system which is excellent in expansibility and flexibility.

Figure 18:
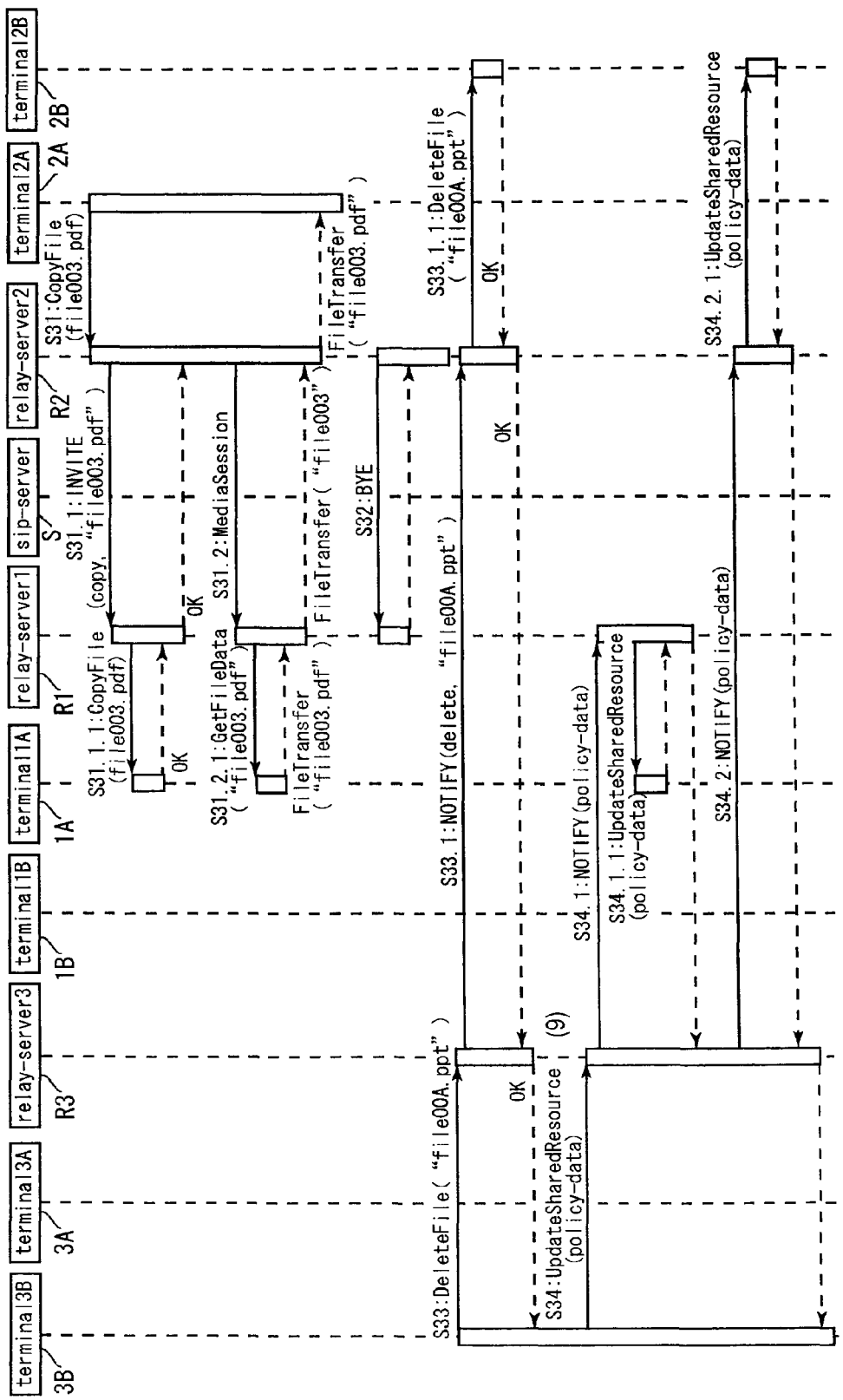
FIG. 18 is a sequence diagram illustrating a communication process according to the first embodiment of the invention.

FIG. 18 shows a flow of a communication process of allowing a client terminal T in a LAN to indirectly operate a resource held by a client terminal T in a different LAN over the Internet.

The first process shows a flow when the client terminal 2A in the LAN2 indirectly copies a resource held and operated by the client terminal 1A in the LAN1.

The client terminal 2A transmits a copy request (Copyfile command) to the relay server R2 when receiving an instruction to copy "file003.pdf" from a user (step S31). The relay server R2 having received the copy request selects the owner client terminal T holding "file003.pdf" as a copy target on the basis of the shared resource information 120. The relay server R2 selects the relay server R connected to the owner client terminal T on the basis of the relay group information 100 and communicates with the selected relay server. Of course, when the resource is not shareable or when the account is not registered, the communication is not made.

Subsequently, the relay server R2 transmits a connection request (INVITE method) to the selected relay server R1 through the external server S (step S31.1). The relay server R1 having received the connection request transmits a copy request to the client terminal 1A (step S31.1.1). The client terminal 1A having received the copy request transmits an OK response to the relay server R1 when it can operate the resource (file003.pdf) as a target. The relay server R1 transmits the OK response to the relay server R2.

The relay server R2 having received the OK response transmits a Mediasession command to the relay server R1 and a communication passage is established between the relay servers R1 and R2 (step S31.2). The relay server R1 having received the Mediasession command transmits a GetFileData command for copying a file to the client terminal 1A to request for copying a file (step S31.2.1). The client terminal 1A having received the file copy request copies "file003" as a target from the resource storing unit 603 and transmits the copied file to the relay server R1. "file003" is transmitted to the client terminal 2A through the relay server R1 and the relay server R2 (FileTransfer command). The essence of the resource may be copied from the file server F, as well as the resource storing unit 603.

When a series of communication processes are finished, a cutting request (BYE method) is transmitted from the relay server R2 to the relay server R1 so as to cut the established communication path, thereby cutting the communication path and ending the communication between both relay servers (step S32).

The next flow is a flow when the client terminal 3B in the LAN 3 indirectly deletes an operable resource which is held by the client terminal 2B in the LAN2.

When receiving an instruction for deleting "file00A.ppt" from a user, the client terminal 3B transmits a Deletefile command for deleting a file to the relay server R3 to request for the deletion (step S33). The relay server R3 having received the deleting request specifies the owner client terminal T holding and operating "file00A.ppt" as a deletion target and a relay server R connected to the owner client terminal T on the basis of the shared resource information 120 and the relay group information 100.

The relay server R3 transmits information on the deleting request to the specified relay server R2 through the external server S by the use of the NOTIFY method (step S33.1). The relay server R2 having received the information on the deleting request transmits a Deletefile command to the client terminal 2B to request for the deletion (step S33.1.1). The client terminal 2B having received the deleting request deletes the resource (file00A.ppt) as a target from the resource storing unit 603. An OK response is transmitted to the client terminal 3B through the relay server R2 and the relay server R3.

FIG. 19 shows shared resource information 120*f* after the deletion process is performed. As shown in FIG. 19, the resource information 126 of "file00A.ppt" as a deletion target is deleted from the shared resource information 120. The essence of the resource is deleted.

When an operation of changing the details of the shared resource information 120 such as the deletion of a resource has been performed, a process of updating the shared resource information is subsequently performed.

Specifically, the client terminal 3B having been instructed to perform an operation accompanying the change of the shared resource information 120 transmits a shared resource changing request (UpdateSharedResource command) to the relay server R3 (step S34). The relay server R3 having received the changing request transmits the changed shared resource information 120 to the relay servers R1 and R2 associated with the changed shared resource information 120 by the use of the NOTIFY method (steps S34.1 and S34.2). The relay servers R1 and R2 update and store the shared resource information in their shared resource information DB 506.

Then, the relay servers transmit the shared resource changing request (UpdateSharedResource command) to the user client terminals 1A and 2B associated with the changed shared resource information 120 (steps S34.1.1 and S34.2.1). The user client terminals 1A and 2B having received the changing request changes the shared resource information stored in their shared resource information DB 604.

That is, when the shared resource information 120 is changed, the fact is notified to the relevant relay servers R and the relevant client terminals T and the shared resource information 120 is updated at once.

Second Embodiment

A second embodiment of the invention provides a relay communication system which can dynamically cope with an unexpected trouble or a case where an access status of a relay server R or a client terminal T varies.

Elements of a relay communication system such as relay servers R and client terminals T and basic configurations of communication processes are equal to those of the first embodiment. This embodiment will be described in detail with reference to the flowchart of FIG. 20 and the sequence diagram of FIG. 21

Figure 21:
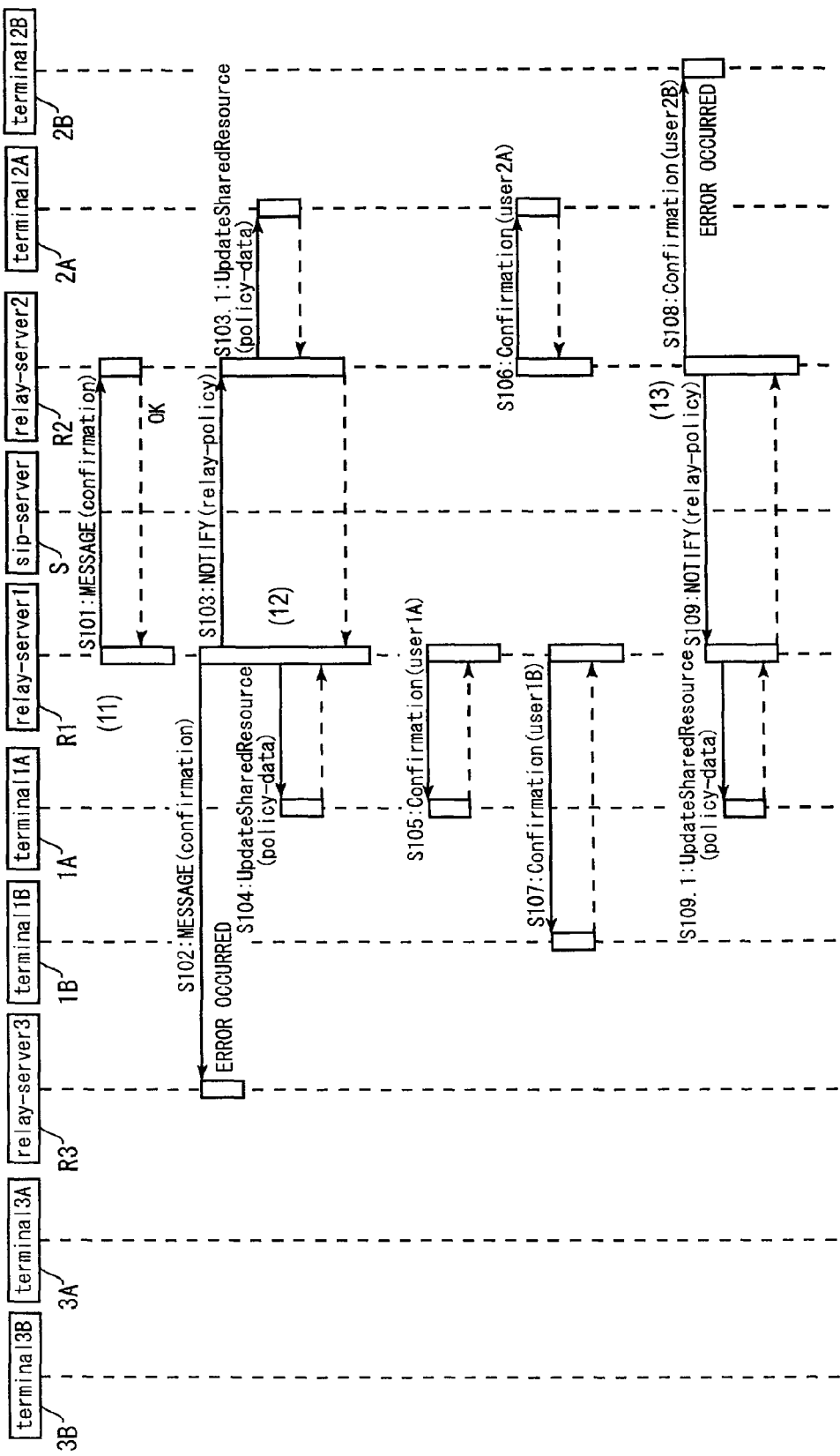
FIG. 21 is a sequence diagram illustrating a communication process according to the second embodiment of the invention.

FIG. 20 shows operation checking processes which are performed by the relay servers R. FIG. 21 shows a communication flow processed in the relay communication system at the time of performing the operation checking processes. In FIG. 21, the relay server R1 checks operations of the relevant relay servers R and an access trouble occurs in the relay server R3. In addition, in FIG. 21, the relay server R1 and the relay server R2 check operations of the client terminals T and an access trouble occurs in the client terminal 2B.

FIG. 22 shows the relay group information 100 stored in the relay server R1 before starting the process steps shown in FIG. 21. FIG. 23 shows the shared resource information 120 stored in the relay server R1 and the client terminal 1A before starting the process steps shown in FIG. 21. Unlike the first embodiment, the information 100 and 120 according to this embodiment contains status information (status) 107 and 127, respectively. For example, "status='ok'" or "status='logon'" indicates that the displayed relay server R, client terminal T, or resource is accessible.

Steps S110 and S111 shown in FIG. 20 show a process using a timer. That is, the relay servers R according to this embodiment have a timer function (not shown) and have an unit for executing a predetermined program at a constant time interval corresponding to a user's time setting.

Specifically, a processing interval (time) of a program is set by an operator (step S110). When the timer is counted and reaches a predetermined time, a series of processes of checking an operation are preformed (step S111). That is, when the timer reaches a predetermined time, a process of reading the relay group information from the relay group information DB 505 is performed (step S112). Then, until the operations of all the relay servers R stored in the relay group information 100 are completely checked, the operation checking process is repeatedly performed (step S113).

At the time of checking the operations, an operation check request for checking whether they are accessible is transmitted to different relay servers R stored in the read relay group information 100 (step S114). Then, it is checked whether a response is returned (step S115). When it is checked that a response is returned, it is checked that it is accessible. When it is checked that a response is not returned, it is checked that it is not accessible and the relay group information 100 stored therein is updated (step S116).

For example, in FIG. 21, the relay server R1 performs the operation checking process on the relay servers R2 and R3 constituting a relay group. That is, the relay server R1 transmits a MESSAGE method to the relay server R2 (step S101). The relay server R2 having received the MESSAGE method returns an OK response to the relay server R1 as a transmission source (YES in step S115 of FIG. 20). As a result, the relay server R1 checks that the relay server R2 is accessible.

Similarly, the relay server R1 transmits the MESSAGE method to the relay server R3 (step S102). The relay server R3 does not return the OK response to the relay server R1 as a transmission source and transmits no response. That is, the relay server R3 is inaccessible because it is powered off or downed for a certain reason. Thus, the relay server R1 checks that the relay server R3 is inaccessible (NO in step S115 of FIG. 20). In this case, the relay server R1 updates details of the relay group information 100 stored therein (step S116 of FIG. 20).

In FIG. 20, when the series of processes of checking an operation is finished, the relay server R checks whether the relay group information 100 has been updated (step S117). When it is checked that the relay group information 100 has been updated, a change notification of the relay group information 100 is transmitted to the relevant relay servers R (step S118).

Specifically, as shown in FIG. 21, the change notification of the relay group information 100 is transmitted from the relay server R1 to the relay server R2 by the use of the NOTIFY method (step S103).

The details of the transmitted change notification are shown in FIG. 24. As shown in FIG. 24, "error" indicating that it is inaccessible is written in the status information (status) 107a of the inaccessible relay server R3. The relay server R2 having received the change notification updates the details of the relay group information 100 stored therein on the basis of the change notification.

Subsequently, a process of updating the shared resource information 120 is performed (step S119).

For example, in FIG. 21, since the relay server R3 is inaccessible, the resource of which the owner is a client terminal T (for example, 3A) registered in the relay server R3 cannot be operated. Accordingly, the relay server R1 updates the corresponding data of the shared resource information 120 stored therein on the basis of the details of the updated relay group information 100. The relay server R2 also updates the corresponding data of the shared resource information 120.

The relay servers R1 and R2 transmits the change notification of the shared resource information 120 to the relevant client terminals T stored in their account information DB 504 (step S120). The relevant client terminals T are client terminals T written in the family account information 124 of the shared resource information 120 containing the resources of which an access status has been updated. Specifically, in FIG. 21, the relay server R2 transmits a shared resource updating request (UpdateSharedResource command) to the client terminal 2A (step S103.1). Similarly, the relay server R1 transmits the shared resource updating request (UpdateSharedResource command) to the client terminal 1A (step S104).

The details of the change notification transmitted in step S103 are shown in FIG. 25. As shown in the figure, "error" indicating that it is inaccessible is written in the status information (status) 127a of a resource "file003.pdf", the owner of which is the client terminal 3A connected to the relay server 3. The client terminals 1A and 2A having received the change notification update the details of the shared resource information 120 stored therein on the basis of the change notification.

In this way, the relay server R periodically checks operations of the different relay servers R, updates the relevant information when the access status is changed, and transmits the resultant information to the relevant relay servers R.

The relay server R performs the operation checking process on the client terminals T, which are connected to the same LAN and stored in the account information DB 504 thereof.

As shown in FIG. 20, the relay server R periodically performs the operation checking process by the use of the timer function. Since steps S130 and S131 are equal to steps S110 and S111 described above, description thereof is omitted.

When the timer reaches a predetermined time, a process of reading the account information of the client terminals T stored in the account information DB 504 (step S132). Then, until the operation checking process on all the client terminals T stored in the account information DB 504 is finished, the operation checking process is repeatedly performed (step S133).

In operation checking process, an operation checking request for checking whether they are accessible is transmitted to the client terminals T stored in the account information DB 504 (step S134). Then, it is checked whether a response is returned (step S135). When it is checked that a response is returned, it is checked that it is accessible. When it is checked that a response is not returned, it is checked that it is inaccessible and the corresponding information stored in the relay group information DB 505 is updated (step S136).

For example, in FIG. 21, the relay server R1 performs the operation checking process on the client terminals 1A and 1B stored in the account information DB 504 thereof. That is, the relay server R1 transmits a checking request command (Confirmation) to the client terminal 1A (step S105). The client terminal 1A having received the checking request command returns a response to the relay server R1 as a transmission source (YES in step S135 of FIG. 20). As a result, the relay server R1 checks that client terminal 1A is accessible. Similarly, the relay server R transmits a checking request command to the client terminal 1B to check that it is accessible (step S107).

The relay server R2 also performs the operation checking process and transmits the checking request command to the client terminal 2A stored in the account information DB 504 of the relay server R2 to check that it is accessible (step S106).

Similarly, the relay server R2 transmits the checking request command to the client terminal 2B (step S108). The client terminal 2B does not return a response and transmits no response. That is, the client terminal 2B is inaccessible because it is powered off or logged-off or downed for a certain reason. Thus, the relay server R2 checks that the client terminal 2B is inaccessible (NO in step S135 of FIG. 20). In this case, the relay server R2 updates details of the relay group information 100 stored therein (step S136 of FIG. 20).

In FIG. 20, when the series of processes of checking an operation is finished, the relay server R checks whether the relay group information 100 has been updated (step S137). When it is checked that the relay group information 100 has been updated, a change notification of the relay group information 100 is transmitted to the relevant relay servers R (step S138).

Specifically, as shown in FIG. 21, the change notification of the relay group information 100 is transmitted from the relay server R2 to the relay server R1 by the use of the NOTIFY method (step S109). Since the relay server R3 is inaccessible, the change notification is not transmitted to the relay server R3.

The details of the transmitted change notification are shown in FIG. 26. As shown in FIG. 26, "logoff" indicating that it is inaccessible is written in the status information (status) 107b of the inaccessible client terminal 2B. The relay server R1 having received the change notification updates the details of the relay group information 100 stored therein on the basis of the change notification.

Subsequently, similarly to the previous step S119, a process of updating the shared resource information 120 is performed. This is because the client terminal 2B is inaccessible and thus the resource of which the owner is the client terminal 2B cannot be operated. The relay server R2 updates the corresponding data of the shared resource information 120 stored therein on the basis of the details of the updated relay group information 100. The relay server R1 similarly updates the corresponding data of the shared resource information 120.

Similarly to the previous step S120, the relay servers R1 and R2 transmits the change notification of the shared resource information 120 to the relevant client terminals T (here, the client terminal 1A).

Specifically, in FIG. 21, the relay server R1 transmits the shared resource updating request (UpdateSharedResource command) to the client terminal 1A (step S109.1)

The details of the change notification transmitted here are shown in FIG. 27. As shown in FIG. 27, "error" indicating that it is inaccessible is written in the status information (status) 127b of resources "folderC", "file00A.ppt", and "file00B.ppt", the owner of which is the accessible client terminal 2B. The client terminal 1A having received the change notification updates the details of the shared resource information 120 stored therein on the basis of the change notification.

In this way, the relay server R periodically checks the operations of the client terminals registered therein, updates the relevant information when the access status is changed, and transmits the resultant information to the relevant relay servers R.

After the inaccessibility is checked and then a series of updating processes are performed, the access status may be restored. In this case, in the operation checking process after the restoration, the status information (status) 107 and 127 is updated from the details indicating the inaccessibility to the details indicating the accessibility by means of the same processes as the inaccessible case.

As described above, in the relay communication system according to this embodiment, the relay group information 100 and the shared resource information 120 held in the relay communication system are always updated to the latest information by the relay servers R. Accordingly, even when the relay servers R are powered off or logged off or an unexpected trouble occurs therein, the statuses can be easily grasped, thereby not confusing the user.

Third Embodiment

A third embodiment of the invention provides a more dynamic relay communication system which can use the resources without any consciousness, since it does not require troublesome works such as a change of set conditions even when a client terminal T having been registered in a LAN moves to a different LAN.

Elements of a relay communication system such as relay servers R and client terminals T and basic configurations of communication processes are equal to those of the first embodiment. This embodiment will be described in detail with reference to the sequence diagrams of FIGS. 28 and 29.

Figure 28:
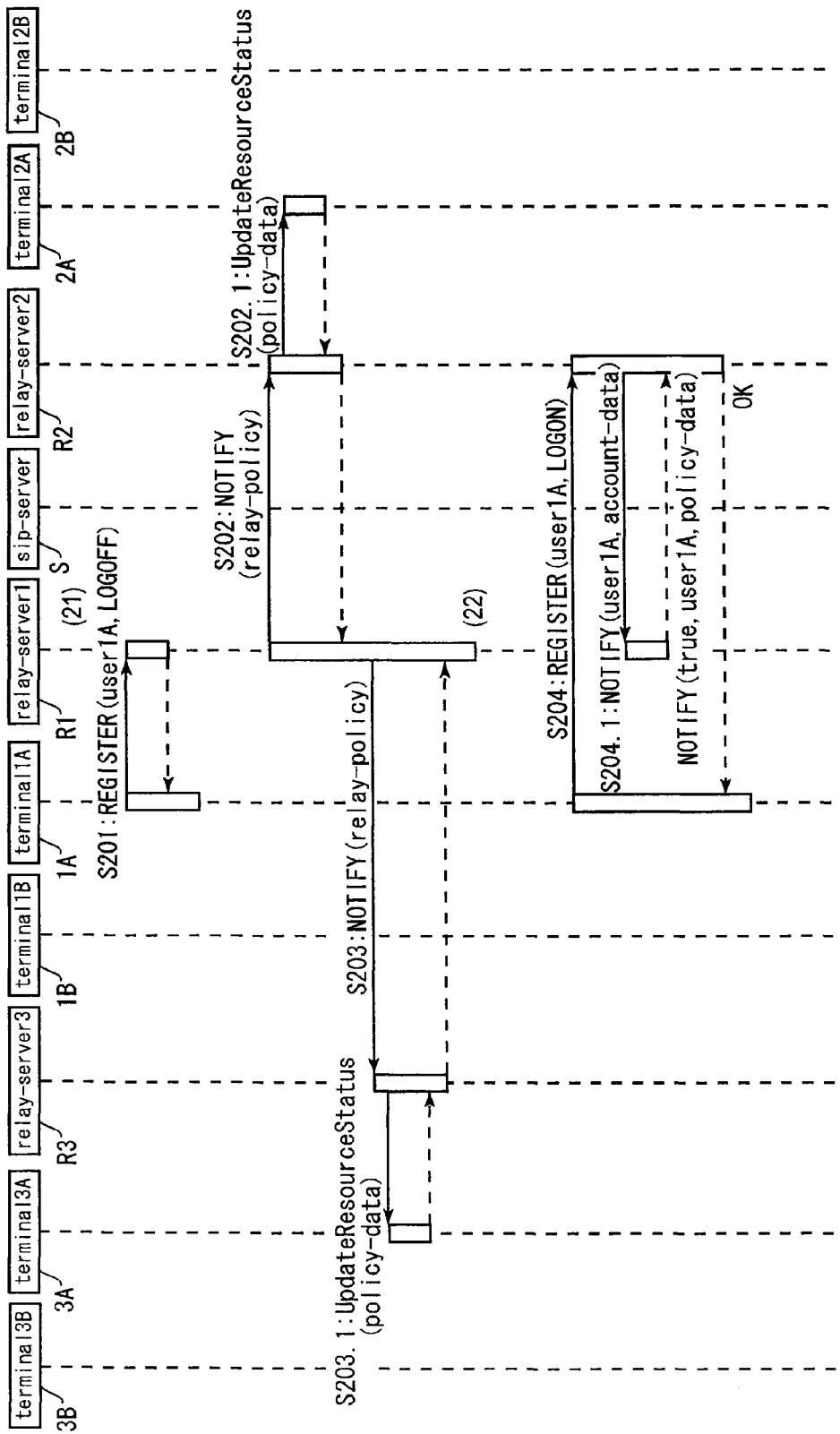
FIG. 28 is a sequence diagram illustrating a communication process according to a third embodiment of the invention.
Figure 29:
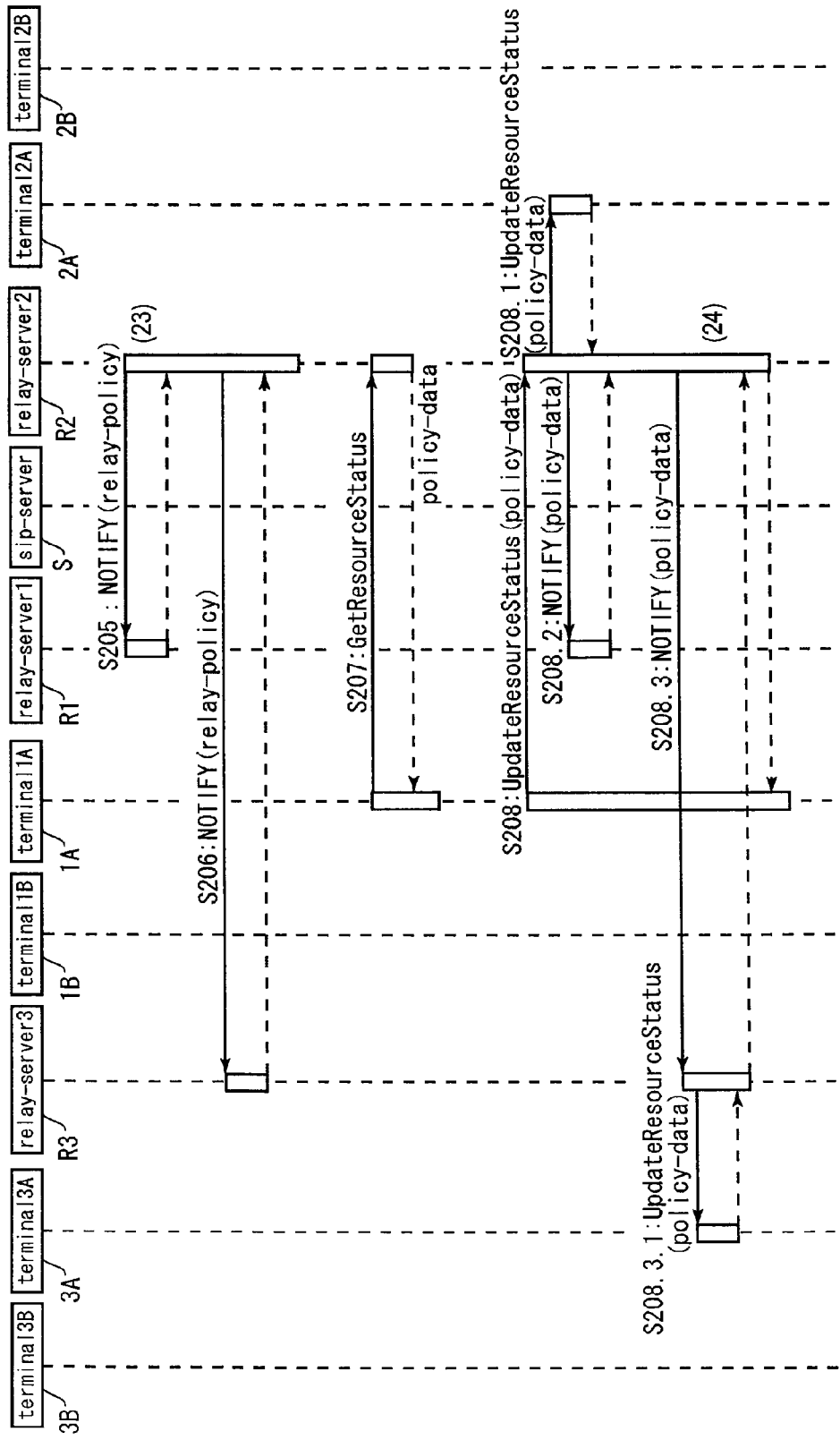
FIG. 29 is a sequence diagram illustrating a communication process according to the third embodiment of the invention.

FIGS. 28 and 29 show flows of a communication process when a client terminal T having been registered in a LAN moves to and accesses a different LAN. Specifically, the client terminal 1A registered in the relay server R1 of the LAN1 is logged off and is logged in the relay server R2 of the LAN2.

FIG. 30 shows the details of the relay group information 100 stored in the relevant relay servers R1, R2, and R3 before the client terminal 1A moves. FIG. 31 shows the details of the shared resource information 120 stored in the client terminals 1A, 2A, and 3A and the relay servers R1, R2, and R3 which constitute a share group before the client terminal 1A moves.

In FIG. 31, for example, value='//network/z:folderZ'" is written in the address information indicating a location of a resource essence having a name of "folderNet". This means that the resource essence having the name "folderNet" is located in a storage unit on the network of the LAN1 different from the client terminal 1A. In this embodiment, it is assumed that "folderZ" is located in the file server F disposed in the LAN1. On the other hand, "value='c:/folderA'" and the like is located in a storage unit built in the client terminal 1A.

Unlike the first embodiment, the information 100 and 120 according to this embodiment contains status information (status) 107 and 127, respectively, indicating access statuses of the relay server R, client terminal T, and resource. For example, "status='ok'" or "status='logon'" indicates that the displayed relay server R, client terminal T, or resource is accessible.

Access information (server) 108 indicating the relay server R connected to the corresponding client terminal at that time is written in the relay group information 100 according to this embodiment every client terminal T. For example, "server='relay-server1'" indicates that an access destination at that time is the relay server R1.

FIG. 28 is referred to. The client terminal 1A which is disposed in the LAN1 as shown in FIG. 1 and which is registered in advance in the relay server R1 as shown in FIG. 30 transmits a logoff request (REGISTER) to the relay server R1 (step S201). The relay server R1 having received the request returns a response to the client terminal 1A having transmitted the request.

Since the client terminal 1A is logged off, the details of the relay group information 100 is changed and the relay server R1 updates the relay group information 100 stored therein. Then, the relay server R1 transmits the change notification of the relay group information to the different relay servers R2 and R3 constituting a relay group including the client terminal 1A by the use of the NOTIFY method (steps S202 and S203). The relay servers R2 and R3 having received the change notification update the relay group information 100 stored therein and returns a response to the transmission source.

Figure 32:
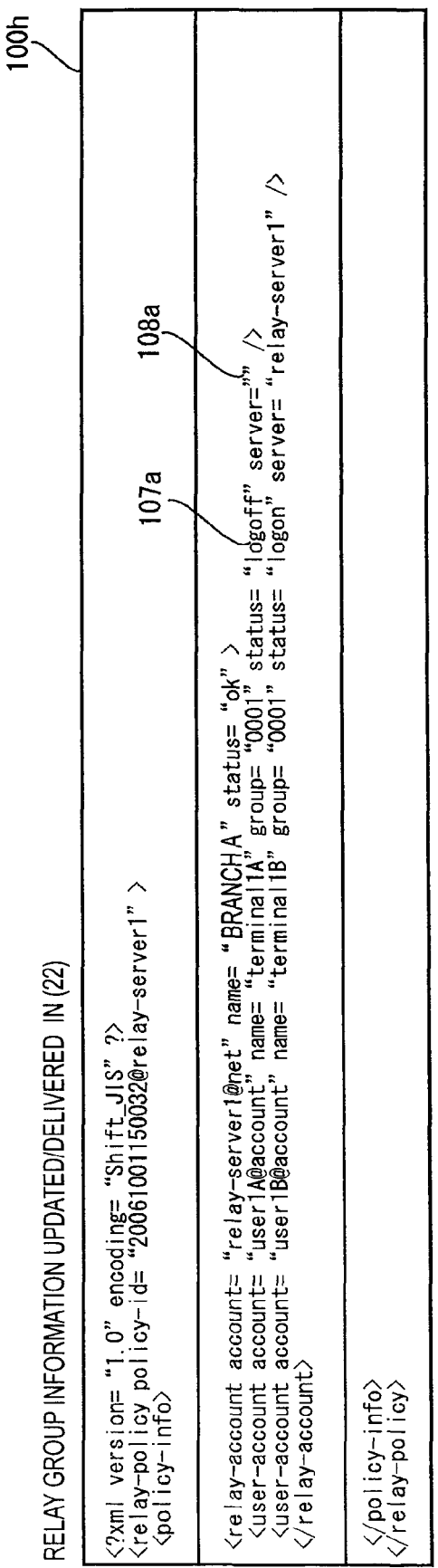
FIG. 32 is a diagram illustrating details of relay group information in a certain process according to the third embodiment of the invention.

FIG. 32 shows the details of the relay group information 100h transmitted and received with the change notification. As shown in FIG. 32, "logoff" indicating the inaccessibility is written in the status information 107a of the logged-off client terminal 1A. Since the access to the relay server R1 is cut off, "relay-server1" is deleted from the access information 108a indicating the relay server R as an access destination to be empty.

The details of the shared resource information are updated, since the client terminal 1A is logged off. For example, a resource of which the owner is the client terminal 1A cannot be operated since the client terminal 1A is logged off. Accordingly, the relay server R1 updates the corresponding data of the shared resource information 120 stored therein on the basis of the details of the updated relay group information 100.

The relay server R1 transmits the change notification of the shared resource information 120 to the different relay servers R in which the client terminals T associated with the update are registered. The client terminals T associated with the update mean client terminals T contained in the family account information 124 of the shared resource information 120 including a resource of which the access status is changed due to the update. Since the notification destination of this change notification is equal to that of the previous change notification of the relay group information 100, this change notification is transmitted in the same way as steps S202 and S203.

The relay servers R2 and R3 having received the change notification of the shared resource information 120 update the shared resource information 120 stored therein. A status changing request (UpdateResourceStatus command) is transmitted to the relevant client terminals 2A and 3A on the basis of the change notification (steps S202.1 and 203.1). The client terminals 2A and 3A having received the status changing request update the shared resource information 120 stored therein and returns a response to the transmission source.

FIG. 33 shows the details of the shared resource information 120h transmitted and received at the time of update. As shown in FIG. 33, "error" indicating the inaccessibility is written in the status information 127a of a resource (for example, "folderA") of which the owner is the logged-off client terminal 1A.

Accordingly, the access status of a client terminal T can be easily determined with reference to the relay group information 100 and the access status of a resource can be easily determined with reference to the shared resource information 120.

The logged-off client terminal 1A moves to the LAN2 and transmits an access request for logon (REGISTER) to the relay server R2 (step S204). The relay server R2 having received the access request determines whether the client terminal 1A having transmitted the access request is registered with reference to the information of the client terminal T stored in the account information registering unit 504 thereof. When it is determined that it is not registered, the relay server R1 in which the client terminal 1A having transmitted the access request is registered is specified on the basis of the relay group information 100. The relay server R2 does not accept the access request for logon, when it cannot acquire the information of the client terminal 1A and thus cannot specify the relay server. The relay server accepts the access request for logon when the client terminal is registered therein.

The relay server R2 inquires of the specified relay server R1 whether the long information such as an ID or a password received from the client terminal 1A is correct by transmitting a check request (NOTIFY) (step S204.1). The relay server R1 having received the check request transmits the answer to whether the logon information of the client terminal 1A is correct to the relay server R2 by the use of the NOTIFY method, with reference to the relay group information 100 stored therein. The relay server R2 having confirmed that the client terminal 1A having transmitted the request for logon is valid transmits the OK response to the client terminal 1A and accepts the logon request of the client terminal 1A to permit the access thereto.

When it accepts the logon request of the client terminal 1A, the relay server R2 updates the relay group information 100 stored therein. As shown in FIG. 29, the change notification of the relay group information 100 to the relevant relay servers R1 and R3 by the use of the NOTIFY method (step S205 and S206). The relay servers R1 and R3 having received the change notification updates the relay group information 100 stored therein on the basis of the change notification and returns a response to the transmission source.

FIG. 34 shows the details of the relay group information 100i transmitted and received at the time of update. As shown in FIG. 34, "logon" indicating the accessibility is written in the status information 107b of the logged-on client terminal 1A. Similarly, "relay-server2" indicating the relay server R2 as a new access destination is written in the access information 108b. Accordingly, referring to this information, it can be determined that the client terminal 1A registered in the relay server R1 of the LAN1 moves to the LAN2 and logs on the relay server R2.

The client terminal 1A transmits a transmission request (GetResourceStatus command) for the shared resource information 120 associated with the client terminal 1A to the logged-on relay server R2 (step S207). The relay server R2 having received the transmission request transmits the corresponding shared resource information 120 to the client terminal 1A.

The client terminal 1A having received the shared resource information 120 automatically checks whether a resource of which the owner is the client terminal 1A can be operated and updates the status information 127 of the shared resource information 120 on the basis of the check result. The client terminal 1A transmits the status changing request (UpdateResourceStatus command) to the logged-on relay server R2 on the basis of the updated shared information 120 (step S208).

The relay server R2 having received the status changing request updates the shared resource information 120 as a target stored therein. The relay server R2 transmits the status changing request (UpdateResourceStatus command) to the client terminal T (2A) which is registered therein and which is contained in the family account information 124 of the shared resource information 120 as a target (step S208.1). The client terminal 2A having received the status changing request updates the shared resource information 120 stored therein and returns a response to the transmission source.

The change notification of the shared resource information is transmitted to the relay servers R1 and R3 in which the client terminals T (1A and 3A) contained in the family account information 124 is registered (steps S208.2 and S208.3). The relay servers R1 and R3 having received the change notification update the shared resource information 120 stored therein. The relay server R3 transmits the status changing request (UpdateResourceStatus command) to the client terminal 3A (step S208.3.1). The client terminal 3A having received the status changing request updates the shared resource information 120 stored therein and returns a response to the transmission source. The relay server R1 does not transmit the status changing request to the client terminal 1A. This is because the client terminal 1A logs on the relay server R2 already.

FIG. 35 shows the details of the shared resource information 120$i$ transmitted and received at the time of update. As shown in FIG. 35, the status information 127$b$ in which the client terminal 1A having moved is owner is changed from the inaccessibility (error) to the accessibility (ok).

However, since the client terminal 1A is the owner but moves to the LAN2, the client terminal 1A cannot operate the resource, for example, "folderNet", stored in the folderZ of the file server F disposed on the network of the LAN1. Accordingly, the status information 127$c$ still contains the inaccessibility (error).

The details of the relay group information 100 and the shared resource information 120 are sequentially updated in the relay communication system. Accordingly, even when a user moves to a different LAN and accesses the different LAN, the user can operate the resources as if it does not move.

As described above, in the relay communication system employing the relay server according to the invention, a client terminal in a different LAN can operate a resource held by a different client terminal over the WAN as if it holds the resource.

It is possible to dynamically cope with the case where a client terminal having been registered in a LAN moves to and is logged on a different LAN and to use the resources without any consciousness, since it does not require troublesome works such as a change of set conditions.

Fourth Embodiment

A fourth embodiment of the invention will be described now. Elements of a relay communication system such as relay servers R and client terminals T and basic configurations of communication processes are equal to those of the first embodiment. This embodiment will be described in detail with reference to FIGS. 36 to 44.

The controller 602 of the client terminal T performs a process of displaying the details of the shared resource information 120 in cooperation with the display unit 605, in addition to the above-mentioned function. In response to a command for operating a resource, the controller 602 performs a process of determining whether the resource can be operated directly and a process of registering the shared resource information 120 in the relay server R. The controller 602 performs a process of checking whether an operable resource stored in the relay server R can be periodically accessed and a process of transmits the change notification of the shared resource information 120 to the relay server when it is checked that the resource is inaccessible.

An example of the shared resource information 120 is shown in FIG. 36. FIG. 36 is a diagram illustrating the shared resource information 120 stored in the shared resource information DB 604 of the client terminal 1A. The same shared resource information 120 is stored in the shared resource information DB 506 of the relay server R1 registered in the client terminal 1A. The shared resource information 120 includes account identification information 1221 indicating that it is the shared resource information 120 of the client terminal 1A and individual shared resource information 122 associated with the client terminal 1A. The individual shared resource information 122 includes shared resource identification information 123, family account information 124, and family resource information 125.

The family resource information 125 is a set of resource information 126 indicating an essence of a resource such as a file or a folder held by the client terminal T. The resource information 126 includes name information (for example, resource name="folderA") indicating a name of the essence of the shared resource. The resource information 126 further includes owner information 128 (for example, owner='user1A@account') indicating an account of the client terminal T (owner client terminal) which can directly operate the essence of the resource. The resource information 126 further includes address information 129 (for example, value='c:/folderA') indicating a location of the essence of the resource and status information 127 (for example, status='ok') indicating the access status of the resource.

The number of individual shared resource information 122 included in the shared resource information 120 shown in FIG. 36 is one, but plural individual shared resource information 122 may be included therein. The individual shared resource information 122 can be freely created as needed. Accordingly, when the details of the family account information 124 and the family resource information 125 are different, the individual shared resource information is individually created.

By referring to the shared resource information 120 having the above-mentioned configuration, it is possible to specify the client terminal T sharing a resource and to see the type or location of the resource.

The shared resource information 120 is registered, for example, by the client terminal T. That is, the client terminal T has a unit for registering in the relay server R information on the resources (resource information 126) which can be directly or indirectly operated by the client terminal T or information of the accounts of the different client terminals T sharing the resource. Accordingly, an operator can easily create and update the shared resource information 120 by the use of the display unit 605 of the client terminal T.

Figure 37:
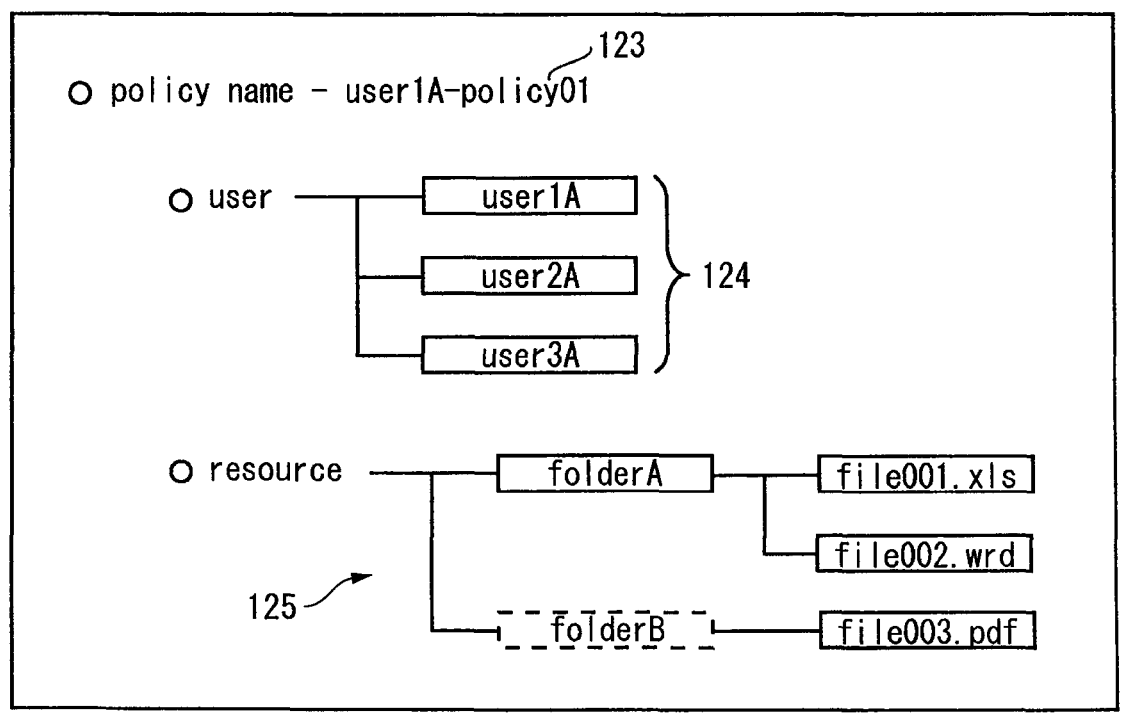
FIG. 37 is a diagram illustrating details of shared resource information displayed by a communication device according to the fourth embodiment of the invention.

For example, the shared resource information 120 shown in FIG. 36 is displayed on the display unit 605 of the client terminal 1A and the like as shown in FIG. 37. The shared resource identification information 123, the family account information 124, and the family resource information 125 included in the shared resource information are simplified and displayed on the display unit. The operator can specify the client terminal T sharing the resource and can easily see the type or location of the shared resource, by viewing the display. By operating (clicking) the displayed resource, various processing operations such as copy can be performed in a picture for processing the resource.

In operating the resource, the relay server R can perform a seeming operation based on the update of the shared resource information 120 in one mode selected from two modes of a synchronous mode in which an essence of a resource is actually operated and an asynchronous mode in which the essence of the resource is not actually operated.

Figure 42:
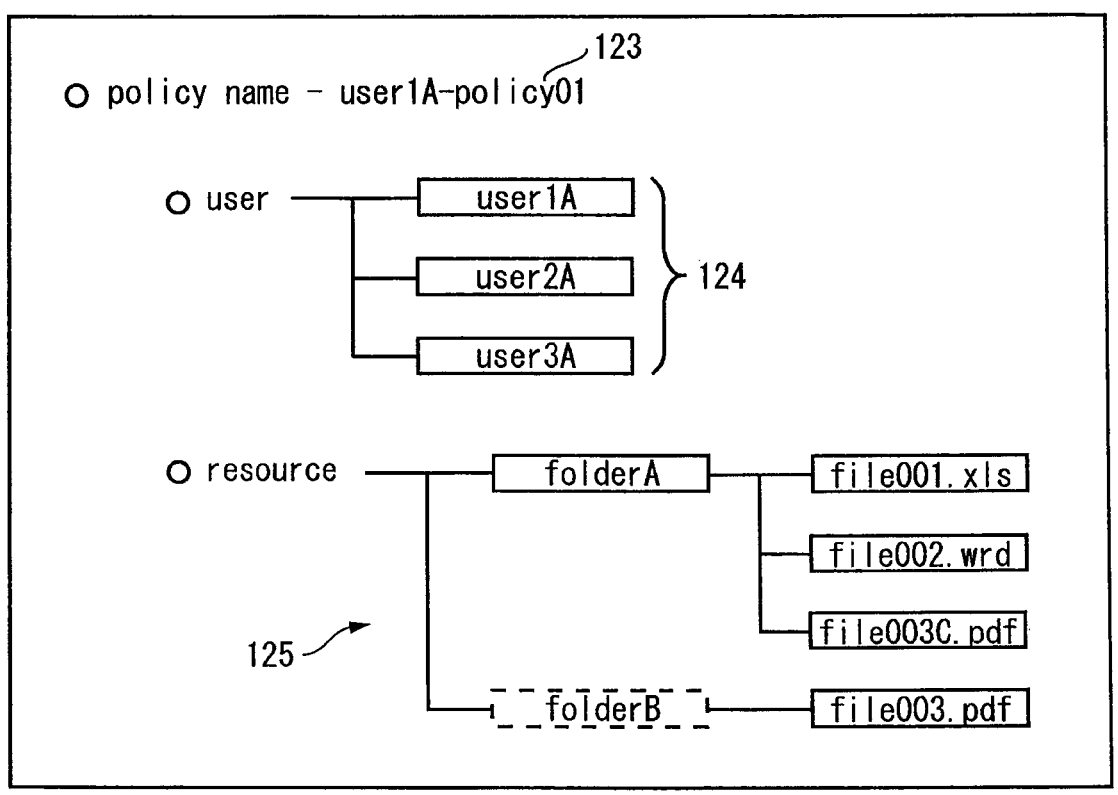
FIG. 42 is a diagram illustrating details of shared resource information displayed by a communication device according to the fourth embodiment of the invention.

Here, the seeming operation based on the update of the shared resource information 120 is an operation of editing the details of the shared resource information 120 regardless of an essential operation of the resource, by operating the resource displayed on the display unit 605. In other words, the operation of the resource is reflected at least in the shared resource information 120. The information on the resources contained in the shared resource information 120 is displayed through a user interface as shown in FIGS. 37 and 42. By editing the shared resource information 120, the user interface is also changed. Accordingly, a user is allowed to feel as if the essence of the resource is actually operated, whether the essence of the resource is operated.

One of both modes may be set in advance at the time of initially setting the relay communication system or may be selected by a user at the time of operating a resource. At the time of registering a resource as a shared resource, it may be established in advance in what mode the respective resources are operated.

Figure 38:
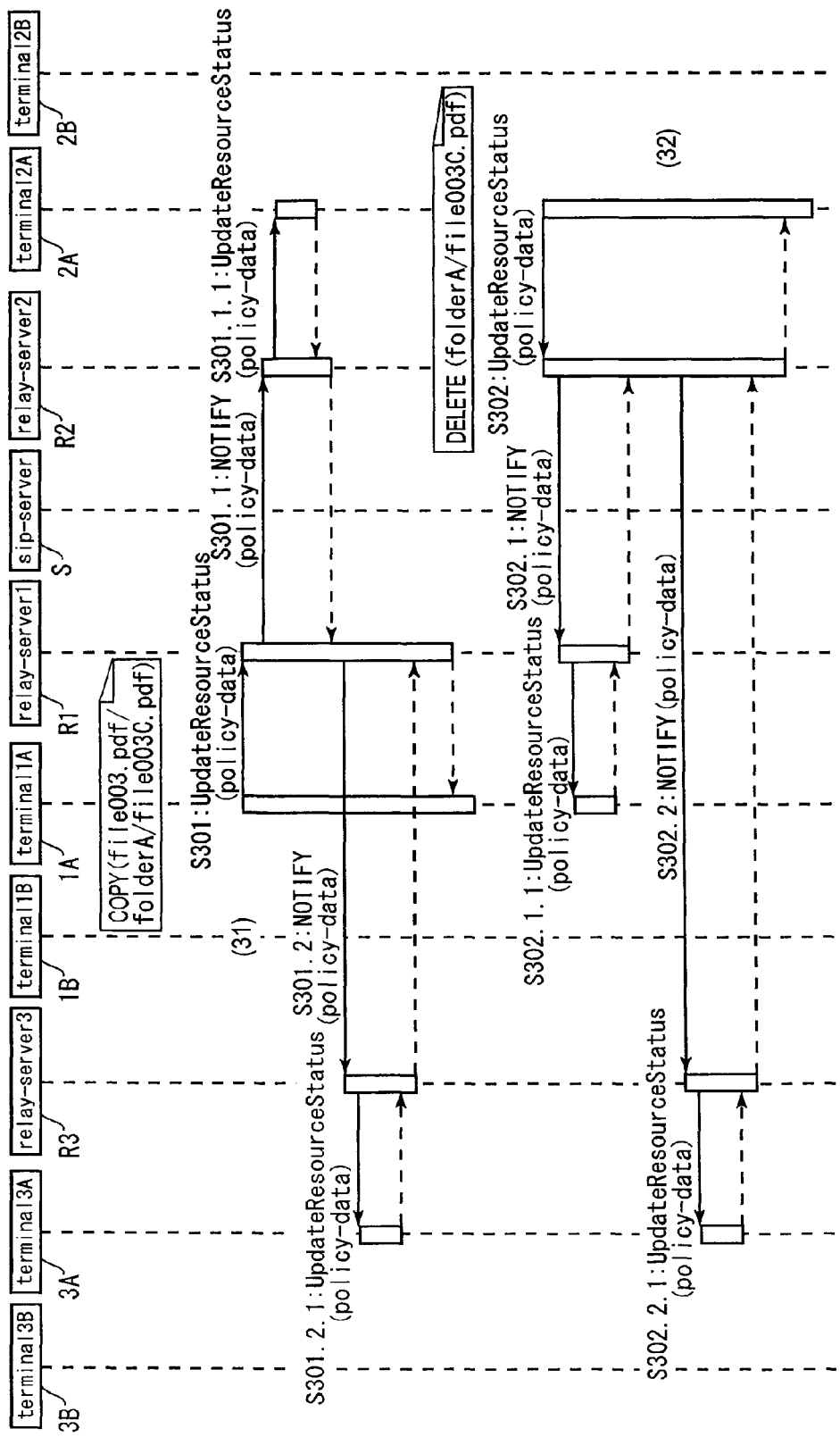
FIG. 38 is a sequence diagram illustrating a flow of a communication process in operating a resource according to the fourth embodiment of the invention.
Figure 39:
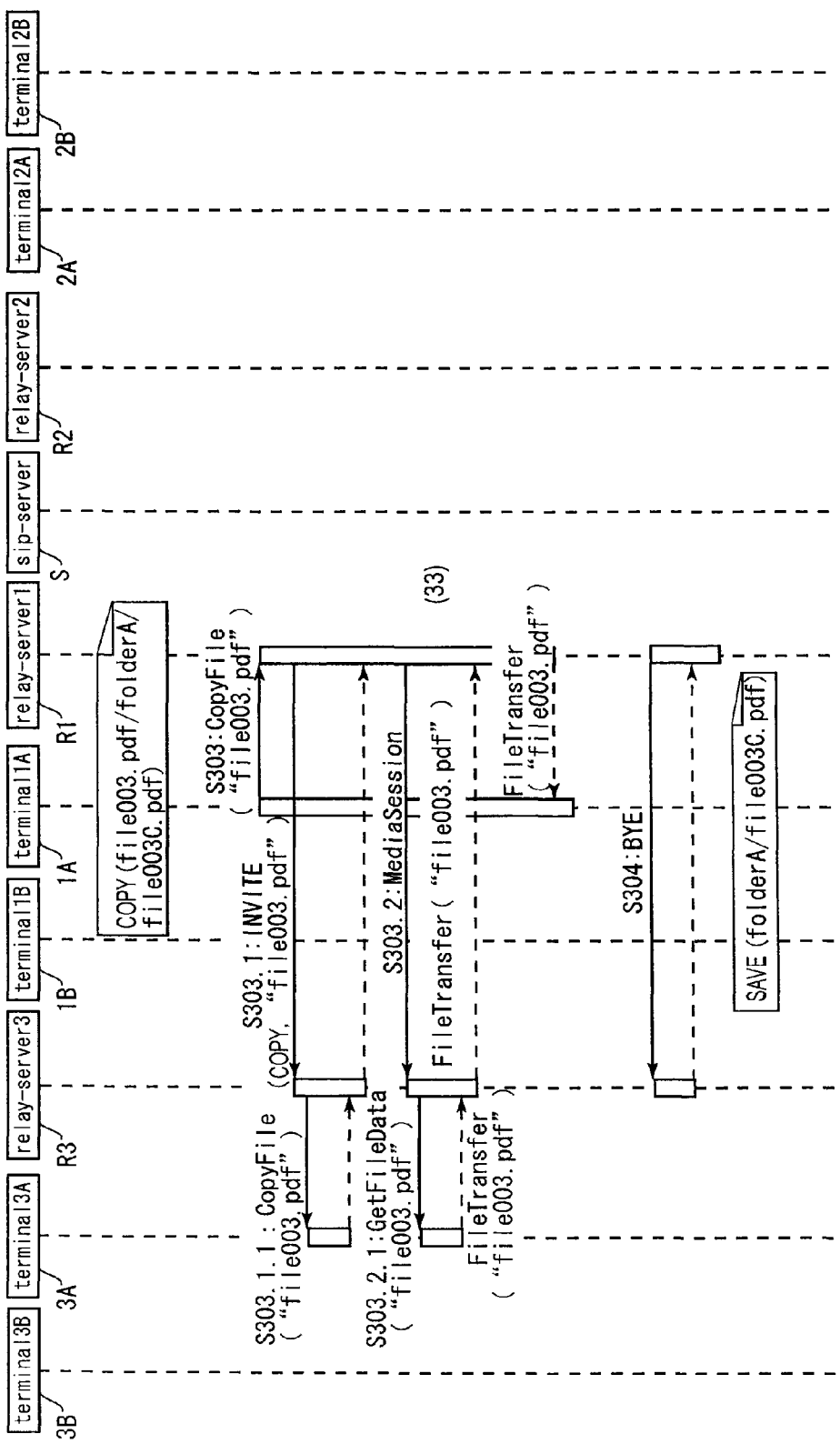
FIG. 39 is a sequence diagram illustrating a flow of a communication process in operating a resource according to the fourth embodiment of the invention.
Figure 40:
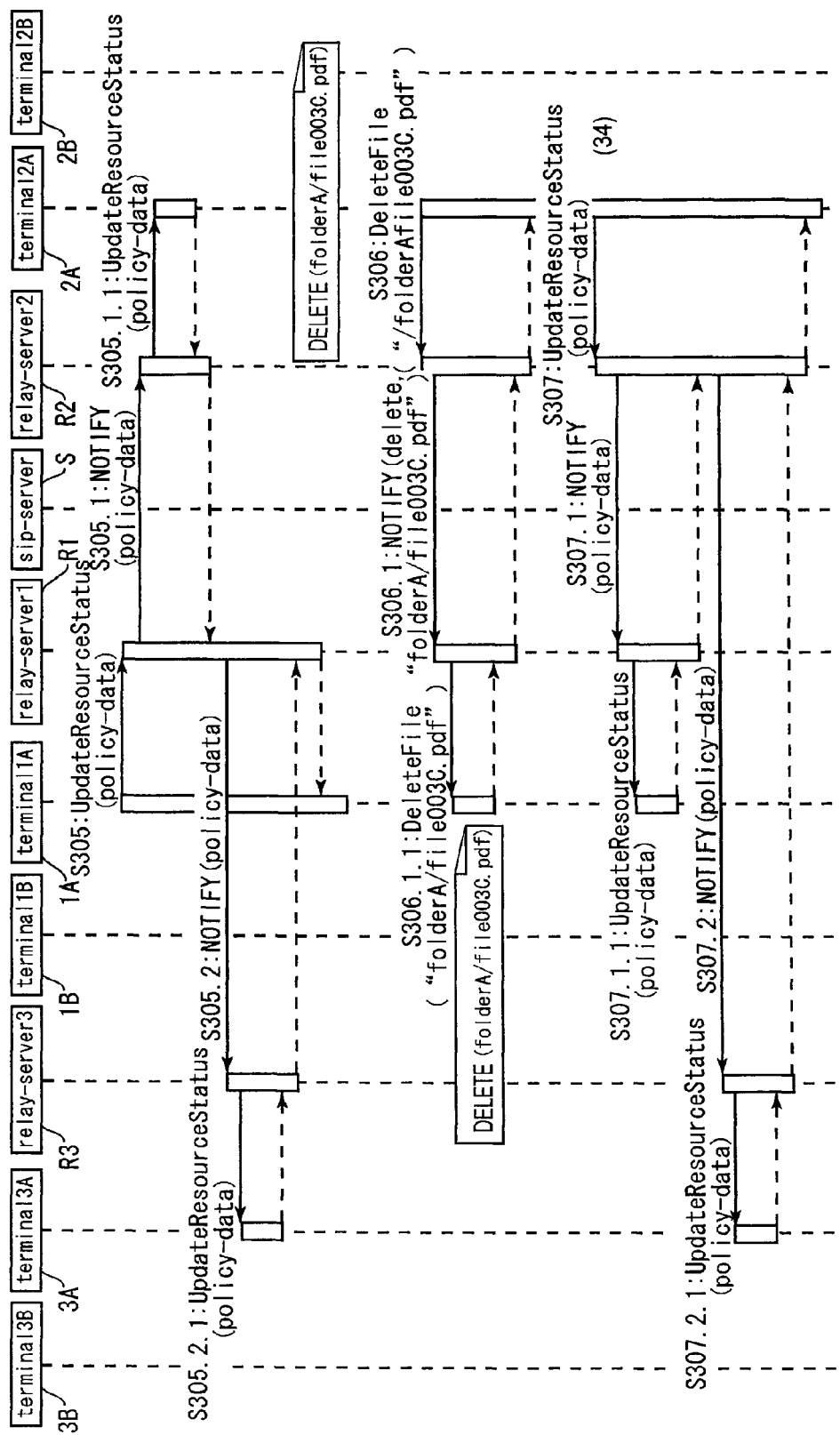
FIG. 40 is a sequence diagram illustrating a flow of a communication process in operating a resource according to the fourth embodiment of the invention.

The modes will be described with reference to the sequence diagrams of FIGS. 38 to 40. FIGS. 38 to 40 show flows of the communication processes of performing a file copying operation and a file deleting operation, in which the modes are compared with each other. The relay group relation contained in the relay group information 100 of FIG. 6 and the resource sharing relation contained in the shared resource information 120 of FIG. 36 are set initially and the operations are performed under the set conditions.

Asynchronous Mode

In the first communication process, the client terminal 1A of the LAN1 copies an original file (file003.pdf) of which the owner is the client terminal 3A disposed in the different LAN3 into a folder (folderA) of itself to form a copy file (file003C.pdf).

The client terminal 1A transmits a status changing request (UpdateResourceStatus command) for copying the original file (file003.pdf) to the relay server R1 (step S301).

When receiving the status changing request, the relay server R1 determines whether the operation of copying the target resource can be processed by changing the details of the shared resource information 120, on the basis of the shared resource information 120 (see FIG. 36) stored in itself. When it is determined that the operation of copying the resource can be processed by changing the shared resource information 120, the relay server updates the shared resource information 120.

The updated shared resource information 120*j* is shown in FIG. 41. As shown in FIG. 41, the resource information 126*a* of a new copy file (file003C.pdf) is written in the family resource information 125 of the updated shared resource information 120*j*. The owner information 128*a* (owner='user3A@account') and the access information 129*a* (value='c:/folderB/file003.pdf') are equal to the details of the resource information 126*t* as a copy source. The copy file is in a state where it is linked to the file of the copy source. That is, in the asynchronous mode, it is virtually shown that the copy operation has been performed by keeping the essence of the resource unchanged and changing the details of the shared resource information 120. Accordingly, the essence of the resource is not changed with the copy operation and the repeated amount of resources occurring in the relay communication system decreases, thereby contributing to an efficient operation of the storage unit.

The relay server R1 transmits the status changing request from the client terminal T registered therein to the client terminal T contained in the family account information 124 of the shared resource information 120 as a target. However, in this embodiment, since the corresponding client terminal T does not exist, the status changing request is not transmitted.

The change notification of the shared resource information 120 is transmitted to the relay servers R2 and R3 in which the different client terminals T (2A and 3A in this case) contained in the family account information 124 (steps S301.1 and S301.2). The relay servers R2 and R3 having received the change notification update the shared resource information 120 stored therein. The relay servers R2 and R3 transmit the status changing request to the client terminals 2A and 3A (steps S301.1.1 and S301.2.1). The client terminals having received the status changing request updates the shared resource information 120 stored therein and returns responses to the transmission sources, respectively. The responses are transmitted to the transmission sources, whereby a series of communication processes are ended.

The shared resource information displayed on the display unit 605 of the client terminal after the copy operation is shown in FIG. 42. The copy file (file003C.pdf) is formed under the folder (folderA) and it seems to perform the copy operation.

The next step shows the communication process in which the client terminal 2A indirectly deletes a file (for example, file003C.pdf).

The client terminal 2A transmits the status changing request for deleting file003C.pdf to the relay server R2 (step S302).

When receiving the status changing request, the relay server R2 determines whether the operation of deleting a resource as a target can be processed by changing the details of the shared resource information 120*j*, on the basis of the shared resource information 120*j* (see FIG. 41) stored therein. The relay server R2 determines that the deletion operation can be processed by changing the details of the shared resource information 120*j* and updates the shared resource information 120*j* stored therein. The status changing request is transmitted to a relevant client terminal T if any and the change notification of the shared resource information 120*j* is transmitted to the relevant relay servers R (R1 and R3 in this case) (steps S302.1 and S302.2). The relay servers R1 and R3 having received the change notification updates the shared resource information 120*j* stored therein and transmits the status changing request to the client terminals 1A and 3A (steps S302.1.1 and S302.2.1). The client terminals 1A and 3A having received the status changing request updates the shared resource information 120*j* stored therein and returns a response to the transmission source. The relay servers R1 and R3 having received the response transmit a response to the relay server R2 as the transmission source, whereby a series of communication processes are ended.

Here, the details of the shared resource information 120*k* updated in the deletion operation are shown in FIG. 43. As shown in FIG. 43, the resource information 126*a* of the file (file003C.pdf) is deleted from the family resource information 125 of the updated shared resource information 120*k*. The details of the shared resource information 120 displayed on the display unit 605 of the client terminal T after the deletion operation are the same as being shown in FIG. 37 and it seems to actually operate the resource, whereby a user can user the client terminal without any particular consciousness.

In this way, in the asynchronous mode, by keeping the essence of the resource unchanged and changing only the details of the resource information 120, the seeming operation of the resource is performed.

The operation of the resource may not be performed by only changing the details of the shared resource information 120. For example, the client terminal 1A copies the original file (file003.pdf), the owner of which is the client terminal 3A, not to a folder included in the family resource information 125, but to a local folder which is not a shared resource. Accordingly, in this case, the same process as the synchronous mode described below is performed in the asynchronous mode.

Synchronous Mode

First, the file copy operation is performed similarly to the asynchronous mode. The client terminal 1A transmits a copy request (Copyfile) to the relay server R1 (step S303). The relay server R1 having received the copy request specifies the owner client terminal 3A of "file003.pdf" as a copy target on the basis of the shared resource information 120 and specifies the relay server R3 in which the owner client terminal 3A is registered on the basis of the relay group information 100.

The relay server R1 transmits an access request (INVITE) to the specified relay server R3 through the external server S (step S303.1). The relay server R3 having received the access request transmits the copy request to the client terminal 3A (step S303.1.1). The client terminal 3A having received the copy request transmits a response to the relay server R3 and the relay server R3 transmits the response to the relay server R1.

The relay server R1 having received the response transmits a Mediasession command to the relay server R3 (step S303.2). The relay server R3 having received the Mediasession command transmits the file copying request (GetFileData) to the client terminal 3A (step S303.2.1). The client terminal 3A having received the file copying request copies "file003.pdf", which can be directly operated by itself, from the resource storing unit 603 and transmits the copied file to the relay server R3. Then, "file003.pdf" is transmitted to the client terminal 1A through the relay server R1 (FileTransfer).

When a series of communication processes are finished, a cutting request (BYE) is transmitted from the relay server R1 to the relay server R3 and thus the communication between the relay server R1 and the relay server R3 is ended (step S304).

Thereafter, in the client terminal 1A, "file003.pdf" transmitted from the client terminal 3A is stored as "file003C.pdf" in the folder (folderA) to form a new copy file (file003C.pdf).

The details of the shared resource information 120 are changed. First, the status changing request (UpdateResourceStatus) is transmitted from the client terminal 1A having requested for the operation to the relay server R1 (step S305). The relay server R1 having received the status changing request transmits a change notification (NOTIFY) of the shared resource information 120 to the relay servers R2 and R3 associated with the updated shared resource information 120 (step S305.1 and S305.2). The relay servers R2 and R3 having received the change notification update the shared resource information 120 stored therein. The status changing request is transmitted to the client terminals 2A and 3A associated with the updated shared resource information 120 (steps S305.1.1 and S305.2.1). The client terminals 2A and 3A having received the status changing request update the shared resource information 120 stored therein and transmit a response to the relay servers R2 and R3 as the transmission source. Thereafter, the response is transmitted from the relay servers R2 and R3 to the relay server as the transmission source and is transmitted from the relay server R1 to the client terminal 1A.

The shared resource information 120 is kept with the same details between the relevant relay servers R, even when it is updated.

The updated shared resource information 120m in the series of communication processes is shown in FIG. 44. As shown in FIG. 44, the resource information 126c of the copy file (file003C.pdf) is newly written in the family resource information 125 of the updated shared resource information 120m. In the synchronous mode, since the essential operation of the resource is performed, information (owner='user1A@account') indicating a new owner client terminal 1A as the copy destination of the file is written in the owner information 128c. Information (value='c:/folderA/file003C.pdf') indicating a location of the file copied and newly created is written in the access information 129c. That is, a copy file having the same details is actually newly created independently of the file of the copy source.

Up to now, since the client terminal 1A was a user client terminal with respect to the original file (file003.pdf) as a copy source, the client terminal 1A could not help operating the file indirectly through the client terminal 3A. However, since the client terminal 1A is the owner of the newly created copy file having the same details, the client terminal 1A can operate the file directly. Accordingly, it is not necessary to operate the original file indirectly through the relay communication using the relay server R and it is thus possible to reduce a communication load as much.

After a series of processes of copying a file are performed in the synchronous mode, the details of the shared resource information 120 displayed on the display unit 605 of the client terminal T are the same as the details after the copy operation is performed in the asynchronous mode and thus they are not seemingly different from each other (see FIG. 42).

A communication process in which a file (for example, file003C.pdf) is deleted in the synchronous mode is described now.

The client terminal 2A transmits a deletion request (Deletefile) for deleting a file (file003C.pdf) to the relay server R3 (step S306). The relay server R2 having received the deletion request specifies the owner client terminal 1A of "file003C.pdf" as a deletion target and the relay server R1 in which the owner client terminal 1A is registered, on the basis of the shared resource information 120 and the relay group information 100.

The relay server R2 transmits an information notification of the deletion request (NOTIFY) to the specified relay server R1 (step S306.1). The relay server R1 having received the information notification of the deletion request transmits the deletion request to the client terminal 1A by the use of a Deletefile command (step S306.1.1). The client terminal 1A having received the deletion request deletes the target resource (file003C.pdf) from the resource storing unit 603. The OK response is transmitted to the client terminal 2A through the relay server R1 and the relay server R2.

Subsequently, a process of updating the shared resource information 120m is performed between the relevant relay servers R. This is because the details of the shared resource information 120m are changed. Specifically, the status changing request is transmitted from the client terminal 2A having requested for the operation to the relay server R2 (step S307). The relay server R2 having received the status changing request transmits the change notification of the shared resource information 120 to the relay servers R1 and R3 associated with the changed shared resource information 120m (step S307.1 and S307.2). The relay servers R1 and R3 having received the change notification update the shared resource information 120m stored therein. The status changing request is transmitted to the client terminals 1A and 3A associated with the changed shared resource information 120m (steps S307.1.1 and S307.2.1). The client terminals 1A and 3A having received the status changing request update the shared resource information 120m stored therein and returns a response to the relay servers R1 and R3 as the transmission source. Thereafter, the response is transmitted from the relay servers R1 and R3 to the relay server R2 as the transmission source and is then transmitted from the relay server R2 to the client terminal 2A.

In this way, the details of the shared resource information 120 after a series of processes of deleting a file is finished in the synchronous mode are equal to the details of the shared resource information 120 after the file deleting process is finished in the asynchronous mode (see FIG. 43). Then, the details of the shared resource information 120 displayed on the display unit 605 of the client terminal T are equal to the details after the file is deleted in the asynchronous mode and thus no change occurs seemingly (see FIG. 37). Accordingly, a user operating a resource by the use of the client terminal T can operate the resource without being aware of a difference between both modes, thereby not causing any confusion.

As described above, in the relay communication system employing the relay server according to the invention, a client terminal T can easily operate a resource held by a different client terminal T over the WAN, as if it holds the resource.

In addition, it is possible to select one of both modes of the synchronous mode and the asynchronous mode at the time of operating the resource. For example, when the synchronous mode is selected in which the status of the resource is contained in the operation details, the client terminal T having created a copy file after the operation can directly operate the copy file. As a result, the subsequent file operation cannot be necessary performed by the use of the owner client terminal T, thereby reduce a communication process load. On the other hand, when the asynchronous mode is selected, it is possible to prevent a resource from repeatedly occurring, thereby efficiently using the storage unit of the relay communication system.

While the invention has been described with reference to the preferred embodiments thereof, it will apparent to those skilled in the art that the disclosed invention may be modified in numerous ways and may assume many embodiments other than those specifically set out and described above. Accordingly, it is intended by the appended claims to cover all modifications of the invention that fall within the true spirit and scope of the invention.

What is claimed is:

1. A relay server which is connected to a LAN and which can communicate via a WAN with at least one different relay server connected to a different LAN, the relay server comprising:
    an account information registering unit that stores information on client terminals connected to the LAN to which the relay server is connected;
    a relay group information registering unit that stores relay group information including information on a group of relay servers which includes the relay server and at least one different relay server and permits accesses to each other, and logon status information on client terminals connected to the relay servers via a LAN;
    a relay group relay information sharing unit that shares the relay group information with the group of relay servers permitting accesses to each other;
    a shared resource information registering unit that stores shared resource information including the names of files or folders which are resources, information on owner client terminals which are client terminals capable of operating an entity of the resources, state information indicating statuses of the resources, and information on resource sharing client terminals which are client terminals sharing the resources; and
    a shared resource information sharing unit that shares the shared resource information with the resource sharing client terminals and relay servers in which the resource sharing client terminals are in logon status; wherein
    the relay group information sharing unit includes a relay group information notifying unit;
    when checking whether or not client terminals stored in the account information registering unit are in logon status and checking that a client terminal is changed in logon status, the relay group information notifying unit updates the relay group information and transmits a change notification of the relay group information to the group of relay servers permitting accesses to each other;
    the shared resource information sharing unit includes a shared resource information notifying unit; and
    when receiving a change notification of relay group information or updating the relay group information under a state in which client terminals being changed in logon status are owner client terminals of the shared resource information, the shared resource information notifying unit updates the shared resource information and transmits a change notification of the shared resource information to the resource sharing client terminals.

2. A relay server which is connected to a LAN and which can communicate via a WAN with a plurality of different relay servers connected to LANs, the relay server comprising:
    an account information registering unit that stores information on client terminals connected to the LAN to which the relay server is connected;
    a relay group information registering unit that stores relay group information including information on a group of relay servers which includes the relay server and a plurality of different relay servers and permits accesses to each other, status information indicating statuses of the relay servers, and logon status information on client terminals connected to the relay servers via a LAN;
    a relay group relay information sharing unit that shares the relay group information with the group of relay servers permitting access to each other;
    a shared resource information registering unit that stores shared resource information including the names of files or folders which are resources, information on owner client terminals which are client terminals capable of operating an entity of the resources, status information indicating statuses of the resources, and information on resource sharing client terminals which are client terminals sharing the resources;
    a shared resource information sharing unit that shares the shared resource information with the resource sharing client terminals and relay servers in which the resource sharing client terminals are in logon status; wherein
    the relay group information sharing unit includes a relay group information notifying unit;
    when checking whether the different relay servers stored in the relay group information registering unit can be accessed and checking that a different relay server is changed in access status, the relay group information notifying unit updates the relay group information and transmits a change notification of the relay group information to the group of relay servers permitting accesses to each other;
    the shared resource information sharing unit includes a shared resource information notifying unit; and
    when receiving a change notification of relay group information or updating the relay group information, under a state in which client terminals logging onto different relay servers being changed in access status are owner client terminals of the shared resource information, the shared resource information notifying unit updates the shared resource information and transmits a change notification of the shared resource information to the resource sharing client terminals.

3. A relay communication system comprising:
a plurality of LANs; and
a relay server and client terminals connected to each LAN, wherein the relay server includes:

an account information registering unit that stores information on client terminals connected to the LAN to which the relay server is connected;
a relay group information registering unit that stores relay group information including information on a group of relay servers which includes the relay server and at least one different relay server and permits accesses to each other, and logon status information on client terminals connected to the relay servers via a LAN;
a relay group relay information sharing unit that shares the relay group information with the group of relay servers permitting accesses to each other;
a shared resource information registering unit that stores shared resource information including the names of files or folders which are resources, information on owner client terminals which are client terminals capable of operating an entity of the resources, state information indicating statuses of the resources, and information on resource sharing client terminals which are client terminals sharing the resources; and
a shared resource information sharing unit that shares the shared resource information with the resource sharing client terminals and relay servers in which the resource sharing client terminals are in logon status; wherein
the relay group information sharing unit includes a relay group information notifying unit;
when checking whether or not client terminals stored in the account information registering unit are in logon status and checking that a client terminal is changed in logon status, the relay group information notifying unit updates the relay group information and transmits a change notification of the relay group information to the group of relay servers permitting accesses to each other;
the shared resource information sharing unit includes a shared resource information notifying unit; and
when receiving a change notification of relay group information or updating the relay group information under a state in which client terminals being changed in logon status are owner client terminals of the shared resource information, the shared resource information notifying unit updates the shared resource information and transmits a change notification of the shared resource information to the resource sharing client terminals; and the relay group information and the shared resource information held in the relay communication system are automatically updated.

4. A relay communication system comprising:
a plurality of LANs; and
a relay server and client terminals connected to each LAN, wherein the relay server includes:
an account information registering unit that stores information on client terminals connected to the LAN to which the relay server is connected;
a relay group information registering unit that stores relay group information including information on a group of relay servers which includes the relay server and a plurality of different relay servers and permits accesses to each other, status information indicating statuses of the relay servers, and logon status information on client terminals connected to the relay servers via a LAN;
a relay group relay information sharing unit that shares the relay group information with the group of relay servers permitting access to each other;
a shared resource information registering unit that stores shared resource information including the names of files or folders which are resources, information on owner client terminals which are client terminals capable of operating an entity of the resources, status information indicating statuses of the resources, and information on resource sharing client terminals which are client terminals sharing the resources;
a shared resource information sharing unit that shares the shared resource information with the resource sharing client terminals and relay servers in which the resource sharing client terminals are in logon status; wherein
the relay group information sharing unit includes a relay group information notifying unit;
when checking whether the different relay servers stored in the relay group information registering unit can be accessed and checking that a different relay server is changed in access status, the relay group information notifying unit updates the relay group information and transmits a change notification of the relay group information to the group of relay servers permitting accesses to each other;
the shared resource information sharing unit includes a shared resource information notifying unit; and
when receiving a change notification of relay group information or updating the relay group information, under a state in which client terminals logging onto different relay servers being changed in access status are owner client terminals of the shared resource information, the shared resource information notifying unit updates the shared resource information and transmits a change notification of the shared resource information to the resource sharing client terminals; and
the relay group information and the shared resource information held in the relay communication system are automatically updated.

5. A management method using a relay server which is connected to a LAN and which can communicate via a WAN with at least one different relay server connected to a different LAN, the management method comprising:
storing information on client terminals connected to the LAN to which the relay server is connected;
storing relay group information including information on a group of relay servers which includes the relay server and at least one different relay server and permits accesses to each other, and logon status information on client terminals connected to the relay servers via a LAN;
sharing the relay group information with the group of relay servers permitting accesses to each other;
storing shared resource information including the names of files or folders which are resources, information on owner client terminals which are client terminals capable of operating an entity of the resources, state information indicating statuses of the resources, and information on resource sharing client terminals which are client terminals sharing the resources;
sharing the shared resource information with the resource sharing client terminals and relay servers in which the resource sharing client terminals are in logon status;
checking whether or not client terminals stored in the registering of the account information are in logon status and checking that a client terminal is changed in logon status, the relay group information notifying unit updates the relay group information and transmits a change notification of the relay group information to the group of relay servers permitting accesses to each other, the shared resource information sharing unit includes a shared resource information notifying unit; and
updating the shared resource information and transmitting a change notification of the shared resource information to the shared resource client terminals when receiving a change notification of relay group information, under a state in which client terminals being changed in logon status are owner client terminals of the shared resource information.

6. A management method using a relay server which is connected to a LAN and which can communicate via a WAN with a plurality of different relay servers connected to LANs, the management method comprising:

storing information on client terminals connected to the LAN to which the relay server is connected;

storing relay group information including information on a group of relay servers which includes the relay server and a plurality of different relay servers and permits accesses to each other, status information indicating statuses of the relay servers, and logon status information on client terminals connected to the relay servers via a LAN;

sharing the relay group information with the group of relay servers permitting access to each other;

storing shared resource information including the names of files or folders which are resources, information on owner client terminals which are client terminals capable of operating an entity of the resources, status information indicating statuses of the resources, and information on resource sharing client terminals which are client terminals sharing the resources;

checking whether or not relay servers stored in the registering of the relay group information can be accessed and checking that a different relay server is changed in access status, the relay group information notifying unit updates the relay group information and transmits a change notification of the relay group information to the group of relay servers permitting accesses to each other, the shared resource information sharing unit includes a shared resource information notifying unit;

updating the relay group information under a state in which client terminals logging onto different relay servers being changed in access status are owner client terminals of the shared resource information, the shared resource information notifying unit updates the shared resource information and transmits a change notification of the shared resource information to the resource sharing client terminals.

7. A management method of a relay communication system which has a plurality of LANs and a relay server and client terminals connected to each LAN, the management method comprising:

storing information on client terminals connected to the LAN to which the relay server is connected;

storing relay group information including information on a group of relay servers which includes the relay server and at least one different relay server and permits accesses to each other, and logon status information on client terminals connected to the relay servers via a LAN;

storing shared resource information including the names of files or folders which are resources, information on owner client terminals which are client terminals capable of operating an entity of the resources, state information indicating statuses of the resources, and information on resource sharing client terminals which are client terminals sharing the resources;

sharing the shared resource information with the resource sharing client terminals and relay servers in which the resource sharing client terminals are in logon status;

checking whether or not client terminals stored in the registering of the account information are in logon status and checking that a client terminal is changed in logon status, the relay group information notifying unit updates the relay group information and transmits a change notification of the relay group information to the group of relay servers permitting accesses to each other, the shared resource information sharing unit includes a shared resource information notifying unit;

updating the shared resource information and transmitting a change notification of the shared resource information to the shared resource client terminals when receiving a change notification of relay group information or updating the relay group information under a state in which client terminals being changed in logon status are owner client terminals of the shared resource information; wherein the relay group information and the shared resource information held in the relay communication system are automatically updated.

8. A management method of a relay communication system which has a plurality of LANs and a relay server and client terminals connected to each LAN, the management method comprising:

storing information on client terminals connected to the LAN to which the relay server is connected;

storing relay group information including information on a group of relay servers which includes the relay server and a plurality of different relay servers and permits accesses to each other and status information indicating statuses of the relay servers, and logon status information on client terminals connected to the relay servers via a LAN;

sharing the relay group information with the group of relay servers permitting access to each other;

storing shared resource information including the names of files or folders which are resources, information on owner client terminals which are client terminals capable of operating an entity of the resources, status information indicating statuses of the resources, and information on resource sharing client terminals which are client terminals sharing the resources;

checking whether or not relay servers stored in the registering of the relay group information can be accessed and checking that a different relay server is changed in access status, the relay group information notifying unit updates the relay group information and transmits a change notification of the relay group information to the group of relay servers permitting accesses to each other, the shared resource information sharing unit includes a shared resource information notifying unit; and updating the relay group information under a state in which client terminals logging onto different relay servers being changed in access status are owner client terminals of the shared resource information, the shared resource information notifying unit updates the shared resource information and transmits a change notification of the shared resource information to the resource sharing client terminals; wherein the relay group information and the shared resource information held in the relay communication system are automatically updated.

* * * * *